United States Patent
Yamada et al.

(10) Patent No.: US 12,525,611 B2
(45) Date of Patent: Jan. 13, 2026

(54) RAW MATERIAL OF NEGATIVE ELECTRODE MATERIAL FOR NONAQUEOUS SECONDARY BATTERIES, NEGATIVE ELECTRODE MATERIAL FOR NONAQUEOUS SECONDARY BATTERIES, NEGATIVE ELECTRODE FOR NONAQUEOUS SECONDARY BATTERIES, AND NONAQUEOUS SECONDARY BATTERY

(71) Applicant: Mitsubishi Chemical Corporation, Tokyo (JP)

(72) Inventors: Shunsuke Yamada, Tokyo (JP); Nobuyuki Ishiwatari, Tokyo (JP); Tomohiro Sato, Tokyo (JP); Hiroaki Yoshida, Tokyo (JP); Akihiro Kato, Tokyo (JP); Masakazu Yokomizo, Tokyo (JP); Hiromitsu Ikeda, Tokyo (JP); Hiroki Sato, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1037 days.

(21) Appl. No.: 17/449,125

(22) Filed: Sep. 28, 2021

(65) Prior Publication Data
US 2022/0013779 A1    Jan. 13, 2022

Related U.S. Application Data

(63) Continuation of application No. PCT/JP2020/014578, filed on Mar. 30, 2020.

(30) Foreign Application Priority Data

Mar. 28, 2019 (JP) .................................. 2019-062044
Oct. 4, 2019 (JP) .................................. 2019-183948

(51) Int. Cl.
*H01M 4/587* (2010.01)
*C01B 32/21* (2017.01)
(Continued)

(52) U.S. Cl.
CPC ............. *H01M 4/587* (2013.01); *C01B 32/21* (2017.08); *H01M 4/133* (2013.01);
(Continued)

(58) Field of Classification Search
CPC .. H01M 4/587; H01M 4/133; H01M 10/0525; H01M 200/021; H01M 200/027
See application file for complete search history.

(56) References Cited

U.S. PATENT DOCUMENTS 9,748,556 B2    8/2017   Toda et al.
2012/0219863 A1  8/2012   Takahashi et al.
(Continued)

FOREIGN PATENT DOCUMENTS

CN    106663808 A    5/2017
CN    107534148 A    1/2018
(Continued)

OTHER PUBLICATIONS

JP2014142150 translation (Year: 2014).*
(Continued)

*Primary Examiner* — Jane J Rhee
(74) *Attorney, Agent, or Firm* — Oblon, McClelland, Maier & Neustadt, L.L.P.

(57) ABSTRACT

A negative electrode material for a nonaqueous secondary battery which contains a graphite that contains an amorphous carbonaceous material in at least a part of the surface; has a cumulative pore volume of 0.100 mL/g or less in a pore size range of 0.01 μm to 1 μm; and satisfies at least one of the following conditions (1) and (2) in a DTA curve obtained by differential thermal analysis (DTA) in an air stream: (1)
(Continued)

the negative electrode material has no exothermic peak in a temperature range of 550° C. to 650° C.; and (2) the negative electrode material has an exothermic peak in a temperature range of 550° C. to 650° C., and the area of the exothermic peak is larger than 0 μV·s/mg but 90 μV·s/mg or smaller; a negative electrode for a nonaqueous secondary battery, which contains the same; and a nonaqueous secondary battery are provided.

13 Claims, 6 Drawing Sheets

(51) Int. Cl.
  *H01M 4/133* (2010.01)
  *H01M 10/0525* (2010.01)
  *H01M 4/02* (2006.01)

(52) U.S. Cl.
  CPC ..... *H01M 10/0525* (2013.01); *C01P 2002/82* (2013.01); *C01P 2004/32* (2013.01); *C01P 2006/11* (2013.01); *C01P 2006/12* (2013.01); *C01P 2006/14* (2013.01); *C01P 2006/16* (2013.01); *H01M 2004/021* (2013.01); *H01M 2004/027* (2013.01)

(56) References Cited

U.S. PATENT DOCUMENTS

| | | | |
|---|---|---|---|
| 2014/0065479 | A1 | 3/2014 | Yamada et al. |
| 2017/0187041 | A1* | 6/2017 | Yamada ................. H01M 4/587 |

FOREIGN PATENT DOCUMENTS

| | | | |
|---|---|---|---|
| JP | 2011-60465 | A | 3/2011 |
| JP | 2014-67636 | A | 4/2014 |
| JP | 2016-225287 | A | 12/2016 |
| JP | 2017-37711 | A | 2/2017 |
| JP | 2017-45574 | A | 3/2017 |
| JP | 2017-168380 | A | 9/2017 |
| JP | 2018-163868 | A | 10/2018 |
| KR | 10-2017-0030580 | A | 3/2017 |
| WO | WO 2011/052452 | A1 | 5/2011 |
| WO | WO 2012/157590 | A1 | 11/2012 |
| WO | WO 2016/006617 | A1 | 1/2016 |

OTHER PUBLICATIONS

WO2013146144 translation (Year: 2013).*
Combined Chinese Office Action and Search Report issued Jan. 17, 2024 in Chinese Patent Application No. 202080025548.5 (with unedited computer-generated English Translation), 23 pages.
Japanese Office Action issued Jan. 30, 2024 in Japanese Patent Application No. 2020-057281 (with unedited computer-generated English Translation), 11 pages.
Office Action issued on Aug. 22, 2023 in the corresponding Japanese Application No. 2020-057281 (with unedited computer-generated English translation), 10 pages.
Extended European Search Report issued Jun. 14, 2022, in corresponding European Patent Application No. 20779316.7, 7 pages.
International Search Report issued Jun. 30, 2020 in PCT/JP2020/014578, 2 pages.
International Preliminary Report on Patentability and Written Opinion issued Sep. 28, 2021 in POT/JP2020/014578, 5 pages.
Korean Office Action dated Jan. 2, 2025, issued in corresponding Korean Patent Application No. 10-2021-7032388 (with English Translation), 35 pages.
Decision of Rejection dated Aug. 12, 2025, in Korean Patent Application No. 10-2021-7032388 with machine English translation (13 pages).

* cited by examiner

RAW MATERIAL OF NEGATIVE ELECTRODE MATERIAL FOR NONAQUEOUS SECONDARY BATTERIES, NEGATIVE ELECTRODE MATERIAL FOR NONAQUEOUS SECONDARY BATTERIES, NEGATIVE ELECTRODE FOR NONAQUEOUS SECONDARY BATTERIES, AND NONAQUEOUS SECONDARY BATTERY

CROSS REFERENCE TO RELATED APPLICATIONS

This application is a Continuation of PCT International Application No. PCT/JP2020/014578, filed on Mar. 30, 2020, which is claiming priority of Japanese Patent Application No. 2019-062044, filed on Mar. 28, 2019, and Japanese Patent Application No. 2019-183948, filed on Oct. 4, 2019, the entire contents of which are incorporated herein by reference.

TECHNICAL FIELD

The present invention relates to: a negative electrode raw material for a nonaqueous secondary battery; a negative electrode material for a nonaqueous secondary battery; a negative electrode for a nonaqueous secondary battery, which contains the negative electrode material for a nonaqueous secondary battery; and a nonaqueous secondary battery.

BACKGROUND ART

In recent years, there is an increasing demand for high-capacity secondary batteries in association with size reduction in electronic appliances. Nonaqueous secondary batteries, particularly lithium ion secondary batteries, which have a higher energy density and superior rapid charge-discharge characteristics as compared to nickel-cadmium batteries and nickel-hydrogen batteries, have been drawing attention. Especially, nonaqueous lithium secondary batteries, which include positive and negative electrodes capable of occluding and releasing lithium ions and a nonaqueous electrolyte solution containing a lithium salt dissolved therein, such as $LiPF_6$ or $LiBF_4$, have been developed and put into practical use.

A variety of materials have been proposed as negative electrode materials of such nonaqueous lithium secondary batteries, and carbon materials made of a graphite, such as a natural graphite, an artificial graphite obtained by graphitization of coke or the like, a graphitized mesophase pitch or a graphitized carbon fiber, have been used because of their high capacities, excellent flatness of discharge potential, and the like. In addition, amorphous carbon materials have been used since, for example, they are relatively stable against some of electrolyte solutions.

Moreover, carbon materials that are obtained by coating or adhering amorphous carbon onto the surfaces of graphite particles and thereby imparted with two properties attributed to graphite and amorphous carbon, namely a high capacity with a small irreversible capacity and excellent stability with electrolyte solutions, respectively, have been used as well.

Recently, in the fields of electric vehicles and the like, properties such as high capacity and excellent low-temperature input-output characteristics are emphasized and, from these standpoints, among the above-described negative electrode materials of nonaqueous lithium secondary batteries, those obtained by coating or adhering amorphous carbon onto the surfaces of graphite particles have been used. With regard to such materials, Patent Document 1 discloses a negative electrode material in which the rapid charge characteristics are improved by coating amorphous carbon under specific conditions and performing an isotropic press treatment on a graphite. In addition, Patent Document 2 discloses a negative electrode material having a high capacity with improved charge-discharge characteristics, in which, for amorphous carbon coated on graphite particles, the atomic concentrations of elemental sulfur and elemental nitrogen that exist on the surface are controlled using a coal-tar pitch having a high quinoline content as a raw material. Further, Patent Document 3 discloses a negative electrode material in which the press load is reduced and the low-temperature output characteristics are improved by a carbon material having specific thermal properties. Moreover, Patent Document 4 discloses a negative electrode material which is coated with a specific amorphous carbon, has a specific pore volume, and thereby exhibit improved low-temperature input-output characteristics and high-temperature storage characteristics.

RELATED ART DOCUMENTS

Patent Documents

[Patent Document 1] WO 2011/052452
[Patent Document 2] WO 2012/157590
[Patent Document 3] Japanese Unexamined Patent Application Publication No. 2017-045574
[Patent Document 4] Japanese Unexamined Patent Application Publication No. 2018-163868
[Patent Document 5] Japanese Unexamined Patent Application Publication No. 2017-37711

SUMMARY OF THE INVENTION

Problems to be Solved by the Invention

According to the studies conducted by the present inventors, the negative electrode material for a nonaqueous secondary battery that is disclosed in Patent Document 1 was found to be not satisfactory in terms of high-temperature storage characteristics due to the component of the amorphous carbon coating on the graphite. In addition, it was found that the rapid charge-discharge characteristics and the high-temperature storage characteristics are insufficient in the negative electrode materials for nonaqueous secondary batteries that are disclosed in Patent Documents 2 to 4. That is, the first object of the present invention is to provide: a negative electrode material for a nonaqueous secondary battery, with which a nonaqueous secondary battery having a high capacity and excellent rapid charge-discharge characteristics as well as an excellent balance between the low-temperature input-output characteristics and the high-temperature storage characteristics can be provided; a negative electrode for a nonaqueous secondary battery, which contains the same; and a nonaqueous secondary battery.

Further, according to the studies conducted by the present inventors, the negative electrode materials for nonaqueous secondary batteries that are disclosed in Patent Documents 1 to 4 were found to have their electrode expanded after a charge-discharge cycle. That is, the second object of the present invention is to provide: a negative electrode raw material for a nonaqueous secondary battery and a negative electrode material for a nonaqueous secondary battery, with which a nonaqueous secondary battery having a high capacity and excellent rapid charge characteristics and exhibiting limited electrode expansion after a charge-discharge cycle can be provided; a negative electrode for a nonaqueous secondary battery, which contains the same; and a nonaqueous secondary battery.

According to the studies conducted by the present inventors, it was found that, in the negative electrode material for a nonaqueous secondary battery that is disclosed in Patent Document 1, although the amount of pores is adjusted and controlled by modification based on a press treatment as well as by a coating treatment, a simple increase in the amount of an amorphous carbonaceous material leads to an increase in the hardness of particles and this makes it difficult to perform pressing to a high density. It was also found that, in the negative electrode materials for nonaqueous secondary batteries that are disclosed in Patent Documents 2 to 4, although the rapid charge-discharge characteristics and the high-temperature storage characteristics are improved by coating with an amorphous carbonaceous material, the amorphous carbonaceous material causes an increase in the hardness of particles and this makes it impossible to press an electrode to a high density. Further, in Patent Document 5, the capacity and the output characteristics are improved taking into consideration the relationship between the amount of an amorphous carbonaceous material and the pressability; however, the applied load and the density are low and insufficient for a further increase in the density. That is, the third object of the present invention is to provide: a negative electrode material for a nonaqueous secondary battery, which is coated with an amorphous carbonaceous material for the production of a high-capacity battery and in which a high capacity is achieved and electrode expansion is reduced by pressing the material to a high density with a smaller press load; a negative electrode for a nonaqueous secondary battery, which contains the same; and a nonaqueous secondary battery.

Means for Solving the Problems

The present inventors intensively studied to achieve the above-described first object and consequently discovered that a negative electrode material for a nonaqueous secondary battery, in which the volume is controlled to be in a specific range and the thermal properties satisfy specific conditions, can solve the above-described problems. That is, the gist of a first mode of the present invention is as follows.

[A1] A negative electrode material for a nonaqueous secondary battery, comprising a graphite that contains an amorphous carbonaceous material in at least a part of the surface thereof, having a cumulative pore volume of 0.100 mL/g or less in a pore size range of 0.01 μm or more and 1 μm or less, and satisfying at least one of the following conditions (1) and (2) in a DTA curve obtained by differential thermal analysis (DTA) in an air stream:
(1) the negative electrode material has no exothermic peak in a temperature range of 550° C. or higher and 650° C. or lower; and
(2) the negative electrode material has an exothermic peak in a temperature range of 550° C. or higher and 650° C. or lower, and the area of the exothermic peak is larger than 0 μV·s/mg but 90 μV·s/mg or smaller.

[A2] A negative electrode material for a nonaqueous secondary battery, having: a Raman $R_1$ value, which is calculated by the following Formula α, of 0.15 or more and 1.00 or less; a Raman full width at half maximum ($\Delta v_B$) of 65 $cm^{-1}$ or more and 400 $cm^{-1}$ or less; and a cumulative pore volume of 0.100 mL/g or less in a pore size range of 0.01 μm or more and 1 μm or less, and satisfying at least one of the following conditions (1) and (2) in a DTA curve obtained by differential thermal analysis (DTA) in an air stream:
(1) the negative electrode material has no exothermic peak in a temperature range of 550° C. or higher and 650° C. or lower; and
(2) the negative electrode material has an exothermic peak in a temperature range of 550° C. or higher and 650° C. or lower, and the area of the exothermic peak is larger than 0 μV·s/mg but 90 μV·s/mg or smaller,

[Raman $R_1$ value]=[Intensity $I_D$ of peak $P_D$ near 1,360 $cm^{-1}$]/[Intensity $I_A$ of peak $P_A$ near 1,580 $cm^{-1}$] in Raman spectrum analysis.      Formula α:

[A3] The negative electrode material for a nonaqueous secondary battery according to [A1] or [A2], satisfying the following condition (3) in the DTA curve:
(3) the negative electrode material has a heat generation start temperature in a temperature range of 550° C. or higher and 750° C. or lower.

[A4] The negative electrode material for a nonaqueous secondary battery according to any one of [A1] to [A3], satisfying the following condition (4) in the DTA curve:
(4) the negative electrode material has an exothermic peak in a temperature range of higher than 650° C. but 1,000° C. or lower.

[A5] The negative electrode material for a nonaqueous secondary battery according to any one of [A1] to [A4], having: a Raman $R_2$ value, which is calculated by the following Formula β, of 0.03 or more and 0.60 or less; and a Raman $R_3$ value, which is calculated by the following Formula γ, of 0.10 or more and 1.00 or less:

[Raman $R_2$ value]=[Intensity $I_C$ of valley (minimal value) between peak $P_A$ near 1,580 $cm^{-1}$ and peak $P_B$ near 1,360 $cm^{-1}$]/[Intensity $I_A$ of peak $P_A$ near 1,580 $cm^{-1}$] in Raman spectrum analysis,      Formula β:

[Raman $R_3$ value]=[Intensity $I_C$ of valley (minimal value) between peak $P_A$ near 1,580 $cm^{-1}$ and peak $P_B$ near 1,360 $cm^{-1}$]/[Intensity $I_B$ of peak $P_B$ near 1,360 $cm^{-1}$] in Raman spectrum analysis.      Formula γ:

[A6] The negative electrode material for a nonaqueous secondary battery according to any one of [A1] to [A5], having a BET specific surface area (SA) of 0.5 $m^2/g$ or more and 10.0 $m^2/g$ or less.

[A7] The negative electrode material for a nonaqueous secondary battery according to any one of [A1] to [A6], having a tap density of 0.60 $g/cm^3$ or more and 1.40 $g/cm^3$ or less.

[A8] The negative electrode material for a nonaqueous secondary battery according to any one of [A1] to [A7], having an interplanar spacing (d002) of 0.340 nm or smaller and a crystallite size in the c-axis direction (Lc) of 90 nm or larger, as determined by X-ray diffractometry.

[A9] A negative electrode for a nonaqueous secondary battery, comprising: a current collector; and an active material layer formed on the current collector,
wherein the active material layer contains the negative electrode material according to any one of [A1] to [A8].

[A10] A nonaqueous secondary battery, comprising: a positive electrode; a negative electrode; and an electrolyte,
wherein the negative electrode is the negative electrode for a nonaqueous secondary battery according to [A9].

The present inventors intensively studied to achieve the above-described second object and consequently discovered that the second object can be achieved by a negative electrode material for a nonaqueous secondary battery in which a graphitic raw material controlled to have a value of [mercury extrusion volume/mercury intrusion volume (B/A)], which is determined by a mercury intrusion method, in a specific range. That is, the gist of the second mode of the present invention is as follows.

[B1] A negative electrode raw material for a nonaqueous secondary battery, comprising a graphite and being configured such that, when a mercury intrusion volume and a mercury extrusion volume, which are determined by a mercury intrusion method, are defined as A and B, respectively, the value of the following Formula (1) is 45% or higher:

$$B/A \times 100 (\%).$$  Formula (1):

[B2] The negative electrode raw material for a nonaqueous secondary battery according to [B1], wherein the mercury intrusion volume A is 0.001 mL/g or more and 0.5 mL/g or less.

[B3] The negative electrode raw material for a nonaqueous secondary battery according to [B1] or [B2], wherein the mercury extrusion volume B is 0.0005 mL/g or more and 0.5 mL/g or less.

[B4] The negative electrode raw material for a nonaqueous secondary battery according to any one of [B1] to [B3], having a tap density of 0.7 g/cm$^3$ or more and 1.4 g/cm$^3$ or less.

[B5] A negative electrode material for a nonaqueous secondary battery, comprising the negative electrode raw material for a nonaqueous secondary battery according to any one of [B1] to [B4].

[B6] The negative electrode material for a nonaqueous secondary battery according to [B5], having an interplanar spacing (d002) of 0.34 nm or smaller and a crystallite size in the c-axis direction (Lc) of 90 nm or larger, as determined by X-ray diffractometry.

[B7] The negative electrode material for a nonaqueous secondary battery according to [B5] or [B6], having a Raman $R_1$ value, which is calculated by the following Formula α, of 0.15 or more and 1.00 or less:

[Raman $R_1$ value]=[Intensity $I_B$ of peak $P_B$ near 1,360 cm$^{-1}$]/[Intensity $I_A$ of peak $P_A$ near 1,580 cm$^{-1}$] in Raman spectrum analysis.  Formula α:

[B8] A nonaqueous secondary battery, including the negative electrode material according to any one of [B5] to [B7].

The present inventors intensively studied to achieve the above-described third object and consequently discovered that, by controlling the intraparticle pore volume per coating ratio and the peak of intraparticle voids, a negative electrode material for a nonaqueous secondary battery, with which a nonaqueous secondary battery that exhibits good pressability and limited electrode expansion with respect to the particle hardness can be provided, as well as a negative electrode for a nonaqueous secondary battery, which contains the same, and a negative secondary battery can be obtained, thereby arriving at the present invention.

[C1] A negative electrode material for a nonaqueous secondary battery, comprising a graphite that contains at least either one of an amorphous carbonaceous material and a graphitic material in at least a part of the surface thereof, wherein,
the negative electrode material has a pore distribution with two or more peaks as measured by a mercury intrusion method, and satisfies the following Formulae (1) and (2) when a cumulative pore volume of not larger than a minimal value of a valley between a peak with the smallest pore size and a next peak is defined as y [mL/g] and a coating ratio of the amorphous carbonaceous material and the graphitic material on the graphite surface is defined as x (%), and
the pore size at a peak top of the peak with the smallest pore size is 360 nm or smaller:

$$y>0.005, \text{ and}$$  Formula (1):

$$y<-0.006x+0.12.$$  Formula (2):

[C2] A negative electrode material for a nonaqueous secondary battery, comprising a graphite that contains at least either one of an amorphous carbonaceous material and a graphitic material in at least a part of the surface thereof, wherein
the negative electrode material has a pore distribution with two or more peaks as measured by a mercury intrusion method, and satisfies the following Formulae (1) and (3) when a cumulative pore volume of not larger than a minimal value of a valley between a peak with the smallest pore size and a next peak is defined as y [mL/g] and a coating ratio of the amorphous carbonaceous material and the graphitic material on the graphite surface is defined as x (%):

$$y>0.005, \text{ and}$$  Formula (1):

$$y<-0.006x+0.079.$$  Formula (3):

[C3] The negative electrode material for a nonaqueous secondary battery according to [C1] or [C2], wherein the graphite is a natural graphite.

[C4] The negative electrode material for a nonaqueous secondary battery according to any one of [C1] to [C3], having a true density of 2.20 g/cm$^3$ or higher but lower than 2.262 g/cm$^3$.

[C5] The negative electrode material for a nonaqueous secondary battery according to any one of [C1] to [C4], having a tap density of 0.85 g/cm$^3$ or higher.

[C6] The negative electrode material for a nonaqueous secondary battery according to any one of [C1] to [C5], wherein at least a part of the surface is coated with the amorphous carbonaceous material.

[C7] The negative electrode material for a nonaqueous secondary battery according to any one of [C1] to [C6], comprising spherical graphite particles obtained by a granulation treatment of a flake graphite, a scale-like graphite, and a vein graphite.

[C8] The negative electrode material for a nonaqueous secondary battery according to [C7], wherein the granulation treatment is a treatment of applying a mechanical energy of at least one of impact, compression, friction, and shear force.

[C9] The negative electrode material for a nonaqueous secondary battery according to [C7] or [C8], wherein the granulation treatment is a treatment of performing granulation by applying any one of impact, compression, friction, and shear force to the graphite introduced to the inside of an apparatus which is equipped with a rotary member rotating at a high speed in a casing and includes a rotor having plural blades arranged in the casing, through high-speed rotation of the rotor.

[C10] A negative electrode for a nonaqueous secondary battery, comprising: a current collector; and an active material layer formed on the current collector,
wherein the active material layer comprises the negative electrode material according to any one of [C1] to [C9].

[C11] A nonaqueous secondary battery, comprising: a positive electrode; a negative electrode; and an electrolyte, wherein the negative electrode is the negative electrode for a nonaqueous secondary battery according to [C10].

Effects of the Invention

According to the first mode of the present invention, the followings are provided: a negative electrode material for a nonaqueous secondary battery, with which a nonaqueous secondary battery having a high capacity and excellent rapid charge-discharge characteristics as well as an excellent balance between the low-temperature input-output characteristics and the high-temperature storage characteristics can be provided; a negative electrode for a nonaqueous secondary battery, which contains the same; and a nonaqueous secondary battery.

According to the second mode of the present invention, the followings are provided: a negative electrode raw material for a nonaqueous secondary battery and a negative electrode material for a nonaqueous secondary battery, with which a nonaqueous secondary battery having a high capacity and excellent rapid charge characteristics and exhibiting limited electrode expansion after cycling can be provided; a negative electrode for a nonaqueous secondary battery, which contains the same; and a nonaqueous secondary battery.

According to the third mode of the present invention, the followings are provided: a negative electrode material for a nonaqueous secondary battery, which can be pressed to a high density with a small load with respect to the particle hardness for a high-capacity battery and hardly causes electrode expansion, and with which the capacity of a nonaqueous secondary battery can thus be increased; a negative electrode for a nonaqueous secondary battery, which contains the same; and a negative secondary battery.

MODE FOR CARRYING OUT THE INVENTION

Figure 1:
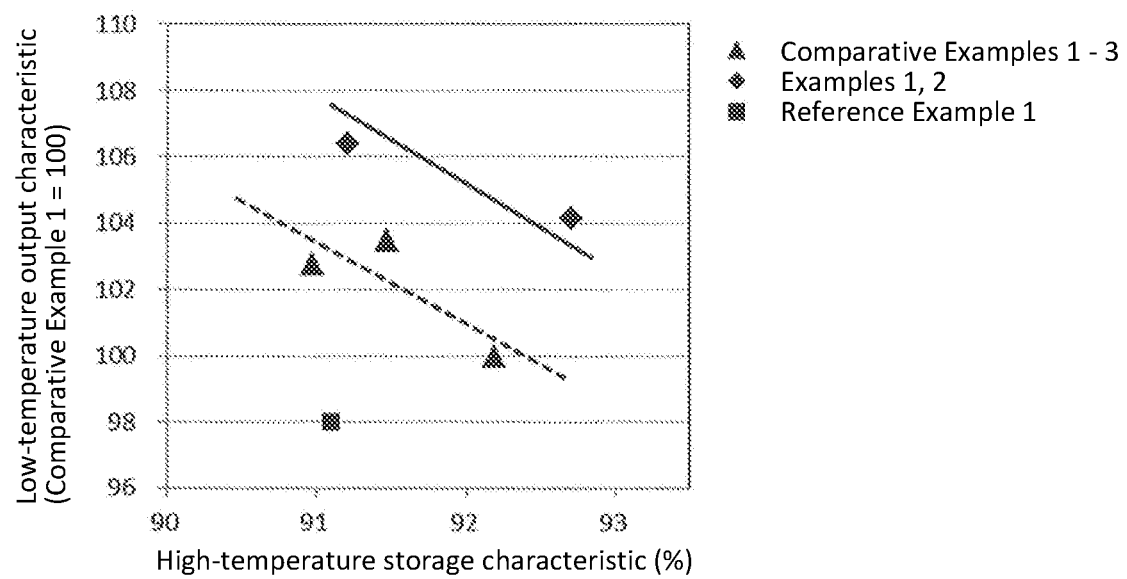
FIG. 1 is a graph showing the relationships between the high-temperature storage characteristics and the low-temperature output characteristics in Examples A1 and A2, Comparative Examples A1 to A3, and Reference Example A1.

The present invention will now be described in detail; however, the present invention is not restricted to the following descriptions, and can be carried out with any modification without departing from the gist of the present invention. It is noted here that, in the present invention, those ranges that are expressed with "to" before and after numerical or physical property values each denote a range that includes the respective numerical or physical property values.

A. First Embodiment

[A1. Negative Electrode Material for Nonaqueous Secondary Battery]

The negative electrode material for a nonaqueous secondary battery according to one embodiment of the present invention (hereinafter, may be simply referred to as "negative electrode material") contains a graphite that contains an amorphous carbonaceous material in at least a part of the surface thereof, has a cumulative pore volume of 0.100 mL/g or less in a pore size range of 0.01 µm or more and 1 µm or less, and satisfies at least one of the following conditions (1) and (2) in a DTA curve obtained by differential thermal analysis (DTA) in an air stream:

(1) the negative electrode material has no exothermic peak in a temperature range of 550° C. or higher and 650° C. or lower; and (2) the negative electrode material has an exothermic peak in a temperature range of 550° C. or higher and 650° C. or lower, and the area of the exothermic peak is larger than 0 µV·s/mg but 90 µV·s/mg or smaller.

The negative electrode material for a nonaqueous secondary battery according to the present embodiment exerts an effect of having a high capacity and excellent rapid charge-discharge characteristics as well as an excellent balance between the low-temperature input-output characteristics and the high-temperature storage characteristics. The reason why the present invention exerts such an effect is not clear; however, it is considered as follows.

In the negative electrode material of the present embodiment, the cumulative pore volume in a pore size range of 0.01 µm to 1 µm serves as an index of the volume of pores existing inside the particles of the negative electrode material. By reducing the cumulative pore volume to a specific range, when an electrode is pressed to a certain density, a relatively large volume of pores between the particles can be ensured as compared to a conventional negative electrode material having a large volume of pores existing inside its particles. It is believed that, as a result, Li ions can move smoothly in the electrode during charging and discharging, so that excellent rapid charge-discharge characteristics and low-temperature input-output characteristics are obtained.

In addition, an amorphous carbonaceous material is generally more combustible than graphite and thus tends to have an exothermic peak at lower temperature than graphite and, particularly, an amorphous carbonaceous material with insufficient development of carbon structure shows this tendency more prominently. In such an amorphous carbonaceous material with insufficient development of carbon structure, since Li ions cannot move smoothly inside the amorphous carbonaceous material, not only the rapid charge-discharge characteristics and the low-temperature input-output characteristics are deteriorated, but also charged Li ions are likely to self-discharge and undergo side reactions with an electrolyte solution on the particle surfaces, as a result of which the high-temperature storage characteristics tend to be deteriorated. Moreover, due to the effects of the irreversible capacity of the amorphous carbonaceous material and an increase in the side reactions with the electrolyte solution, the initial charge-discharge efficiency and the capacity of a battery tend to be reduced.

On the other hand, in the negative electrode material of the present embodiment, by allowing the carbon structure of the amorphous carbonaceous material to develop sufficiently and controlling the amorphous carbonaceous material to have specific thermal properties, Li ions are allowed to move smoothly inside the amorphous carbonaceous material; therefore, the negative electrode material of the present embodiment exhibits excellent charge-discharge characteristics and low-temperature input-output characteristics. In addition, since the self-discharge of charged Li ions and the side reactions of charged Li ions with an electrolyte solution can be inhibited, the negative electrode material of the present embodiment is presumed to exhibit excellent high-temperature storage characteristics. Further, since the effects of the irreversible capacity of the amorphous carbonaceous material and the side reactions with the electrolyte solution are inhibited, the initial charge-discharge efficiency and the capacity of a battery tend to be improved.

The negative electrode material according to another embodiment of the present invention has: a Raman $R_1$ value, which is calculated by the following Formula α, of 0.20 or more and 1.00 or less; a Raman full width at half maximum ($\Delta v_B$) of 65 cm$^{-1}$ or more and 400 cm$^{-1}$ or less; and a cumulative pore volume of 0.100 mL/g or less in a pore size range of 0.01 μm or more and 1 μm or less, and satisfies at least one of the following conditions (1) and (2) in a DTA curve obtained by differential thermal analysis (DTA) in an air stream:

(1) the negative electrode material has no exothermic peak in a temperature range of 550° C. or higher and 650° C. or lower; and
(2) the negative electrode material has an exothermic peak in a temperature range of 550° C. or higher and 650° C. or lower, and the area of the exothermic peak is larger than 0 μV·s/mg but 90 μV·s/mg or smaller,

[Raman $R_1$ value]=[Intensity $I_R$ of peak $P_R$ near 1,360 cm$^{-1}$]/[Intensity $I_A$ of peak $P_A$ near 1,580 cm$^{-1}$] in Raman spectrum analysis.  Formula α:

The negative electrode material for a nonaqueous secondary battery according to the present embodiment exerts an effect of having a high capacity and excellent rapid charge-discharge characteristics as well as an excellent balance between the low-temperature input-output characteristics and the high-temperature storage characteristics. The reason why the present invention exerts such an effect is not clear; however, it is considered as follows.

In the negative electrode material of the present embodiment, the cumulative pore volume in a pore size range of 0.01 μm to 1 μm serves as an index of the volume of pores existing inside the particles of the negative electrode material. By reducing the cumulative pore volume to a specific range, when an electrode is pressed to a certain density, a relatively large volume of pores between the particles can be ensured as compared to a conventional negative electrode material having a large volume of pores existing inside its particles. It is believed that, as a result, Li ions can move smoothly in the electrode during charging and discharging, so that excellent rapid charge-discharge characteristics and low-temperature input-output characteristics are obtained.

In addition, the Raman $R_1$ value and the Raman full width at half maximum ($\Delta v_B$) each serve as an index of the graphite crystallinity of the particle surfaces of the negative electrode material. An increase in these values to specific ranges indicates a reduction in the graphite crystallinity (an increase in the amorphousness) of the particle surfaces of the negative electrode material. It is believed that, by increasing these values to specific ranges, insertion and desorption of Li ions at the particle surfaces of the negative electrode material are facilitated, so that excellent rapid charge-discharge characteristics and low-temperature input-output characteristics are obtained. The graphite crystallinity of the particle surfaces of the negative electrode material can be adjusted by, for example, impregnating the particle surfaces of the negative electrode material at least partially with a carbonaceous material having a low graphite crystallinity.

A carbonaceous material having a low graphite crystallinity is generally more combustible than graphite and thus tends to have an exothermic peak at lower temperature than graphite and, particularly, a carbonaceous material with insufficient development of carbon structure shows this tendency more prominently. In such a carbonaceous material with insufficient development of carbon structure, since Li ions cannot move smoothly inside the carbonaceous material, not only the rapid charge-discharge characteristics and the low-temperature input-output characteristics are deteriorated, but also charged Li ions are likely to self-discharge and undergo side reactions with an electrolyte solution on the particle surfaces, as a result of which the high-temperature storage characteristics tend to be deteriorated. Moreover, due to the effects of the irreversible capacity of the carbonaceous material with insufficient development of carbon structure and an increase in the side reactions with the electrolyte solution, the initial charge-discharge efficiency and the capacity of a battery tend to be reduced.

On the other hand, in the negative electrode material of the present embodiment, by allowing the carbon structure of a carbonaceous material having a low graphite crystallinity to develop sufficiently and controlling the carbonaceous material to have specific thermal properties, Li ions are allowed to move smoothly inside the carbonaceous material having a low graphite crystallinity; therefore, the negative electrode material of the present embodiment exhibits excellent charge-discharge characteristics and low-temperature input-output characteristics. In addition, since the self-discharge of charged Li ions and the side reactions of charged Li ions with an electrolyte solution can be inhibited, the negative electrode material of the present embodiment is presumed to exhibit excellent high-temperature storage characteristics. Further, since the effects of the irreversible capacity of the carbonaceous material having a low graphite crystallinity and the side reactions with the electrolyte solution are inhibited, the initial charge-discharge efficiency and the capacity of a battery tend to be improved.

[A1-1. Physical Properties]

The negative electrode material according to one embodiment of the present invention satisfies the below-described pore volume and thermal properties. The negative electrode material according to one embodiment of the present invention also satisfies the below-described Raman properties. Further, the negative electrode material according to one embodiment of the present invention preferably satisfies the below-described physical properties.

<A1-1-1. Cumulative Pore Volume>

In the negative electrode material according to one embodiment of the present invention, the cumulative pore volume in a range of 0.01 μm or more and 1 μm or less, which is a value determined by a mercury intrusion method (mercury porosimetry), is 0.100 mL/g or less, preferably 0.080 mL/g or less, more preferably 0.070 mL/g or less, still more preferably 0.060 mL/g or less, particularly preferably 0.050 mL/g or less, most preferably 0.030 mL/g or less, but preferably 0.001 mL/g or greater, more preferably 0.002 mL/g or greater, still more preferably 0.005 mL/g or greater, particularly preferably 0.010 mL/g or greater, most preferably 0.020 mL/g or greater. When the cumulative pore volume is outside of this range, since Li ions cannot move smoothly inside an electrode during charging and discharging, the rapid charge-discharge characteristics and the low-temperature input-output characteristics tend to be deteriorated.

As an apparatus for the mercury porosimetry, a mercury porosimeter (AUTOPORE 9520, manufactured by Micromeritics Corporation) can be used. A sample (carbon material) is weighed to a value of about 0.2 g and enclosed in a powder cell, and a pretreatment is performed by evacuating the cell at room temperature under vacuum (50 μmHg or lower) for 10 minutes. Subsequently, mercury is introduced into the cell under a reduced pressure of 4 psia (about 28 kPa), and the pressure is increased stepwise from 4 psia (about 28 kPa) to 40,000 psia (about 280 MPa) and then reduced to 25 psia (about 170 kPa). The number of steps in the pressure increase is at least 80 and, in each step, the mercury intrusion volume is measured after an equilibration time of 10 seconds. From a mercury intrusion curve obtained in this manner, the pore distribution is calculated using the Washburn equation. This calculation is performed assuming that mercury has a surface tension ($\gamma$) of 485 dyne/cm and a contact angle ($\psi$) of 140°. The average pore size is defined as a pore size at a cumulative pore volume of 50%.

<A1-1-2. Thermal Properties>

The negative electrode material according to one embodiment of the present invention satisfies at least one of the following conditions (1) and (2) in a DTA curve obtained by differential thermal analysis (DTA) in an air stream. In addition, the negative electrode material according to one embodiment of the present invention preferably satisfies the condition (3) in the above-described DTA curve, and preferably further satisfies the condition (4):

(1) the negative electrode material has no exothermic peak in a temperature range of 550° C. or higher and 650° C. or lower;
(2) the negative electrode material has an exothermic peak in a temperature range of 550° C. or higher and 650° C. or lower, and the area of the exothermic peak is larger than 0 μV·s/mg but 90 μV·s/mg or smaller;
(3) the negative electrode material has a heat generation start temperature in a temperature range of 550° C. or higher and 750° C. or lower; and
(4) the negative electrode material has an exothermic peak in a temperature range of higher than 650° C. but 1,000° C. or lower.

The exothermic peaks in the above-described temperature ranges refer to exothermic peaks having a peak top in the respective temperature ranges. A peak derived from amorphous carbon in the above-described DTA curve usually exists at 550° C. or higher, and satisfaction of at least one of the conditions (1) and (2) means that the carbon structure of the amorphous carbonaceous material has been developed sufficiently and exists in a more thermally stable state. By satisfying at least one of the conditions (1) and (2), Li ions are allowed to move smoothly inside the amorphous carbonaceous material; therefore, the negative electrode material exhibits excellent rapid charge-discharge characteristics and low-temperature input-output characteristics. In addition, since self-discharge of charged Li ions and side reactions of charged Li ions with an electrolyte solution can be inhibited, the negative electrode material exhibits excellent high-temperature storage characteristics. As a result, excellent rapid charge-discharge characteristics as well as a good balance between the low-temperature input-output characteristics and the high-temperature storage characteristics are attained. The term "exothermic peak" used in the conditions (1) and (2) means a peak top of an exothermic peak, and the term "area of the exothermic peak" used in the condition (2) means the area of the whole exothermic peak not limited to a temperature range of 550° C. or higher and 650° C. or lower.

In the negative electrode material according to one embodiment of the present invention, the area of the exothermic peak in a temperature range of 550° C. or higher and 650° C. or lower on the DTA curve obtained by differential thermal analysis in an air stream is preferably 90 μV·s/mg or smaller, more preferably 70 μV·s/mg or smaller, still more preferably 50 μV·s/mg or smaller, particularly preferably 30 μV·s/mg or smaller, most preferably 10 μV·s/mg or smaller, and ideally 0 μV·s/mg.

In the negative electrode material according to one embodiment of the present invention, satisfaction of the condition (3) in addition to at least one of the conditions (1) and (2) means that the carbon structure of the amorphous carbonaceous material has been further developed and exists in a more thermally stable state. By satisfying the condition (3) in addition to at least one of the conditions (1) and (2), Li ions are allowed to move more smoothly inside the amorphous carbonaceous material. In addition, since self-discharge of charged Li ions and side reactions of charged Li ions with an electrolyte solution can be further inhibited, superior rapid charge-discharge characteristics as well as a further improved balance between the low-temperature input-output characteristics and the high-temperature storage characteristics are attained, which is preferred.

In the negative electrode material according to one embodiment of the present invention, the condition (3) represents a preferred range with regard to the start temperature of a peak that exists in the DTA curve because of the development of the carbon structure of the amorphous carbonaceous material. In the negative electrode material according to one embodiment of the present invention, the heat generation start temperature in the DTA curve obtained by differential thermal analysis in an air stream is preferably 550° C. or higher, more preferably 570° C. or higher, still more preferably 590° C. or higher, particularly preferably 600° C. or higher, most preferably 620° C. or higher, but preferably 750° C. or lower, more preferably 720° C. or lower, still more preferably 700° C. or lower, particularly preferably 680° C. or lower, most preferably 670° C. or lower.

In the negative electrode material according to one embodiment of the present invention, further satisfaction of the condition (4) means that the carbon structure of the amorphous carbonaceous material is controlled not to excessively develop such that the amount of Li-ion insertion/desorption sites is not reduced too much. By further satisfying the condition (4), the negative electrode material is provided with an appropriate amount of Li-ion insertion/desorption sites and has good rapid charge-discharge characteristics and low-temperature input-output characteristics, which is preferred. It is noted here that, in the above-described DTA curve, the exothermic peak in a temperature range of higher than 650° C. but 1,000° C. or lower includes a graphite-derived exothermic peak in addition to an amorphous carbonaceous material-derived exothermic peak and, therefore, appears as a sum of these exothermic peaks.

The negative electrode material according to one embodiment of the present invention preferably has an exothermic peak in a specific range in the DTA curve obtained by differential thermal analysis (DTA) in an air stream. This temperature range is preferably higher than 650° C., more preferably 700° C. or higher, still more preferably 750° C. or higher, particularly preferably 800° C. or higher, but preferably 1,000° C. or lower, more preferably 900° C. or lower, still more preferably 850° C. or lower, particularly preferably 830° C. or lower.

The DTA curve obtained by differential thermal analysis in an air stream can be measured using a thermogravimetric-differential thermal analyzer (TG-DTA) manufactured by Hitachi High-Tech Science Corporation. Specifically, the DTA curve can be measured by loading 15 mg of a sample to a sample container made of alumina and heating the sample from room temperature to 1,000° C. at a heating rate of 5° C./min in an air stream having a flow rate of 200 ml/min.

<A1-1-3. Raman Properties (Raman $R_1$ Value, Raman Full Width at Half Maximum $\Delta v_B$ ($cm^{-1}$), Raman $R_2$ Value, and Raman $R_3$ Value)>

(Raman $R_1$ Value)

As in the following Formula α, the term "Raman $R_1$ value" used herein is defined as an intensity ratio ($I_B/I_A$) of the intensity $I_A$ of a peak $P_A$ near 1,580 $cm^{-1}$ and the intensity $I_B$ of a peak $P_B$ near 1,360 $cm^{-1}$ in a Raman spectrum obtained for a negative electrode material by Raman spectroscopy. It is noted here that "near 1,580 $cm^{-1}$" refers to a range of 1,580 to 1,620 $cm^{-1}$, and "near 1,360 $cm^{-1}$" refers to a range of 1,350 to 1,370 $cm^{-1}$.

[Raman $R_1$ value]=[Intensity $I_B$ of peak $P_B$ near 1,360 $cm^{-1}$]/[Intensity $I_A$ of peak $P_A$ near 1,580 $cm^{-1}$] in Raman spectrum analysis       Formula α:

The term "Raman full width at half maximum $\Delta v_B$ ($cm^{-1}$)" used herein is defined as a full width at half maximum of a peak $P_B$ near 1,360 $cm^{-1}$ in a Raman spectrum obtained for a negative electrode material by Raman spectroscopy. It is noted here that "near 1,360 $cm^{-1}$" refers to a range of 1,350 to 1,370 $cm^{-1}$.

As in the following Formula β, the term "Raman $R_2$ value" used herein is defined as an intensity ratio ($I_C/I_A$) of the intensity $I_A$ of a peak $P_A$ near 1,580 $cm^{-1}$ and the intensity $I_C$ of a valley (minimal value) between the peak $P_A$ near 1,580 $cm^{-1}$ and a peak $P_B$ near 1,360 $cm^{-1}$ in a Raman spectrum obtained for a negative electrode material by Raman spectroscopy. It is noted here that "near 1,580 $cm^{-1}$" refers to a range of 1,580 to 1,620 $cm^{-1}$, and "near 1,360 $cm^{-1}$" refers to a range of 1,350 to 1,370 $cm^{-1}$.

[Raman $R_2$ value]=[Intensity $I_C$ of valley (minimal value) between peak $P_A$ near 1,580 $cm^{-1}$ and peak $P_B$ near 1,360 $cm^{-1}$]/[Intensity $I_A$ of peak $P_A$ near 1,580 $cm^{-1}$] in Raman spectrum analysis       Formula β:

As in the following Formula γ, the term "Raman $R_3$ value" used in one embodiment of the present invention is defined as an intensity ratio ($I_C/I_B$) of the intensity $I_B$ of a peak $P_B$ near 1,360 $cm^{-1}$ and the intensity $I_C$ of a valley (minimal value) between a peak $P_A$ near 1,580 $cm^{-1}$ and the peak $P_B$ near 1,360 $cm^{-1}$ in a Raman spectrum obtained for a negative electrode material by Raman spectroscopy. It is noted here that "near 1,580 $cm^{-1}$" refers to a range of 1,580 to 1,620 $cm^{-1}$, and "near 1,360 $cm^{-1}$" refers to a range of 1,350 to 1,370 $cm^{-1}$.

[Raman $R_3$ value]=[Intensity $I_C$ of valley (minimal value) between peak $P_A$ near 1,580 $cm^{-1}$ and peak $P_B$ near 1,360 $cm^{-1}$]/[Intensity $I_B$ of peak $P_B$ near 1,360 $cm^{-1}$] in Raman spectrum analysis       Formula γ:

The Raman $R_1$ value of the negative electrode material according to one embodiment of the present invention is usually 0.15 or larger, preferably 0.20 or larger, more preferably 0.25 or larger, still more preferably 0.30 or larger, particularly preferably 0.32 or larger, most preferably 0.35 or larger, but usually 1.00 or less, preferably 0.80 or less, more preferably 0.70 or less, still more preferably 0.65 or less, particularly preferably 0.50 or less.

The Raman full width at half maximum ($\Delta v_B$) of the negative electrode material according to one embodiment of the present invention is usually 65 $cm^{-1}$ or larger, preferably 70 $cm^{-1}$ or larger, more preferably 80 $cm^{-1}$ or larger, still more preferably 85 $cm^{-1}$ or larger, particularly preferably 90 $cm^{-1}$ or larger, most preferably 100 $cm^{-1}$ or larger, but usually 400 $cm^{-1}$ or less, preferably 300 $cm^{-1}$ or less, more preferably 250 $cm^{-1}$ or less, still more preferably 200 $cm^{-1}$ or less, particularly preferably 170 $cm^{-1}$ or less, most preferably 145 $cm^{-1}$ or less.

The Raman $R_2$ value of the negative electrode material according to one embodiment of the present invention is preferably 0.03 or larger, more preferably 0.05 or larger, still more preferably 0.07 or larger, particularly preferably 0.09 or larger, most preferably 0.11 or larger, but usually 0.60 or less, preferably 0.40 or less, more preferably 0.30 or less, still more preferably 0.25 or less, particularly preferably 0.22 or less.

The Raman $R_3$ value of the negative electrode material according to the second embodiment of the present invention is preferably 0.10 or larger, more preferably 0.15 or larger, still more preferably 0.20 or larger, particularly preferably 0.25 or larger, most preferably 0.30 or larger, but usually 1.00 or less, preferably 0.80 or less, more preferably 0.70 or less, still more preferably 0.60 or less, particularly preferably 0.45 or less.

These Raman properties each serve as an index of the graphite crystallinity of the particle surfaces of the negative electrode material, and an increase in these values indicates a reduction in the graphite crystallinity (an increase in the amorphousness) of the particle surfaces of the negative electrode material. The Raman $R_1$ value ($I_B/I_A$) is affected by not only the graphitization degree (completeness of graphite structure) but also the ratio of edges and crystal boundaries of the graphite crystal surface, and the graphitization degree and the ratio of edges and crystal boundaries tend to be increased as the Raman $R_1$ value increases. Accordingly, the Raman $R_1$ value may be large not only when the particle surfaces partially contain the amorphous carbonaceous material but also when the edge ratio is increased by, for example, pulverization of the graphite in a cleaving manner. Meanwhile, for the Raman full width at half maximum ($\Delta v_B$), the effect of the ratio of edges and crystal boundaries of the graphite crystal surface is relatively small, and the effect of the graphitization degree (completeness of graphite structure) tends to be reflected more prominently. Accordingly, although the Raman full width at half maximum ($\Delta v_B$) tends to be increased when the particle surfaces partially contain the amorphous carbonaceous material, a change associated with an increase in the edge ratio caused by pulverization or the like tends to be relatively small. Further, the intensity $I_C$ of a valley (minimal value) between a peak $P_A$ near 1,580 $cm^{-1}$ and a peak $P_D$ near 1,360 $cm^{-1}$ is said to be attributable to defects in the graphite crystal structure and the SP3 property in the amorphous carbon structure, and the Raman $R_2$ value ($I_C/I_A$) and the Raman $R_3$ value($I_C/I_B$) tend to reflect the graphitization degree (completeness of local graphite structure) more prominently. Accordingly, the Raman R, value ($I_C/I_A$) and the Raman $R_3$ value($I_C/I_B$) tend to be increased when the particle surfaces partially contain the amorphous carbonaceous material; however, a change associated with an increase in the edge ratio caused by pulverization or the like tends to be relatively small.

When the parameter values of these Raman properties are equal to or larger than the above-described respective lower limit values, it is indicated that the amorphousness of the surface of the negative electrode material is in an appropriate range and, since insertion and desorption of Li ions are facilitated, the low-temperature input-output characteristics tend to be improved. On the other hand, when the parameters of these Raman properties are equal to or smaller than the above-described respective upper limit values, since an increase in the effect of the irreversible capacity of highly amorphous carbon and an increase in the side reactions of such carbon with an electrolyte solution are inhibited, a reduction in the initial charge-discharge efficiency of a lithium ion secondary battery and an increase in gas generation are prevented, so that the battery capacity tends to be improved.

The Raman spectrum is measured using a Raman spectroscope. Specifically, a sample is loaded by letting the particles to be measured free-fall into a measuring cell, and the measurement is performed while irradiating an argon-ion laser beam into the measuring cell and rotating the measuring cell in a plane perpendicular to the laser beam.

Wavelength of argon-ion laser beam: 514.5 nm
  Laser power on sample: 25 mW
  Resolution: 4 $cm^{-1}$
  Measurement range: 1,100 $cm^{-1}$ to 1,730 $cm^{-1}$
  Measurement of peak intensity and measurement of peak full-width at half maximum: background processing, smoothing (convolution by simple average, 5 points)

<A1-1-4. BET Specific Surface Area (SA)>

The negative electrode material according to one embodiment of the present invention has a specific surface area (SA), which is determined by a BET method, of preferably 0.5 $m^2/g$ or larger, more preferably 1.0 $m^2/g$ or larger, still more preferably 1.5 $m^2/g$ or larger, particularly preferably 2.0 $m^2/g$ or larger, but preferably 10.0 $m^2/g$ or smaller, more preferably 6.5 $m^2/g$ or smaller, still more preferably 5.0 $m^2/g$ or smaller, particularly preferably 4.0 $m^2/g$ or smaller. When the SA is equal to or larger than the above-described lower limit value, sites for entry and exit of Li ions are secured, so that the rapid charge-discharge characteristics and the low-temperature input-output characteristics of a lithium ion secondary battery tend to be improved. Meanwhile, when the SA is equal to or smaller than the above-described upper limit value, since the activity of an active material against an electrolyte solution is prevented from being excessively high, side reactions of the active material with an electrolyte solution are inhibited and a reduction in the battery initial charge-discharge efficiency and an increase in gas generation are prevented, so that the battery capacity tends to be improved.

The BET specific surface area (SA) can be measured using MACSORB manufactured by Mountech Co., Ltd. Specifically, a sample is preliminarily vacuum-dried at 100° C. for 3 hours in a nitrogen stream and subsequently cooled to the liquid nitrogen temperature, and the measurement can be performed by a gas-flowing nitrogen adsorption single-point BET method using a nitrogen-helium mixed gas precisely adjusted to have a relative nitrogen pressure value of 0.3 with respect to the atmospheric pressure.

<A1-1-5. Tap Density>

The negative electrode material according to one embodiment of the present invention has a tap density ($g/cm^3$) of preferably 0.60 $g/cm^3$ or higher, more preferably 0.80 $g/cm^3$ or higher, still more preferably 1.00 $g/cm^3$ or higher, particularly preferably 1.10 $g/cm^3$ or higher, most preferably 1.15 $g/cm^3$ or higher, but preferably 1.40 $g/cm^3$ or lower, more preferably 1.35 $g/cm^3$ or lower, still more preferably 1.30 $g/cm^3$ or lower, particularly preferably 1.25 $g/cm^3$ or lower. When the tap density is equal to or higher than the above-described lower limit, since the processability such as streaking in the electrode production is favorable and the packing property of a negative electrode material layer is improved, a high-density negative electrode sheet with favorable rollability is likely to be formed and the density thereof can be improved, so that not only the degree of inflection of Li ion migration pathways is reduced when such an electrode sheet is made into an electrode body, but also the shapes of interparticle voids are well-controlled and an electrolyte solution is thus allowed to move smoothly, as a result of which the rapid charge-discharge characteristics are improved, which is preferred. Meanwhile, when the tap density is equal to or lower than the above-described upper limit value, the particles have an appropriate amount of space on the surface and inside and are thus prevented from being excessively hard, so that not only excellent electrode pressability but also excellent low-temperature input-output characteristics and rapid charge-discharge characteristics are obtained, which is preferred.

The tap density is measured using a powder density meter TAP DENSER KYT-3000 (manufactured by Seishin Enterprise Co., Ltd.). Specifically, after filling up a 20-cc tap cell with a sample by dropping the sample thereto, the cell is tapped 1,000 times with a stroke length of 10 mm, and the density measured at this point is defined as the tap density.

<A1-1-6. Interplanar Spacing (d002) and Crystallite Size (Lc)>

With regard to the crystallinity (graphitization degree), the negative electrode material according to one embodiment of the present invention has a (002)-plane interplanar spacing (d002) of preferably 0.340 nm or smaller and a crystallite size in the c-axis direction (Lc) of preferably 90 nm or larger, as determined by wide-angle X-ray diffractometry according to the method of the Japan Society for the Promotion of Science. The d002 is more preferably 0.338 nm or smaller, still more preferably 0.337 nm or smaller. Further, the Lc is more preferably 95 nm or larger, still more preferably 100 nm or larger. When the d002 and the Lc are in the above-described respective ranges, the discharge capacity is increased, which is preferred from the standpoint of increasing the battery capacity.

<A1-1-7. Circularity>

The negative electrode material according to one embodiment of the present invention has a circularity, which is determined by a flow-type particle image analysis, of preferably 0.88 or higher, more preferably 0.90 or higher, still more preferably 0.91 or higher, particularly preferably 0.92 or higher, most preferably 0.93 or higher. When the negative electrode material has a high circularity in this manner, the degree of inflection of Li ion diffusion is reduced and an electrolyte solution moves smoothly in interparticle voids, so that the rapid charge-discharge characteristics can be improved, which is preferred. Meanwhile, since the theoretical upper limit of the circularity is 1, the circularity is usually lower than 1, preferably 0.99 or lower, more preferably 0.98 or lower, still more preferably 0.97 or lower. From the standpoint of ensuring contact between the resulting negative electrode materials and thereby improving the cycle characteristics, the circularity is preferably not higher than the above-described upper limit.

The circularity is determined by measuring the particle size distribution based on the equivalent circle diameter using a flow-type particle image analyzer (FPIA-2000, manufactured by Toa Medical Electronics, Ltd.), and calculating the average circularity. The circularity is defined by the following equation, and a circularity value of 1 represents a theoretical true sphere:

[Circularity]=[Circumferential length of equivalent circle having the same area as projected particle shape]/[Actual circumferential length of projected particle shape]

In the measurement of the circularity, ion exchanged water and polyoxyethylene (20) monolaurate are used as a dispersion medium and a surfactant, respectively. The term "equivalent circle diameter" refers to the diameter of a circle (equivalent circle) having the same projected area as that of a captured particle image, and the term "circularity" refers to a ratio calculated by taking the circumferential length of the equivalent circle as the numerator and that of a captured projection image of a particle as the denominator. The circularity values of particles having a measured equivalent diameter in a range of 1.5 µm to 40 µm are averaged, and the thus obtained value is defined as the circularity.

<A1-1-8. Volume-Based Average Particle Size (Average Particle Size d50)>

The negative electrode material according to one embodiment of the present invention has a volume-based average particle size (hereinafter, also referred to as "average particle size d50") of preferably 1 µm or larger, more preferably 3 µm or larger, still more preferably 4 µm or larger, particularly preferably 5 µm or larger, but preferably 50 µm or smaller, more preferably 40 µm or smaller, still more preferably 30 µm or smaller, particularly preferably 25 µm or smaller, most preferably 20 µm or smaller. When the d50 value is equal to or larger than the above-described lower limit value, an increase in the irreversible capacity and a loss of the initial battery capacity tend to be inhibited, while when the d50 value is equal to or smaller than the above-described upper limit value, the occurrence of a process defect such as streaking in slurry application is inhibited, so that the rapid charge-discharge characteristics and the low-temperature input-output characteristics tend to be improved.

The average particle size (d50) is defined as a volume-based median diameter determined by suspending 0.01 g of composite particles in 10 mL of a 0.2%-by-weight aqueous solution of polyoxyethylene sorbitan monolaurate (e.g., TWEEN 20 (registered trademark)) which is a surfactant, introducing the resulting suspension as a measurement sample into a commercially available laser diffraction-scattering particle size distribution analyzer (e.g., LA-920 manufactured by HORIBA, Ltd.), irradiating the measurement sample with 28-kHz ultrasonic wave for 1 minute at an output of 60 W, and then performing a measurement using the analyzer.

[A1-2. Production Method]

A method of producing the negative electrode material for a nonaqueous secondary battery according to one embodiment of the present invention is not particularly restricted as long as it is a method by which a negative electrode material can be produced in such a manner that it contains a graphite containing amorphous carbon in at least a part of the surface or satisfies specific Raman properties (Raman $R_1$ value and Raman full width at half maximum ($\Delta v_B$)), and satisfies the above-described pore volume and thermal properties. The negative electrode material according to one embodiment of the present invention can be produced by, for example, performing a press treatment on a spherical graphite obtained by a spheroidization treatment, mixing this spherical graphite with an amorphous carbon precursor (raw material of amorphous carbon), and firing the resultant. The press treatment may be, for example, an anisotropic press treatment or an isotropic press treatment, and an isotropic press treatment is preferred from the standpoint of controlling the above-described pore volume and the thermal properties to be in the specific ranges. The conditions of the press treatment are not particularly restricted; however, the pore volume and the thermal properties can be controlled to be in the specific ranges by performing the treatment at 50 MPa or more and 300 MPa or less. As a condition of the press treatment, from the standpoint of controlling the pore volume and the thermal properties to be in the specific ranges, the press treatment is performed at preferably 100 MPa or higher, more preferably 120 MPa or higher, still more preferably 140 MPa or higher, particularly preferably 160 MPa or higher, most preferably 180 MPa or higher, but preferably 280 MPa or lower, more preferably 260 MPa or lower, still more preferably 240 MPa or lower, particularly preferably 230 MPa or lower, most preferably 220 MPa or lower. The above-described production method is preferred because, specifically, the press treatment enables to adjust the graphite containing amorphous carbon in at least a part of the surface to have a pore volume in the specific range, and the pore volume and the thermal properties of the resulting negative electrode material can be adjusted to be in the specific ranges by performing the firing with the use of an amorphous carbon precursor, which has a low ash content, a low metal impurity content, a low quinoline-insoluble content (Qi) and the like, in an inert atmosphere at an appropriate firing temperature in a manner suitable for the development of a carbon structure.

<A1-2-1. Graphite>

The negative electrode material according to one embodiment of the present invention contains a graphite. The graphite used for producing the negative electrode material according to one embodiment of the present invention is preferably of the below-described type exhibiting the below-described physical properties. It is noted here that, unless otherwise specified, the measurement conditions and the definitions of the physical properties of the graphite are the same as those described above for the negative electrode material.

The type of the graphite is not particularly restricted as long as the graphite is capable of occluding and releasing lithium ions, and the graphite may be either a natural graphite or an artificial graphite. The natural graphite may be, for example, a flake graphite, a vein graphite or an amorphous graphite, and the natural graphite preferably has a low impurity content and is, as required, subjected to a known purification treatment before use. Examples of the artificial graphite include those produced by firing and graphitizing an organic compound, such as a coal-tar pitch, a coal-based heavy oil, an atmospheric residue oil, a petroleum-based heavy oil, an aromatic hydrocarbon, a nitrogen-containing cyclic compound, a sulfur-containing cyclic compound, a polyphenylene, a polyvinyl chloride, a polyvinyl alcohol, a polyacrylonitrile, a polyvinyl butyral, a natural polymer, a polyphenylene sulfide, a polyphenylene oxide, a furfuryl alcohol resin, a phenol-formaldehyde resin or an imide resin, at a temperature in a range of usually 2,500° C. to 3,200° C. In this process, a silicon-containing compound, a boron-containing compound or the like can also be used as a graphitization catalyst.

As for the crystallinity (graphitization degree) of the graphite, the (002)-plane interplanar spacing (d002) determined by wide-angle X-ray diffractometry is usually 0.335 nm or larger but smaller than 0.340 nm. The d002 value is preferably 0.338 nm or smaller, more preferably 0.337 nm or smaller, still more preferably 0.336 nm or smaller.

As for the shape of the graphite, from the standpoint of the rapid charge-discharge characteristics, the graphite is particularly preferably a spherical graphite (spheroidized graphite). As for a method of spheroidizing graphite particles, spheroidized graphite particles can be produced by performing a spheroidization treatment using a known technology. For example, an apparatus which repeatedly applies mechanical actions, such as compression, friction and shear force, including particle interactions, to particles mainly through impact force, can be used. Specifically, it is preferred to use an apparatus which is equipped with a rotor having a large number of blades inside a casing and performs a surface treatment by rotating the rotor at a high speed and thereby applying mechanical actions, such as impact compression, friction and shear force, to a carbon material introduced to the inside. Further, an apparatus which has a mechanism for repeatedly applying mechanical actions by circulating graphite particles is preferred. Specific examples of such an apparatus include Hybridization System (manufactured by Nara Machinery Co., Ltd.), KRYPTRON (manufactured by EarthTechnica Co., Ltd.), CF Mill (manufactured by UBE Industries, Ltd.), MECHANO FUSION System (manufactured by Hosokawa Micron Group), and THETA COMPOSER (manufactured by Tokuju Co., Ltd.). Thereamong, Hybridization System manufactured by Nara Machinery Co., Ltd. is preferred. For example, when a treatment is performed using any of the above-described apparatuses, the peripheral speed of the rotating rotor is set at, but not particularly limited to, preferably 30 m/sec to 100 m/sec, more preferably 40 m/sec to 100 m/sec, still more preferably 50 m/sec to 100 m/sec. The treatment can also be performed by simply passing a carbonaceous material through the apparatus; however, it is preferred to perform the treatment by circulating or retaining the carbonaceous material in the apparatus for 30 seconds or longer, and it is more preferred to perform the treatment by circulating or retaining the carbonaceous material in the apparatus for 1 minute or longer. Alternatively, a spherical graphite obtained by granulating plural flake or scale-like graphites and a graphite such as ground graphite fine powder using a granulating agent in accordance with the method disclosed in Patent Document 4 may be used as well.

(A1-2-1-1. Circularity)

The graphite used as a raw material of the negative electrode material according to one embodiment of the present invention has a circularity, which is determined by a flow-type particle image analysis, of preferably 0.88 or higher, more preferably 0.90 or higher, still more preferably 0.91 or higher, particularly preferably 0.92 or higher, most preferably 0.93 or higher. When the graphite has a high circularity in this manner, the negative electrode material produced using the graphite has a reduced degree of inflection of Li ion diffusion and an electrolyte solution moves smoothly in interparticle voids, so that the rapid charge-discharge characteristics can be improved, which is preferred. Meanwhile, since the theoretical upper limit of the circularity is 1, the circularity is usually lower than 1, preferably 0.99 or lower, more preferably 0.98 or lower, still more preferably 0.97 or lower. From the standpoint of ensuring contact between the resulting negative electrode materials and thereby improving the cycle characteristics, the circularity is preferably not higher than the above-described upper limit.

The circularity is determined by measuring the particle size distribution based on the equivalent circle diameter using a flow-type particle image analyzer (FPIA-2000, manufactured by Toa Medical Electronics, Ltd.), and calculating the average circularity. The circularity is defined by the following equation, and a circularity value of 1 represents a theoretical true sphere:

[Circularity]=[Circumferential length of equivalent circle having the same area as projected particle shape]/[Actual circumferential length of projected particle shape]

In the measurement of the circularity, ion exchanged water and polyoxyethylene (20) monolaurate are used as a dispersion medium and a surfactant, respectively. The term "equivalent circle diameter" refers to the diameter of a circle (equivalent circle) having the same projected area as that of a captured particle image, and the term "circularity" refers to a ratio calculated by taking the circumferential length of the equivalent circle as the numerator and that of a captured projection image of a particle as the denominator. The circularity values of particles having a measured equivalent diameter in a range of 1.5 to 40 μm are averaged, and the thus obtained value is defined as the circularity.

(A1-2-1-2. Tap Density)

The graphite has a tap density of preferably 0.60 g/cm$^3$ or higher, more preferably 0.70 g/cm$^3$ or higher, still more preferably 0.80 g/cm$^3$ or higher, particularly preferably 0.855/cm$^3$ or higher, most preferably 0.90 g/cm$^3$ or higher, but usually 1.40 g/cm$^3$ or lower, preferably 1.30 g/cm$^3$ or lower, more preferably 1.20 g/cm$^3$ or lower.

(A1-2-1-3. Volume-Based Average Particle Size)

The volume-based average particle size (D50) of the graphite is not particularly restricted; however, it is usually 1 μm or larger, preferably 3 μm or larger, more preferably 5 μm or larger, but usually 50 μm or smaller, preferably 40 μm or smaller, more preferably 30 μm or smaller.

(A1-2-1-4. BET Specific Surface Area)

The BET specific surface area of the graphite is not particularly restricted; however, it is usually 1.0 m$^2$/g or larger, preferably 1.5 m$^2$/g or larger, more preferably 2.0 m$^2$/g or larger, still more preferably 3.0 m$^2$/g or larger, particularly preferably 4.5 m$^2$/g or larger, most preferably 5.0 m$^2$/g or larger, but usually 30.0 m$^2$/g or smaller, preferably 20.0 m$^2$/g or smaller, more preferably 10.0 m$^2$/g or smaller.

(A1-2-1-5. Raman $R_1$ Value)

The Raman $R_1$ value of the graphite, which is represented by the following Formula α, is not particularly restricted; however, it is preferably 0.10 or more and 1.00 or less. The Raman $R_1$ value is more preferably 0.15 or larger, still more preferably 0.20 or larger, particularly preferably 0.25 or larger, but more preferably 0.80 or smaller, still more preferably 0.60 or smaller.

Raman $R_1$ value=(Intensity $I_B$ of peak $P_B$ near 1,360 cm$^{-1}$)/(Intensity $I_A$ of peak $P_A$ near 1,580 cm$^{-1}$) in Raman spectrum analysis     Formula α:

<A1-2-2. Press Treatment of Graphite>

The production of the negative electrode material according to one embodiment of the present invention preferably includes the step of pressing a graphite. A method for pressing a graphite is not particularly restricted as long as a pressure can be applied, and examples thereof include: a hydrostatic isotropic press treatment in which a raw material graphite is placed in a container such as a rubber mold, and water is used as a pressurizing medium; and a pneumatic isotropic press treatment using a gas, such as air, as a pressurizing medium. The press treatment may also be performed by filling the raw material graphite into a mold and subsequently pressing the raw material graphite in a certain direction using a single-screw press.

The pressure of the pressurizing medium used in the press treatment of the graphite is preferably in a range of 5 to 400 MPa, more preferably in a range of 30 to 350 MPa, still more preferably in a range of 50 to 300 MPa. When the pressure is equal to or higher than the above-described lower limit value, the pore volume can be controlled in a smaller range. Meanwhile, when the pressure is equal to or lower than the above-described upper limit value, an increase in the specific surface area of the resulting negative electrode material is likely to be inhibited.

<A1-2-3. Amorphous Carbon Integration of Graphite>

The negative electrode material according to one embodiment of the present invention contains a graphite that contains amorphous carbon in at least a part of the surface. A treatment for this amorphous carbon integration is performed by mixing and firing a graphite with an amorphous carbon precursor (a raw material of amorphous carbon). By performing the amorphous carbon integration of the graphite under appropriate conditions, not only the above-described thermal properties are satisfied, but also the pore volume is likely to be controlled in the above-described range.

The amorphous carbon precursor is not particularly restricted, and examples thereof include organic materials, for example, tars, pitches, aromatic hydrocarbons such as naphthalene, anthracene, and derivatives thereof, and thermoplastic polymers such as phenolic resins and polyvinyl alcohols. These organic precursors may be used singly, or two or more thereof may be used in combination. Theramong, from the standpoint of facilitating the development of carbon structure, the amorphous carbon precursor is preferably a tar, a pitch, or an aromatic hydrocarbon.

The ash content in the amorphous carbon precursor is preferably 1% by weight or less, more preferably 0.5% by weight or less, still more preferably 0.1% by weight or less, with respect to a total weight of the amorphous carbon precursor. A lower limit of the ash content is usually not less than 0.1 ppm by weight. When the ash content in the amorphous carbon precursor is in this range, the above-described thermal properties are likely to be satisfied.

In the present specification, the amount of metal impurities contained in the amorphous carbon precursor is defined as a value obtained by dividing a total content of Fe, Al, Si and Ca with respect to a total weight of the amorphous carbon precursor by a residual carbon ratio. The amount of metal impurities contained in the amorphous carbon precursor is preferably 1,000 ppm by weight or less, more preferably 400 ppm by weight or less, still more preferably 100 ppm by weight or less, particularly preferably 50 ppm by weight or less, but usually 0.1 ppm by weight or more, with respect to a total weight of the amorphous carbon precursor. When the amount of metal impurities contained in the amorphous carbon precursor is in this range, the above-described thermal properties are likely to be satisfied.

The quinoline-insoluble content (Qi) in the amorphous carbon precursor is preferably 5% by weight or less, more preferably 2% by weight or less, still more preferably 1% by weight or less, particularly preferably 0.5% by weight or less, most preferably 0.1% by weight or less, with respect to a total weight of the amorphous carbon precursor. When the quinoline-insoluble content (Qi) in the amorphous carbon precursor is in this range, the above-described thermal properties are likely to be satisfied.

The graphite and the amorphous carbon precursor are mixed and subsequently fired. The firing temperature is preferably 950° C. or higher, more preferably 1,000° C. or higher, still more preferably 1,050° C. or higher, particularly preferably 1,100° C. or higher, most preferably 1,150° C. or higher, but preferably 2,000° C. or lower, more preferably 1,800° C. or lower, still more preferably 1,600° C. or lower, particularly preferably 1,500° C. or lower. The firing time is preferably 0.5 hours or longer, more preferably 1 hour or longer, but preferably 1,000 hours or shorter, more preferably 500 hours or shorter, still more preferably 100 hours or shorter. When the firing temperature and the firing time are in these respective ranges, the above-described thermal properties are likely to be satisfied.

The firing is preferably performed in an inert atmosphere. Specifically, for example, a method of reducing the oxygen concentration by circulating an inert gas such as nitrogen or argon, a method of discharging oxygen out of the system by decompression and subsequently restoring the pressure with nitrogen or argon, or a method of reducing the amount of oxygen contained in the atmosphere inside a furnace by filling a sacrificial material such as coke breeze around a product may be employed. The oxygen concentration in the system can be controlled based on the circulation amount and circulation time of the inert gas, the degree of the decompression, the filling conditions of the sacrificial material, and the like. The oxygen concentration (volume concentration) is preferably 3% or lower, more preferably 1% or lower, still more preferably 1,000 ppm or lower, particularly preferably 500 ppm or lower, most preferably 100 ppm or lower. When the oxygen concentration is higher than this range, the development of the carbon structure of the amorphous carbonaceous material is inhibited, which tends to make it difficult to satisfy the above-described thermal properties.

When the graphite is mixed with the amorphous carbon precursor, the mixing ratio of the amorphous carbon precursor should be selected as appropriate based on the formulation of the desired composite particles, and the amount of the amorphous carbon precursor is, in terms of the weight ratio of its carbon residue (amorphous carbon) with respect to the graphite ([[weight of amorphous carbon]/[weight of graphite]]×100), usually 0.01% or higher, preferably 0.1% or higher, more preferably 0.5% or higher, still more preferably 1% or higher, particularly preferably 2% or higher, most preferably 3% or higher, but preferably 30% or lower, more preferably 20% or lower, still more preferably 15% or lower, particularly preferably 10% or lower. When the weight ratio is in this range, since a high capacity is obtained and the insertion and desorption of Li ions are facilitated, excellent low-temperature input-output characteristics, rapid charge-discharge characteristics and cycle characteristics are attained, which is preferred.

<A1-2-4. Other Treatments>

For the production of the negative electrode material according to one embodiment of the present invention, a pulverization treatment may be separately performed on the composite particles obtained by the above-described production method.

Examples of a pulverizer used for the pulverization treatment include: coarse pulverizers, such as a jaw crusher, an impact crusher, and a cone crusher; intermediate pulverizers, such as a roll crusher and a hammer mill; and fine pulverizers, such as a ball mill, a vibration mill, a pin mill, a stirring mill, and a jet mill. Thereamong, for example, a ball mill and a vibration mill are preferred from the standpoint of their short pulverization time and high treatment rate.

The pulverization rate is set as appropriate in accordance with the type and the size of the pulverizer and, for example, in the case of a ball mill, the pulverization rate is usually 50 rpm or higher, preferably 100 rpm or higher, more preferably 150 rpm or higher, still more preferably 200 rpm or higher, but usually 2,500 rpm or lower, preferably 2,300 rpm or lower, more preferably 2,000 rpm or lower. An excessively high rate tends to make it difficult to control the particle size, while an excessively low rate tends to reduce the treatment rate.

The pulverization time is usually 30 seconds or longer, preferably 1 minute or longer, more preferably 1.5 minutes or longer, still more preferably 2 minutes or longer, but usually 3 hours or shorter, preferably 2.5 hours or shorter, more preferably 2 hours or shorter. An excessively short pulverization time tends to make it difficult to control the particle size, while an excessively long pulverization time tends to reduce the productivity.

In the case of a vibration mill, the pulverization rate is usually 50 rpm or higher, preferably 100 rpm or higher, more preferably 150 rpm or higher, still more preferably 200 rpm or higher, but usually 2,500 rpm or lower, preferably 2,300 rpm or lower, more preferably 2,000 rpm or lower. An excessively high rate tends to make it difficult to control the particle size, while an excessively low rate tends to reduce the treatment rate.

The pulverization time is usually 30 seconds or longer, preferably 1 minute or longer, more preferably 1.5 minutes or longer, still more preferably 2 minutes or longer, but usually 3 hours or shorter, preferably 2.5 hours or shorter, more preferably 2 hours or shorter. An excessively short pulverization time tends to make it difficult to control the particle size, while an excessively long pulverization time tends to reduce the productivity.

For the production of the negative electrode material according to one embodiment of the present invention, a particle size classification treatment may be performed on the composite particles obtained by the above-described production method. As a classification treatment condition, the classification treatment is performed using a sieve having a mesh size of usually 53 µm or smaller, preferably 45 µm or smaller, more preferably 38 µm or smaller.

An apparatus used for the classification treatment is not particularly restricted. For example, in the case of performing dry sieving, a rotary sieve, a shaking sieve, a gyratory sieve, a vibratory sieve or the like can be used; in the case of performing dry air-flow classification, a gravity classifier, an inertial classifier, a centrifugal classifier (e.g., a classifier or a cyclone) or the like can be used; and, in the case of performing wet sieving, a mechanical wet classifier, a hydraulic classifier, a sedimentation classifier, a centrifugal wet classifier or the like can be used.

[A2. Negative Electrode for Nonaqueous Secondary Battery]

The negative electrode for a nonaqueous secondary battery according to one embodiment of the present invention (hereinafter, may be referred to as "the negative electrode of the present invention") includes a current collector and an active material layer formed on the current collector, and the active material layer contains the above-described negative electrode material according to one embodiment of the present invention.

For the production of a negative electrode using the above-described negative electrode material, the negative electrode material blended with a binder resin may be made into a slurry with an aqueous or organic medium and, after adding a thickening agent thereto as required, the slurry may be applied and dried onto a current collector.

As the binder resin, it is preferred to use one which is stable against nonaqueous electrolyte solutions and insoluble in water. Examples of such a binder resin that can be used include: rubbery polymers, such as styrene-butadiene rubber, isoprene rubber, and ethylene-propylene rubber; synthetic resins, such as polyethylene, polypropylene, polyethylene terephthalate, polyimide, polyacrylic acid, and aromatic polyamide; thermoplastic elastomers, such as styrene-butadiene-styrene block copolymers and hydrogenation products thereof, styrene-ethylene-butadiene-styrene copolymers, styrene-isoprene-styrene block copolymers, and hydrogenation products thereof; flexible resinous polymers, such as syndiotactic 1,2-polybutadiene, ethylene-vinyl acetate copolymers, and copolymers of ethylene and an α-olefin having 3 to 12 carbon atoms; and fluorinated polymers, such as polytetrafluoroethylene-ethylene copolymers, polyvinylidene fluoride, polypentafluoropropylene, and polyhexafluoropropylene. As the organic medium, for example, N-methylpyrrolidone or dimethylformamide can be used.

The binder resin is used in an amount of usually not less than 0.1 parts by weight, preferably not less than 0.2 parts by weight, with respect to 100 parts by weight of the negative electrode material. By using the binder resin in an amount of 0.1 parts by weight or greater with respect to 100 parts by weight of the negative electrode material, a sufficient binding strength is attained between the negative electrode materials and between the negative electrode material and the current collector, so that a reduction in the battery capacity and deterioration of the recycle characteristics, which are caused by detachment of the negative electrode material from the negative electrode, can be inhibited.

The amount of the binder resin to be used is preferably 10 parts by weight or less, more preferably 7 parts by weight or less, with respect to 100 parts by weight of the negative electrode material. By using the binder resin in an amount of 10 parts by weight or less with respect to 100 parts by weight of the negative electrode material, not only a reduction in the capacity of the negative electrode can be prevented, but also problems such as inhibition of movement of alkali ions such as lithium ions in and out of the negative electrode material can be avoided.

Examples of the thickening agent added to the slurry include water-soluble celluloses, such as carboxymethyl cellulose, methyl cellulose, hydroxyethyl cellulose, and hydroxypropyl cellulose; polyvinyl alcohols; and polyethylene glycols. Thereamong, carboxymethyl cellulose is preferred. The thickening agent is used in an amount of usually 0.1 parts by weight to 10 parts by weight, particularly preferably 0.2 parts by weight to 7 parts by weight, with respect to 100 parts by weight of the negative electrode material.

As the current collector of the negative electrode, for example, any of copper, a copper alloy, stainless steel, nickel, titanium and carbon that are conventionally known to be usable for this application may be used. The current collector is usually in the form of a sheet, and it is also preferred to use a current collector having irregularities on the surface, a net, a punched metal, or the like.

After the slurry composed of the negative electrode material and the binder resin is applied and dried onto the current collector, it is preferred that the resultant be pressed so as to increase the density of the active material layer thus formed on the current collector and to thereby increase the battery capacity per unit volume of the active material layer of the negative electrode. The density of the active material layer is in a range of preferably 1.2 g/cm$^3$ to 1.8 g/cm$^3$, more preferably 1.3 g/cm$^3$ to 1.6 g/cm$^3$. By controlling the density of the active material layer to be not less than the above-described lower limit value, a reduction in the battery capacity due to an increase in the electrode thickness can be inhibited. In addition, by controlling the density of the active material layer to be not higher than the above-described upper limit value, the amount of an electrolyte solution retained in voids is reduced in association with a decrease in the amount of interparticle voids inside the electrode, so that the mobility of alkali ions such as lithium ions is reduced, and deterioration of the rapid charge-discharge characteristics can be inhibited.

[A3. Nonaqueous Secondary Battery]

The nonaqueous secondary battery according to one embodiment of the present invention is a nonaqueous secondary battery including a positive electrode, a negative electrode and an electrolyte, in which the negative electrode according to one embodiment of the present invention is used as the negative electrode. Particularly, the positive electrode and the negative electrode that are used in the nonaqueous secondary battery according to one embodiment of the present invention are usually preferred to be capable of occluding and releasing Li ions, and the nonaqueous secondary battery according to one embodiment of the present invention is preferably a lithium ion secondary battery.

The nonaqueous secondary battery according to one embodiment of the present invention can be produced by a conventional method, except that the above-described negative electrode according to one embodiment of the present invention is used. Particularly, the nonaqueous secondary battery according to one embodiment of the present invention is designed such that the value of [capacity of negative electrode]/[capacity of positive electrode] is preferably 1.01 to 1.5, more preferably 1.2 to 1.4.

[A3-1. Positive Electrode]

In the nonaqueous secondary battery according to one embodiment of the present invention, examples of a positive electrode material that may be used as an active material of the positive electrode include: lithium-transition metal composite oxides, such as lithium-cobalt composite oxide having a basic composition represented by $LiCoO_2$, lithium-nickel composite oxide represented by $LiNiO_2$, and lithium-manganese composite oxide represented by $LiMnO_2$ or $LiMn_2O_4$; transition metal oxides, such as manganese dioxide; and mixtures of these composite oxides. Further, $TiS_2$, $FeS_2$, $Nb_3S_4$, $Mo_3S_4$, $CoS_2$, $V_2O_5$, $CrO_3$, $V_3O_3$, $FeO_2$, $GeO_2$, $LiNi_{0.33}Mn_{0.33}Co_{0.33}O_2$, $LiFePO_4$ and the like may be used as well.

The positive electrode can be produced by making the above-described positive electrode material blended with a binder resin into a slurry with an appropriate solvent, and subsequently applying and drying this slurry onto a current collector. It is preferred to incorporate a conductive material, such as acetylene black or Ketjen black, into the slurry. Further, a thickening agent may be incorporated as required. As a binder and the thickening agent, ones that are well-known for this application, for example, those exemplified above to be used in the production of the negative electrode, may be used.

The amount of the conductive material to be incorporated is preferably 0.5 parts by weight to 20 parts by weight, more preferably 1 part by weight to 15 parts by weight, with respect to 100 parts by weight of the positive electrode material. The amount of the thickening agent to be incorporated is preferably 0.2 parts by weight to 10 parts by weight, more preferably 0.5 parts by weight to 7 parts by weight, with respect to 100 parts by weight of the positive electrode material. Further, the amount of the binder resin to be incorporated with respect to 100 parts by weight of the positive electrode material is: preferably 0.2 parts by weight to 10 parts by weight, more preferably 0.5 parts by weight to 7 parts by weight, in the case of preparing a slurry of the binder resin with water; or preferably 0.5 parts by weight to 20 parts by weight, more preferably 1 to 15 parts by weight, in the case of preparing a slurry of the binder resin with an organic solvent that dissolves the binder resin, such as N-methylpyrrolidone.

Examples of the current collector of the positive electrode include aluminum, titanium, zirconium, hafnium, niobium, tantalum, and alloys thereof. Thereamong, aluminum, titanium, tantalum and alloys thereof are preferred, and aluminum and alloys thereof are most preferred.

[A3-2. Electrolyte Solution]

As an electrolyte solution, any conventionally well-known electrolyte solution obtained by dissolving various lithium salts in a nonaqueous solvent can be used.

Examples of a nonaqueous solvent that can be used include: cyclic carbonates, such as ethylene carbonate, fluoroethylene carbonate, propylene carbonate, butylene carbonate, and vinylene carbonate; chain carbonates, such as dimethyl carbonate, ethyl methyl carbonate, and diethyl carbonate; cyclic esters, such as γ-butyrolactone; cyclic ethers, such as crown ethers, 2-methyltetrahydrofuran, tetrahydrofuran, 1,2-dimethyltetrahydrofuran, and 1,3-dioxolane; and chain ethers, such as 1,2-dimethoxyethane. Usually, two or more of these nonaqueous solvents are mixed for use. Among these nonaqueous solvents, it is preferred to use a cyclic carbonate and a chain carbonate, or a mixture obtained by further adding other solvent thereto.

To the electrolyte solution, for example, a compound such as vinylene carbonate, vinylethylene carbonate, succinic anhydride, maleic anhydride, propane sultone or diethyl sulfone, and/or a difluorophosphate such as lithium difluorophosphate may also be added. Further, an overcharge inhibitor such as diphenyl ether or cyclohexylbenzene may be added as well.

Examples of an electrolyte to be dissolved in the nonaqueous solvent include $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$. In the electrolyte solution, the concentration of the electrolyte is usually 0.5 mol/L to 2 mol/L, preferably 0.6 mol/L to 1.5 mol/L.

[A3-3. Separator]

In the nonaqueous secondary battery according to one embodiment of the present invention, it is preferred to use a separator interposed between the positive electrode and the negative electrode. As the separator, it is preferred to use a porous sheet or a nonwoven fabric that is made of a polyolefin such as polyethylene or polypropylene.

B. Second Embodiment

The present invention will now be described in detail; however, the present invention is not restricted to the following descriptions, and can be carried out with any modification without departing from the gist of the present invention. It is noted here that, in the present invention, those ranges that are expressed with "to" before and after numerical or physical property values each denote a range that includes the respective numerical or physical property values.

[B1. Negative Electrode Raw Material for Nonaqueous Secondary Battery]

The negative electrode raw material for a nonaqueous secondary battery according to one embodiment of the present invention (hereinafter, may be referred to as "the negative electrode raw material of the present invention") contains a graphite and is configured such that, when a mercury intrusion volume (mL/g) and a mercury extrusion volume (mL/g), which are determined by a mercury intrusion method, are defined as A and B, respectively, the value of [mercury extrusion volume/mercury intrusion volume (B/A)×100] is 45% or higher.

The value of [mercury extrusion volume/mercury intrusion volume (B/A)] is an index of the complexity of the intraparticle structure of the negative electrode raw material, and a complex intraparticle structure leads to a high residual stress in the particles, and a high residual stress in the particles may lead to a high probability of the occurrence of particle expansion in association with charge-discharge cycles of a negative electrode material containing the present raw material. Therefore, the value of [mercury extrusion volume/mercury intrusion volume (B/A)×100] is usually 45% or higher, preferably 50% or higher, more preferably 55% or higher, particularly preferably 60% or higher, most preferably 63% or higher. An upper limit of the value of [mercury extrusion volume/mercury intrusion volume (B/A)×100] is not particularly restricted; however, the sphericity of the particles tends to be reduced as the complexity of the intraparticle structure decreases (i.e. the intraparticle structure becomes simpler), and a reduction in the sphericity of the particles leads to a reduction in the lithium ion diffusibility in a negative electrode in which a negative electrode material containing the present raw material is used. This may have a prominent adverse effect on the load characteristics such as rapid charging performance; therefore, the upper limit is preferably 95% or lower, more preferably 90% or lower, still more preferably 85% or lower, most preferably 80% or lower.

The mercury intrusion volume (mL/g) A is not particularly restricted; however, a small value of A means a small amount of intraparticle pores, and a small amount of intraparticle pores may lead to deterioration of the load characteristics, such as input-output characteristics, of a negative electrode material containing the present raw material. Therefore, the mercury intrusion volume (mL/g) A is preferably 0.001 mL/g or larger, more preferably 0.003 mL/g or larger, still more preferably 0.005 mL/g or larger, particularly preferably 0.01 mL/g or larger, most preferably 0.03 mL/g or larger. As for an upper limit of the mercury intrusion volume (mL/g) A, a large value of A means a large amount of intraparticle pores, and a large amount of intraparticle pores may lead to deterioration of the slurry production efficiency and the electrode drying efficiency due to a reduction in the bulk density of a negative electrode material containing the present raw material; therefore, the upper limit is preferably 1.0 mL/g or less, more preferably 0.8 mL/g or less, still more preferably 0.6 mL/g or less, particularly preferably 0.4 mL/g or less, most preferably 0.3 mL/g or less.

The mercury extrusion volume (mL/g) B is not particularly restricted; however, a small value of B reflects that the amount of intraparticle pores is small or that the intraparticle structure is complex, and the former may lead to deterioration of the load characteristics, such as input-output characteristics, of a negative electrode material containing the present raw material, while the latter reflects a high residual stress in the particles and may lead to the occurrence of particle expansion in association with charge-discharge cycles of a negative electrode material containing the present raw material. Therefore, the mercury extrusion volume (mL/g) B is preferably 0.001 mL/g or larger, more preferably 0.005 mL/g or larger, still more preferably 0.010 mL/g or larger, particularly preferably 0.040 mL/g or larger, most preferably 0.065 mL/g or larger. As for an upper limit of the mercury extrusion volume (mL/g) B, a large value of B means that the mercury intrusion volume (mL/g) A just before the measurement of B is large, and an excessively large value of A has the above-described concerns; therefore, the upper limit is preferably 1.0 mL/g or less, more preferably 0.6 mL/g or less, still more preferably 0.4 mL/g or less, particularly preferably 0.2 mL/g or less, most preferably 0.1 mL/g or less.

The above-described negative electrode raw material is preferably incorporated into a negative electrode material since the electrode expansion (cycle expansion) after cycles associated with charging and discharging of a secondary battery can thereby be inhibited.

The negative electrode raw material for a nonaqueous secondary battery and the negative electrode material for a nonaqueous secondary battery according to the present embodiment have an effect of providing a nonaqueous secondary battery that has a high capacity and exhibits excellent inhibition of cycle expansion and excellent rapid charging performance. The reason why the present invention exerts such an effect is not clear; however, it is considered as follows.

In the negative electrode raw material of the present embodiment, the value of [mercury extrusion volume/mercury intrusion volume (B/A)] serves an index of the complexity of the intraparticle structure, and a smaller B/A value means a more complex intraparticle structure. A complex intraparticle structure leads to a high residual stress in the particles, and it is believed that a high residual stress in the particles leads to a high probability of the occurrence of particle expansion in association with charge-discharge cycles of a negative electrode material containing the present negative electrode raw material. It is also believed that, by controlling the value of [B/A×100] to be 45% or higher, the complexity of the intraparticle structure is maintained at a certain level or lower and the residual stress in the particles is reduced, whereby particle expansion associated with charge-discharge cycles of the negative electrode material containing the present negative electrode raw material can be inhibited, and excellent inhibition of cycle expansion of a negative electrode can be attained.

In addition, by controlling the value of [B/A×100] to be 63% or higher, the rapid charging performance can be further improved while maintaining the excellent inhibition of cycle expansion of the negative electrode. This is believed to be because diffusion of lithium ions in the negative electrode is facilitated and the lithium ion concentration gradient in the negative electrode is thereby attenuated, as a result of which a concentration overvoltage is inhibited in use conditions such as rapid charging where diffusion of a substance is a rate-limiting factor.

[B1-1. Physical Properties]

The negative electrode raw material according to one embodiment of the present invention satisfies the below-described [(B/A)×100].

<B1-1-1. Mercury Intrusion Volume and Mercury Extrusion Volume>

In the negative electrode raw material of the present invention, when the mercury intrusion volume (mL/g) and the mercury extrusion volume (mL/g), which are determined by a mercury intrusion method, are defined as A and B, respectively, the value of [mercury extrusion volume/mercury intrusion volume (B/A)×100] is 45% or higher.

As an apparatus for the above-described mercury porosimetry, a mercury porosimeter (AUTOPORE 9520, manufactured by Micromeritics Corporation) can be used. A sample (negative electrode raw material) is weighed to a value of about 0.2 g and enclosed in a powder cell, and a pretreatment is performed by evacuating the cell at room temperature under vacuum (50 μmHg or lower) for 10 minutes. Subsequently, mercury is introduced into the cell under a reduced pressure of 4 psia (about 28 kPa), and the pressure is increased stepwise from 4 psia (about 28 kPa) to 40,000 psia (about 280 MPa) and then reduced to 25 psia (about 170 kPa). The number of steps in the pressure increase is at least 42 and the number of steps in the pressure reduction is at least 39. In each step, the mercury intrusion volume is measured after an equilibration time of 10 seconds. From a mercury intrusion curve obtained in this manner, the pore distribution is calculated using the Washburn equation. This calculation is performed assuming that mercury has a surface tension ($\gamma$) of 485 dyne/cm and a contact angle (t) of 140°. The average pore size is defined as a pore size at a cumulative pore volume of 50%. Based on the thus obtained mercury intrusion behavior and mercury extrusion behavior, the mercury intrusion volume (A) and the mercury extrusion volume (B) are calculated as follows.

Mercury intrusion volume (A)=Cumulative pore volume (mL/g) at 0.01 μm or more and 0.6 μm or less on intrusion side Mercury extrusion volume (B)=Mercury extrusion volume (mL/g) up to 25 psia (about 170 kPa) on extrusion side Further, the negative electrode raw material according to one embodiment of the present invention preferably satisfies the following physical properties.

<B1-1-2. Circularity>

The negative electrode raw material according to one embodiment of the present invention has a circularity, which is determined by a flow-type particle image analysis, of preferably 0.88 or higher, more preferably 0.90 or higher, still more preferably 0.91 or higher, particularly preferably 0.92 or higher, most preferably 0.93 or higher. When the graphite has a high circularity in this manner, a negative electrode material produced using the graphite has a reduced degree of inflection of Li ion diffusion and an electrolyte solution moves smoothly in interparticle voids, so that the rapid charge characteristics can be improved, which is preferred. Meanwhile, since the theoretical upper limit of the circularity is 1, the circularity is usually lower than 1, preferably 0.99 or lower, more preferably 0.98 or lower, still more preferably 0.97 or lower. From the standpoint of ensuring contact between the resulting negative electrode materials and thereby improving the cycle characteristics, the circularity is preferably not higher than the above-described upper limit.

The circularity is determined by measuring the particle size distribution based on the equivalent circle diameter using a flow-type particle image analyzer (FPIA-2000, manufactured by Toa Medical Electronics, Ltd.), and calculating the average circularity. The circularity is defined by the following formula, and a circularity value of 1 represents a theoretical true sphere:

[Circularity]=[Circumferential length of equivalent circle having the same area as projected particle shape]/[Actual circumferential length of projected particle shape]

In the measurement of the circularity, ion exchanged water and polyoxyethylene (20) monolaurate are used as a dispersion medium and a surfactant, respectively. The term "equivalent circle diameter" refers to the diameter of a circle (equivalent circle) having the same projected area as that of a captured particle image, and the term "circularity" refers to a ratio calculated by taking the circumferential length of the equivalent circle as the numerator and that of a captured projection image of a particle as the denominator. The circularity values of particles having a measured equivalent diameter in a range of 1.5 to 40 μm are averaged, and the thus obtained value is defined as the circularity.

<B1-1-3. Tap Density>

The negative electrode raw material has a tap density of preferably 0.60 g/cm$^3$ or higher, more preferably 0.70 g/cm$^3$ or higher, still more preferably 0.80 g/cm$^3$ or higher, particularly preferably 0.855/cm$^3$ or higher, most preferably 0.90 g/cm$^3$ or higher, but usually 1.40 g/cm$^3$ or lower, preferably 1.30 g/cm$^3$ or lower, more preferably 1.20 g/cm$^3$ or lower.

The tap density is measured using a powder density meter TAP DENSER KYT-3000 (manufactured by Seishin Enterprise Co., Ltd.). Specifically, after filling up a 20-cc tap cell with a sample by dropping the sample thereto, the cell is tapped 1,000 times with a stroke length of 10 mm, and the density measured at this point is defined as the tap density.

<B1-1-4. Volume-Based Average Particle Size>

The volume-based average particle size (D50) of the negative electrode raw material is not particularly restricted; however, it is usually 1 μm or larger, preferably 3 μm or larger, more preferably 5 μm or larger, still more preferably 8 μm or larger, particularly preferably 10 μm or larger, but usually 50 μm or smaller, preferably 40 μm or smaller, more preferably 30 μm or smaller, still more preferably 20 μm or smaller, particularly preferably 16 μm or smaller, most preferably 14 μm or smaller.

The average particle size (d50) is defined as a volume-based median diameter determined by suspending 0.01 g of composite particles in 10 mL of a 0.2%-by-weight aqueous solution of polyoxyethylene sorbitan monolaurate (e.g., TWEEN 20 (registered trademark)) which is a surfactant, introducing the resulting suspension as a measurement sample into a commercially available laser diffraction-scattering particle size distribution analyzer (e.g., LA-920 manufactured by HORIBA, Ltd.), irradiating the measurement sample with 28-kHz ultrasonic wave for 1 minute at an output of 60 W, and then performing a measurement using the analyzer.

<B1-1-5. BET Specific Surface Area>

The BET specific surface area of the negative electrode raw material is not particularly restricted; however, it is usually 1.0 m$^2$/g or larger, preferably 1.5 m$^2$/g or larger, more preferably 2.0 m$^2$/g or larger, still more preferably 3.0 m$^2$/g or larger, particularly preferably 4.5 m$^2$/g or larger, most preferably 5.0 m$^2$/g or larger, but usually 30.0 m$^2$/g or smaller, preferably 25.0 m$^2$/g or smaller, more preferably 20.0 m$^2$/g or smaller, still more preferably 16.0 m$^2$/g or smaller, more preferably 13.0 m$^2$/g or smaller, more preferably 12.0 m$^2$/g or smaller.

The BET specific surface area (SA) can be measured using MACSORB manufactured by Mountech Co., Ltd. Specifically, a sample is preliminarily vacuum-dried at 100° C. for 3 hours in a nitrogen stream and subsequently cooled to the liquid nitrogen temperature, and the measurement can be performed by a gas-flowing nitrogen adsorption single-point BET method using a nitrogen-helium mixed gas precisely adjusted to have a relative nitrogen pressure value of 0.3 with respect to the atmospheric pressure.

[B2. Negative Electrode Material for Nonaqueous Secondary Battery]

The negative electrode material for a nonaqueous secondary battery according to the present invention contains the above-described negative electrode raw material for a nonaqueous secondary battery according to the present invention.

[B2-1. Physical Properties]

The negative electrode material according to one embodiment of the present invention preferably satisfies the below-described physical properties.

(Raman $R_1$ Value)

As in the following Formula α, the term "Raman $R_1$ value" used herein is defined as an intensity ratio ($I_B/I_A$) of the intensity $I_A$ of a peak $P_A$ near 1,580 cm$^{-1}$ and the intensity $I_B$ of a peak $P_B$ near 1,360 cm$^{-1}$ in a Raman spectrum obtained for a negative electrode material by Raman spectroscopy. It is noted here that "near 1,580 cm$^{-1}$" refers to a range of 1,580 to 1,620 cm$^{-1}$, and "near 1,360 cm$^{-1}$" refers to a range of 1,350 to 1,370 cm$^{-1}$.

The Raman $R_1$ value of the negative electrode raw material, which is represented by the following Formula α, is not particularly restricted; however, it is preferably 0.10 or more and 1.00 or less. The Raman $R_1$ value is more preferably 0.15 or larger, still more preferably 0.20 or larger, particularly preferably 0.25 or larger, but more preferably 0.80 or smaller, still more preferably 0.60 or smaller.

Raman $R_1$ value=(Intensity $I_B$ of peak $P_B$ near 1,360 cm$^{-1}$)/(Intensity $I_A$ of peak $P_A$ near 1,580 cm$^{-1}$) in Raman spectrum analysis    Formula α:

<B2-1-1. Raman Properties (Raman $R_1$ Value, Raman Full Width at Half Maximum $\Delta v_B$ (cm$^{-1}$), Raman $R_2$ Value, and Raman $R_3$ Value) of Negative Electrode Material>

(Raman $R_1$ Value)

As described above, the term "Raman $R_1$ value" used herein is, as in the following Formula α, defined as an intensity ratio ($I_B/I_A$) of the intensity $I_A$ of a peak $P_A$ near 1,580 cm$^{-1}$ and the intensity $I_B$ of a peak $P_B$ near 1,360 cm$^{-1}$ in a Raman spectrum obtained for a negative electrode material by Raman spectroscopy. It is noted here that "near 1,580 cm$^{-1}$" refers to a range of 1,580 to 1,620 cm$^{-1}$, and "near 1,360 cm$^{-1}$" refers to a range of 1,350 to 1,370 cm$^{-1}$.

[Raman $R_1$ value]=[Intensity $I_B$ of peak $P_B$ near 1,360 cm$^{-1}$]/[Intensity $I_A$ of peak $P_A$ near 1,580 cm$^{-1}$] in Raman spectrum analysis    Formula α:

The term "Raman full width at half maximum $\Delta v_B$ (cm$^{-1}$)" used herein is defined as a full width at half maximum of a peak $P_B$ near 1,360 cm$^{-1}$ in a Raman spectrum obtained for a negative electrode material by Raman spectroscopy. It is noted here that "near 1,360 cm$^{-1}$" refers to a range of 1,350 to 1,370 cm$^{-1}$.

As in the following Formula β, the term "Raman $R_2$ value" used herein is defined as an intensity ratio ($I_C/I_A$) of the intensity $I_A$ of a peak $P_A$ near 1,580 cm$^{-1}$ and the intensity $I_C$ of a valley (minimal value) between the peak $P_A$ near 1,580 cm$^{-1}$ and a peak $P_B$ near 1,360 cm$^{-1}$ in a Raman spectrum obtained for a negative electrode material by Raman spectroscopy. It is noted here that "near 1,580 cm$^{-1}$" refers to a range of 1,580 to 1,620 cm$^{-1}$, and "near 1,360 cm$^{-1}$" refers to a range of 1,350 to 1,370 cm$^{-1}$.

[Raman $R_2$ value]=[Intensity $I_C$ of valley (minimal value) between peak $P_A$ near 1,580 cm$^{-1}$ and peak $P_B$ near 1,360 cm$^{-1}$]/[Intensity $I_A$ of peak $P_A$ near 1,580 cm$^{-1}$] in Raman spectrum analysis    Formula β:

As in the following Formula γ, the term "Raman $R_3$ value" used in one embodiment of the present invention is defined as an intensity ratio ($I_C/I_B$) of the intensity $I_B$ of a peak $P_B$ near 1,360 cm$^{-1}$ and the intensity $I_C$ of a valley (minimal value) between a peak $P_A$ near 1,580 cm$^{-1}$ and the peak $P_B$ near 1,360 cm$^{-1}$ in a Raman spectrum obtained for a negative electrode material by Raman spectroscopy. It is noted here that "near 1,580 cm$^{-1}$" refers to a range of 1,580 to 1,620 cm$^{-1}$, and "near 1,360 cm$^{-1}$" refers to a range of 1,350 to 1,370 cm$^{-1}$.

[Raman $R_3$ value]=[Intensity $I_C$ of valley (minimal value) between peak $P_A$ near 1,580 cm$^{-1}$ and peak $P_B$ near 1,360 cm$^{-1}$]/[Intensity $I_B$ of peak $P_B$ near 1,360 cm$^{-1}$] in Raman spectrum analysis    Formula γ:

The Raman $R_1$ value of the negative electrode material according to one embodiment of the present invention is usually 0.15 or larger, preferably 0.20 or larger, more preferably 0.25 or larger, still more preferably 0.30 or larger, particularly preferably 0.32 or larger, most preferably 0.35 or larger, but usually 1.00 or less, preferably 0.80 or less, more preferably 0.70 or less, still more preferably 0.65 or less, particularly preferably 0.50 or less.

The Raman full width at half maximum ($\Delta v_B$) of the negative electrode material according to one embodiment of the present invention is usually 65 cm$^{-1}$ or larger, preferably 70 cm$^{-1}$ or larger, more preferably 80 cm$^{-1}$ or larger, still more preferably 85 cm$^{-1}$ or larger, particularly preferably 90 cm$^{-1}$ or larger, most preferably 100 cm$^{-1}$ or larger, but usually 400 cm$^{-1}$ or less, preferably 300 cm$^{-1}$ or less, more preferably 250 cm$^{-1}$ or less, still more preferably 200 cm$^{-1}$ or less, particularly preferably 170 cm$^{-1}$ or less, most preferably 145 cm$^{-1}$ or less.

The Raman $R_2$ value of the negative electrode material according to one embodiment of the present invention is preferably 0.03 or larger, more preferably 0.05 or larger, still more preferably 0.07 or larger, particularly preferably 0.09 or larger, most preferably 0.11 or larger, but usually 0.60 or less, preferably 0.40 or less, more preferably 0.30 or less, still more preferably 0.25 or less, particularly preferably 0.22 or less.

These Raman properties each serve as an index of the graphite crystallinity of the surface of the negative electrode material, and an increase in these values indicates a reduction in the graphite crystallinity (an increase in the amorphousness) of the surface of the negative electrode material. The Raman $R_1$ value ($I_B/I_A$) is affected by not only the graphitization degree (completeness of graphite structure) but also the ratio of edges and crystal boundaries of the graphite crystal surface, and the graphitization degree and the ratio of edges and crystal boundaries tend to be increased as the Raman $R_1$ value increases. Accordingly, the Raman $R_1$ value may be large not only when the surface of the negative electrode material partially contains the amorphous carbonaceous material but also when the edge ratio is increased by, for example, pulverization of the graphite in a cleaving manner. Meanwhile, for the Raman full width at half maximum ($\Delta v_B$), the effect of the ratio of edges and crystal boundaries of the graphite crystal surface is relatively small, and the effect of the graphitization degree (completeness of graphite structure) tends to be reflected more prominently. Accordingly, although the Raman full width at half maximum ($\Delta v_B$) tends to be increased when the surface of the negative electrode material partially contains the amorphous carbonaceous material, a change associated with an increase in the edge ratio caused by pulverization or the like tends to be relatively small. Further, the intensity $I_C$ of a valley (minimal value) between a peak $P_A$ near 1,580 cm$^{-1}$ and a peak $P_B$ near 1,360 cm$^{-1}$ is said to be attributable to defects in the graphite crystal structure and the SP3 property in the amorphous carbon structure, and the Raman $R_2$ value ($I_C/I_A$) and the Raman $R_3$ value($I_C/I_B$) tend to reflect the graphitization degree (completeness of local graphite structure) more prominently. Accordingly, the Raman $R_2$ value ($I_C/I_A$) and the Raman $R_3$ value($I_C/I_B$) tend to be increased when the surface of the negative electrode material partially contains the amorphous carbonaceous material; however, a change associated with an increase in the edge ratio caused by pulverization or the like tends to be relatively small.

When the parameter values of these Raman properties are equal to or larger than the above-described respective lower limit values, it is indicated that the amorphousness of the surface of the negative electrode material is in an appropriate range and, since insertion and desorption of Li ions are facilitated, the low-temperature input-output characteristics tend to be improved. On the other hand, when the parameters of these Raman properties are equal to or smaller than the above-described respective upper limit values, since an increase in the effect of the irreversible capacity of highly amorphous carbon and an increase in the side reactions of such carbon with an electrolyte solution are inhibited, a reduction in the initial charge-discharge efficiency of a lithium ion secondary battery and an increase in gas generation are prevented, so that the battery capacity tends to be improved.

The Raman spectrum is measured using a Raman spectroscope. Specifically, a sample is loaded by letting the particles to be measured free-fall into a measuring cell, and the measurement is performed while irradiating an argon-ion laser beam into the measuring cell and rotating the measuring cell in a plane perpendicular to the laser beam.

Wavelength of argon-ion laser beam: 514.5 nm
Laser power on sample: 25 mW
Resolution: 4 cm$^{-1}$
Measurement range: 1,100 cm$^{-1}$ to 1,730 cm$^{-1}$
Measurement of peak intensity and measurement of peak full-width at half maximum: background processing, smoothing (convolution by simple average, 5 points)

<B2-1-2. BET Specific Surface Area (SA)>

The negative electrode material according to one embodiment of the present invention has a specific surface area (SA), which is determined by a BET method, of preferably 0.5 m$^2$/g or larger, more preferably 1.0 m$^2$/g or larger, still more preferably 1.2 m$^2$/g or larger, particularly preferably 1.5 m$^2$/g or larger, most preferably 1.8 m$^2$/g or larger, but preferably 10.0 m$^2$/g or smaller, more preferably 6.5 m$^2$/g or smaller, still more preferably 5.0 m$^2$/g or smaller, particularly preferably 4.0 m$^2$/g or smaller, most preferably 3.0 m$^2$/g or smaller. When the SA is equal to or larger than the above-described lower limit value, sites for entry and exit of Li ions are secured, so that the rapid charge-discharge characteristics of a lithium ion secondary battery tend to be improved. Meanwhile, when the SA is equal to or smaller than the above-described upper limit value, since the activity of an active material against an electrolyte solution is prevented from being excessively high, side reactions of the active material with an electrolyte solution are inhibited and a reduction in the battery initial charge-discharge efficiency and an increase in gas generation are prevented, so that the battery capacity tends to be improved. The BET specific surface area (SA) is measured by the same method as the one described above for the negative electrode raw material.

<B2-1-3. Tap Density>

The negative electrode material according to one embodiment of the present invention has a tap density (g/cm$^3$) of preferably 0.60 g/cm$^3$ or higher, more preferably 0.80 g/cm$^3$ or higher, still more preferably 1.00 g/cm$^3$ or higher, particularly preferably 1.10 g/cm$^3$ or higher, most preferably 1.15 g/cm$^3$ or higher, but preferably 1.40 g/cm$^3$ or lower, more preferably 1.35 g/cm$^3$ or lower, still more preferably 1.30 g/cm$^3$ or lower, particularly preferably 1.24 g/cm$^3$ or lower. When the tap density is equal to or higher than the above-described lower limit, since the processability such as streaking in the electrode production is favorable and the packing property of a negative electrode material layer is improved, a high-density negative electrode sheet with favorable rollability is likely to be formed and the density thereof can be improved, so that not only the degree of inflection of Li ion migration pathways is reduced when such an electrode sheet is made into an electrode body, but also the shapes of interparticle voids are well-controlled and an electrolyte solution is thus allowed to move smoothly, as a result of which the rapid charge-discharge characteristics are improved, which is preferred. Meanwhile, when the tap density is equal to or lower than the above-described upper limit value, the particles have an appropriate amount of space on the surface and inside and are thus prevented from being excessively hard, so that excellent electrode pressability and rapid charge-discharge characteristics are obtained, which is preferred. The tap density is measured by the same method as the one described above for the negative electrode raw material.

<B2-1-4. Interplanar Spacing (d002) and Crystallite Size (Lc)>

With regard to the crystallinity (graphitization degree), the negative electrode material according to one embodiment of the present invention has a (002)-plane interplanar spacing (d002) of preferably 0.340 nm or smaller and a crystallite size in the c-axis direction (Lc) of preferably 90 nm or larger, as determined by wide-angle X-ray diffractometry according to the method of the Japan Society for the Promotion of Science. The d002 is more preferably 0.338 nm or smaller, still more preferably 0.337 nm or smaller. Further, the Lc is more preferably 95 nm or larger, still more preferably 100 nm or larger. When the d002 and the Lc are in the above-described respective ranges, the discharge capacity is increased, which is preferred from the standpoint of increasing the battery capacity.

<B2-1-5. Circularity>

The negative electrode material according to one embodiment of the present invention has a circularity, which is determined by flow-type particle image analysis, of preferably 0.88 or higher, more preferably 0.90 or higher, still more preferably 0.91 or higher, particularly preferably 0.92 or higher, most preferably 0.93 or higher. When the negative electrode material has a high circularity in this manner, the degree of inflection of Li ion diffusion is reduced and an electrolyte solution moves smoothly in interparticle voids, so that the rapid charge-discharge characteristics can be improved, which is preferred. Meanwhile, since the theoretical upper limit of the circularity is 1, the circularity is usually lower than 1, preferably 0.99 or lower, more preferably 0.98 or lower, still more preferably 0.97 or lower.

From the standpoint of ensuring contact between the resulting negative electrode materials and thereby improving the cycle characteristics, the circularity is preferably not higher than the above-described upper limit. The circularity is determined by the same method as the one described above for the negative electrode raw material.

<B2-1-6. Volume-Based Average Particle Size (Average Particle Size d50)>

The negative electrode material according to one embodiment of the present invention has a volume-based average particle size (hereinafter, also referred to as "average particle size d50") of preferably 1 μm or larger, more preferably 3 μm or larger, still more preferably 4 μm or larger, particularly preferably 5 μm or larger, most preferably 8 μm or larger, but preferably 50 μm or smaller, more preferably 40 μm or smaller, still more preferably 30 μm or smaller, particularly preferably 20 μm or smaller, most preferably 14 μm or smaller. When the d50 value is equal to or larger than the above-described lower limit value, an increase in the irreversible capacity and a loss of the initial battery capacity tend to be inhibited, while when the d50 value is equal to or smaller than the above-described upper limit value, the occurrence of a process defect such as streaking in slurry application is inhibited, so that the rapid charge-discharge characteristics and the low-temperature input-output characteristics tend to be improved. The volume-based average particle size is determined by the same method as the one described above for the negative electrode raw material.

[B3. Production Method]

A method of producing the negative electrode raw material for a nonaqueous secondary battery according to one embodiment of the present invention is not particularly restricted as long as it is a method by which a negative electrode raw material can be produced in such a manner that it contains a graphite and satisfies, when a mercury intrusion volume (mL/g) and a mercury extrusion volume (mL/g), which are determined by a mercury intrusion method, are defined as A and B, respectively, the value of [mercury extrusion volume/mercury intrusion volume (B/A)×100] is 45% or higher. The negative electrode raw material for a nonaqueous secondary battery according to one embodiment of the present invention can be produced by, for example, performing a press treatment on a spherical graphite obtained by a spheroidization treatment. The press treatment may be, for example, an anisotropic press treatment or an isotropic press treatment, and an isotropic press treatment is preferred from the standpoint of controlling the value of [mercury extrusion volume/mercury intrusion volume (B/A)] to be in the specific range. The conditions of the press treatment are not particularly restricted; however, the value of [mercury extrusion volume/mercury intrusion volume (B/A)] can be controlled to be in the specific range by performing the treatment at 50 MPa or more and 300 MPa or less. As a condition of the press treatment, from the standpoint of controlling the value of [mercury extrusion volume/mercury intrusion volume (B/A)] to be in the specific range, the press treatment is performed at preferably 100 MPa or higher, more preferably 120 MPa or higher, still more preferably 140 MPa or higher, particularly preferably 160 MPa or higher, most preferably 180 MPa or higher, but preferably 280 MPa or lower, more preferably 260 MPa or lower, still more preferably 240 MPa or lower, particularly preferably 230 MPa or lower, most preferably 220 MPa or lower. In the above-described production method, specifically, a spheroidized graphite is obtained by, for example, pulverizing a natural graphite, mixing the thus pulverized natural graphite with a granulating agent, subjecting the resulting mixture to a spheroidization treatment, and then heat-treating the resultant to remove the granulating agent. The thus obtained spheroidized graphite is subjected to a press treatment, and the resulting molded product is crushed and classified, whereby a negative electrode raw material for a nonaqueous secondary battery, in which the value of [mercury extrusion volume/mercury intrusion volume (B/A)] is controlled in the specific range, can be produced.

Further, a method of producing the negative electrode material for a nonaqueous secondary battery according to one embodiment of the present invention is not particularly restricted, and the negative electrode material can be produced by mixing the negative electrode raw material for a nonaqueous secondary battery according to one embodiment of the present invention with an amorphous carbon precursor (raw material of amorphous carbon), and firing the resultant. Specifically, the press treatment of the spheroidized graphite enables to adjust the pore volume and attain the value of [mercury extrusion volume/mercury intrusion volume] in the specific range, and it is preferred to use an amorphous carbon precursor, which has a low ash content, a low metal impurity content, a low quinoline-insoluble content (Qi) and the like, and perform the firing in an inert atmosphere at an appropriate firing temperature in a manner suitable for the development of a carbon structure.

<B3-1. Graphite>

The negative electrode raw material according to one embodiment of the present invention contains a graphite. The graphite used for producing the negative electrode raw material according to one embodiment of the present invention is preferably of the below-described type exhibiting the below-described physical properties. It is noted here that, unless otherwise specified, the measurement conditions and the definitions of the physical properties of the graphite are the same as those described above for the negative electrode raw material.

The type of the graphite is not particularly restricted as long as the graphite is capable of occluding and releasing lithium ions, and the graphite may be either a natural graphite or an artificial graphite. The natural graphite may be, for example, a flake graphite, a vein graphite or an amorphous graphite, and the natural graphite preferably has a low impurity content and is, as required, subjected to a known purification treatment before use. Examples of the artificial graphite include those produced by firing and graphitizing an organic compound, such as a coal-tar pitch, a coal-based heavy oil, an atmospheric residue oil, a petroleum-based heavy oil, an aromatic hydrocarbon, a nitrogen-containing cyclic compound, a sulfur-containing cyclic compound, a polyphenylene, a polyvinyl chloride, a polyvinyl alcohol, a polyacrylonitrile, a polyvinyl butyral, a natural polymer, a polyphenylene sulfide, a polyphenylene oxide, a furfuryl alcohol resin, a phenol-formaldehyde resin or an imide resin, at a temperature in a range of usually 2,500° C. to 3,200° C. In this process, a silicon-containing compound, a boron-containing compound or the like can also be used as a graphitization catalyst.

As for the crystallinity (graphitization degree) of the graphite, the (002)-plane interplanar spacing (d002) determined by wide-angle X-ray diffractometry is usually 0.335 nm or larger but smaller than 0.340 nm. The d002 value is preferably 0.338 nm or smaller, more preferably 0.337 nm or smaller, still more preferably 0.336 nm or smaller.

As for the shape of the graphite, from the standpoint of the rapid charge-discharge characteristics, the graphite is particularly preferably a spherical graphite (spheroidized graphite). As for a method of spheroidizing graphite particles, spheroidized graphite particles can be produced by performing a spheroidization treatment using a known technology. For the spheroidization treatment, for example, an apparatus which repeatedly applies mechanical actions, such as compression, friction and shear force, including particle interactions, to particles mainly through impact force, can be used. As the apparatus to be used for the spheroidization treatment, specifically, it is preferred to use an apparatus which is equipped with a rotor having a large number of blades inside a casing and performs a surface treatment by rotating the rotor at a high speed and thereby applying mechanical actions, such as impact compression, friction and shear force, to a carbon material introduced to the inside. Further, an apparatus which has a mechanism for repeatedly applying mechanical actions by circulating graphite particles is preferred. Specific examples of such an apparatus include Hybridization System (manufactured by Nara Machinery Co., Ltd.), KRYPTRON (manufactured by EarthTechnica Co., Ltd.), CF Mill (manufactured by UBE Industries, Ltd.), MECHANO FUSION System (manufactured by Hosokawa Micron Group), and THETA COMPOSER (manufactured by Tokuju Co., Ltd.). Thereamong, Hybridization System manufactured by Nara Machinery Co., Ltd. is preferred. For example, when a treatment is performed using any of the above-described apparatuses, the peripheral speed of the rotating rotor is set at, but not particularly limited to, preferably 30 m/sec to 100 m/sec, more preferably 40 m/sec to 100 m/sec, still more preferably 50 m/sec to 100 m/sec. The treatment can also be performed by simply passing a carbonaceous material through the apparatus; however, it is preferred to perform the treatment by circulating or retaining the carbonaceous material in the apparatus for 30 seconds or longer, and it is more preferred to perform the treatment by circulating or retaining the carbonaceous material in the apparatus for 1 minute or longer. Alternatively, a spherical graphite obtained by granulating plural flake or scale-like graphites and a graphite such as ground graphite fine powder using a granulating agent in accordance with the method disclosed in Patent Document 4 may be used as well.

(Circularity)

The graphite in the negative electrode raw material according to one embodiment of the present invention has a circularity, which is determined by a flow-type particle image analysis, of preferably 0.88 or higher, more preferably 0.90 or higher, still more preferably 0.91 or higher, particularly preferably 0.92 or higher, most preferably 0.93 or higher. When the graphite has a high circularity in this manner, the negative electrode material produced using the graphite has a reduced degree of inflection of Li ion diffusion and an electrolyte solution moves smoothly in inter-particle voids, so that the rapid charge-discharge characteristics can be improved, which is preferred. Meanwhile, since the theoretical upper limit of the circularity is 1, the circularity is usually lower than 1, preferably 0.99 or lower, more preferably 0.98 or lower, still more preferably 0.97 or lower. From the standpoint of ensuring contact between the resulting negative electrode materials and thereby improving the cycle characteristics, the circularity is preferably not higher than the above-described upper limit.

(Tap Density)

The graphite has a tap density of preferably 0.60 g/cm³ or higher, more preferably 0.70 g/cm³ or higher, still more preferably 0.80 g/cm³ or higher, particularly preferably 0.855/cm³ or higher, most preferably 0.90 g/cm³ or higher, but usually 1.40 g/cm³ or lower, preferably 1.30 g/cm³ or lower, more preferably 1.20 g/cm³ or lower.

(Volume-Based Average Particle Size)

The volume-based average particle size (D50) of the graphite is not particularly restricted; however, it is usually 1 μm or larger, preferably 3 μm or larger, more preferably 5 μm or larger, but usually 50 μm or smaller, preferably 40 μm or smaller, more preferably 30 μm or smaller.

(BET Specific Surface Area)

The BET specific surface area of the graphite is not particularly restricted; however, it is usually 1.0 m²/g or larger, preferably 1.5 m²/g or larger, more preferably 2.0 m²/g or larger, still more preferably 3.0 m²/g or larger, particularly preferably 4.5 m²/g or larger, most preferably 5.0 m²/g or larger, but usually 30.0 m²/g or smaller, preferably 25.0 m²/g or smaller, more preferably 20.0 m²/g or smaller.

(Raman $R_1$ Value)

The Raman $R_1$ value of the graphite, which is represented by the following Formula α, is not particularly restricted; however, it is preferably 0.10 or more and 1.00 or less. The Raman $R_1$ value is more preferably 0.15 or larger, still more preferably 0.20 or larger, particularly preferably 0.25 or larger, but more preferably 0.80 or smaller, still more preferably 0.60 or smaller.

$$\text{Raman } R_1 \text{ value} = (\text{Intensity } I_B \text{ of peak } P_B \text{ near } 1{,}360 \text{ cm}^{-1})/(\text{Intensity } I_A \text{ of peak } P_A \text{ near } 1{,}580 \text{ cm}^{-1}) \text{ in Raman spectrum analysis} \quad \text{Formula α:}$$

<B3-2. Press Treatment of Graphite>

The production of the negative electrode raw material according to one embodiment of the present invention preferably includes the step of pressing a graphite. A method for pressing a graphite is not particularly restricted as long as a pressure can be applied, and examples thereof include: a hydrostatic isotropic press treatment in which a raw material graphite is placed in a container such as a rubber mold, and water is used as a pressurizing medium; and a pneumatic isotropic press treatment using a gas, such as air, as a pressurizing medium. The press treatment may also be performed by filling the raw material graphite into a mold and subsequently pressing the raw material graphite in a certain direction using a single-screw press.

The pressure of the pressurizing medium used in the press treatment of the graphite is preferably in a range of 5 to 400 MPa, more preferably in a range of 30 to 350 MPa, still more preferably in a range of 50 to 300 MPa. When the pressure is equal to or higher than the above-described lower limit value, the pore volume can be controlled in a smaller range. Meanwhile, when the pressure is equal to or lower than the above-described upper limit value, an increase in the specific surface area of the resulting negative electrode material is likely to be inhibited.

<B3-3. Amorphous Carbon Integration of Negative Electrode Raw Material>

The negative electrode material according to one embodiment of the present invention preferably contains a graphite that contains amorphous carbon in at least a part of the surface. A treatment for this amorphous carbon integration is performed by mixing and firing the above-described negative electrode raw material containing a graphite with an amorphous carbon precursor (a raw material of amorphous carbon). By performing the amorphous carbon integration of the negative electrode raw material containing a graphite under appropriate conditions, the cumulative pore volume is likely to be controlled in the above-described range.

The amorphous carbon precursor is not particularly restricted, and examples thereof include organic materials, for example, tars, pitches, aromatic hydrocarbons such as naphthalene, anthracene, and derivatives thereof, and thermoplastic polymers such as phenolic resins and polyvinyl alcohols. These organic precursors may be used singly, or two or more thereof may be used in combination. Thereamong, from the standpoint of facilitating the development of carbon structure, the amorphous carbon precursor is preferably a tar, a pitch, or an aromatic hydrocarbon.

The ash content in the amorphous carbon precursor is preferably 1% by weight or less, more preferably 0.5% by weight or less, still more preferably 0.1% by weight or less, with respect to a total weight of the amorphous carbon precursor. A lower limit of the ash content is usually not less than 0.1 ppm by weight. When the ash content in the amorphous carbon precursor is in this range, good thermal properties are obtained.

In the present invention, the amount of metal impurities contained in the amorphous carbon precursor is defined as a value obtained by dividing a total content of Fe, Al, Si and Ca with respect to a total weight of the amorphous carbon precursor by a residual carbon ratio. The amount of metal impurities contained in the amorphous carbon precursor is preferably 1,000 ppm by weight or less, more preferably 400 ppm by weight or less, still more preferably 100 ppm by weight or less, particularly preferably 50 ppm by weight or less, but usually 0.1 ppm by weight or more, with respect to a total weight of the amorphous carbon precursor. When the amount of metal impurities contained in the amorphous carbon precursor is in this range, good thermal properties are obtained.

The quinoline-insoluble content (Qi) in the amorphous carbon precursor is preferably 5% by weight or less, more preferably 2% by weight or less, still more preferably 1% by weight or less, particularly preferably 0.5% by weight or less, most preferably 0.1% by weight or less, with respect to a total weight of the amorphous carbon precursor. When the quinoline-insoluble content (Qi) in the amorphous carbon precursor is in this range, good thermal properties are obtained.

The graphite and the amorphous carbon precursor are mixed and subsequently fired. The firing temperature is preferably 950° C. or higher, more preferably 1,000° C. or higher, still more preferably 1,050° C. or higher, particularly preferably 1,100° C. or higher, most preferably 1,150° C. or higher, but preferably 2,000° C. or lower, more preferably 1,800° C. or lower, still more preferably 1,600° C. or lower, particularly preferably 1,500° C. or lower. The firing time is preferably 0.5 hours or longer, more preferably 1 hour or longer, but preferably 1,000 hours or shorter, more preferably 500 hours or shorter, still more preferably 100 hours or shorter. When the firing temperature and the firing time are in these respective ranges, good thermal properties are obtained.

The firing is preferably performed in an inert atmosphere. Specifically, for example, a method of reducing the oxygen concentration by circulating an inert gas such as nitrogen or argon, a method of discharging oxygen out of the system by decompression and subsequently restoring the pressure with nitrogen or argon, or a method of reducing the amount of oxygen contained in the atmosphere inside a furnace by filling a sacrificial material such as coke breeze around a product may be employed. The oxygen concentration in the system can be controlled based on the circulation amount and circulation time of the inert gas, the degree of the decompression, the filling conditions of the sacrificial material, and the like. The oxygen concentration (volume concentration) is preferably 3% or lower, more preferably 1% or lower, still more preferably 1,000 ppm or lower, particularly preferably 500 ppm or lower, most preferably 100 ppm or lower. When the oxygen concentration is higher than this range, the development of the carbon structure of the amorphous carbonaceous material is inhibited, as a result of which good thermal properties are unlikely to be obtained.

When the graphite is mixed with the amorphous carbon precursor, the mixing ratio of the amorphous carbon precursor should be selected as appropriate based on the formulation of the desired composite particles, and the amount of the amorphous carbon precursor is, in terms of the weight ratio of its carbon residue (amorphous carbon) with respect to the graphite ([[weight of amorphous carbon]/[weight of graphite]]×100), usually 0.01% or higher, preferably 0.1% or higher, more preferably 0.5% or higher, still more preferably 1% or higher, particularly preferably 2% or higher, most preferably 3% or higher, but preferably 30% or lower, more preferably 20% or lower, still more preferably 15% or lower, particularly preferably 10% or lower. When the weight ratio is in this range, since a high capacity is obtained and the insertion and desorption of Li ions are facilitated, excellent low-temperature input-output characteristics, rapid charge-discharge characteristics and cycle characteristics are attained, which is preferred.

<B3-4. Other Treatments>

For the production of the negative electrode material according to one embodiment of the present invention, a pulverization treatment may be separately performed on the composite particles obtained by the above-described production method.

Examples of a pulverizer used for the pulverization treatment include: coarse pulverizers, such as a jaw crusher, an impact crusher, and a cone crusher; intermediate pulverizers, such as a roll crusher and a hammer mill; and fine pulverizers, such as a ball mill, a vibration mill, a pin mill, a stirring mill, and a jet mill. Thereamong, for example, a ball mill and a vibration mill are preferred from the standpoint of their short pulverization time and treatment rate.

The pulverization rate is set as appropriate in accordance with the type and the size of the pulverizer and, for example, in the case of a ball mill, the pulverization rate is usually 50 rpm or higher, preferably 100 rpm or higher, more preferably 150 rpm or higher, still more preferably 200 rpm or higher, but usually 2,500 rpm or lower, preferably 2,300 rpm or lower, more preferably 2,000 rpm or lower. An excessively high rate tends to make it difficult to control the particle size, while an excessively low rate tends to reduce the treatment rate.

The pulverization time is usually 30 seconds or longer, preferably 1 minute or longer, more preferably 1.5 minutes or longer, still more preferably 2 minutes or longer, but usually 3 hours or shorter, preferably 2.5 hours or shorter, more preferably 2 hours or shorter. An excessively short pulverization time tends to make it difficult to control the particle size, while an excessively long pulverization time tends to reduce the productivity.

In the case of a vibration mill, the pulverization rate is usually 50 rpm or higher, preferably 100 rpm or higher, more preferably 150 rpm or higher, still more preferably 200 rpm or higher, but usually 2,500 rpm or lower, preferably 2,300 rpm or lower, more preferably 2,000 rpm or lower. An excessively high rate tends to make it difficult to control the particle size, while an excessively low rate tends to reduce the treatment rate.

The pulverization time is usually 30 seconds or longer, preferably 1 minute or longer, more preferably 1.5 minutes or longer, still more preferably 2 minutes or longer, but usually 3 hours or shorter, preferably 2.5 hours or shorter, more preferably 2 hours or shorter. An excessively short pulverization time tends to make it difficult to control the particle size, while an excessively long pulverization time tends to reduce the productivity.

For the production of the negative electrode material according to one embodiment of the present invention, a particle size classification treatment may be performed on the composite particles obtained by the above-described production method. As a classification treatment condition, the classification treatment is performed using a sieve having a mesh size of usually 53 μm or smaller, preferably 45 μm or smaller, more preferably 38 μm or smaller.

An apparatus used for the classification treatment is not particularly restricted. For example, in the case of performing dry sieving, a rotary sieve, a shaking sieve, a gyratory sieve, a vibratory sieve or the like can be used; in the case of performing dry air-flow classification, a gravity classifier, an inertial classifier, a centrifugal classifier (e.g., a classifier or a cyclone) or the like can be used; and, in the case of performing wet sieving, a mechanical wet classifier, a hydraulic classifier, a sedimentation classifier, a centrifugal wet classifier or the like can be used.

[B4. Negative Electrode for Nonaqueous Secondary Battery]

The negative electrode for a nonaqueous secondary battery according to one embodiment of the present invention (hereinafter, may be referred to as "the negative electrode of the present invention") includes a current collector and an active material layer formed on the current collector, and the active material layer contains the above-described negative electrode material according to one embodiment of the present invention. The negative electrode for a nonaqueous secondary battery according to the present embodiment can be the same as the first embodiment, except for the active material layer.

For the production of a negative electrode using the above-described negative electrode material, the negative electrode material blended with a binder resin may be made into a slurry with an aqueous or organic medium and, after adding a thickening agent thereto as required, the slurry may be applied and dried onto a current collector.

As the binder resin, it is preferred to use one which is stable against nonaqueous electrolyte solutions and insoluble in water. Examples of such a binder resin that can be used include: rubbery polymers, such as styrene-butadiene rubber, isoprene rubber, and ethylene-propylene rubber; synthetic resins, such as polyethylene, polypropylene, polyethylene terephthalate, polyimide, polyacrylic acid, and aromatic polyamide; thermoplastic elastomers, such as styrene-butadiene-styrene block copolymers and hydrogenation products thereof, styrene-ethylene-butadiene-styrene copolymers, styrene-isoprene-styrene block copolymers, and hydrogenation products thereof; flexible resinous polymers, such as syndiotactic 1,2-polybutadiene, ethylene-vinyl acetate copolymers, and copolymers of ethylene and an α-olefin having 3 to 12 carbon atoms; and fluorinated polymers, such as polytetrafluoroethylene-ethylene copolymers, polyvinylidene fluoride, polypentafluoropropylene, and polyhexafluoropropylene. As the organic medium, for example, N-methylpyrrolidone or dimethylformamide can be used.

The binder resin is used in an amount of usually not less than 0.1 parts by weight, preferably not less than 0.2 parts by weight, with respect to 100 parts by weight of the negative electrode material. By using the binder resin in an amount of 0.1 parts by weight or greater with respect to 100 parts by weight of the negative electrode material, a sufficient binding strength is attained between the negative electrode materials and between the negative electrode material and the current collector, so that a reduction in the battery capacity and deterioration of the recycle characteristics, which are caused by detachment of the negative electrode material from the negative electrode, can be inhibited.

The amount of the binder resin to be used is preferably 10 parts by weight or less, more preferably 7 parts by weight or less, with respect to 100 parts by weight of the negative electrode material. By using the binder resin in an amount of 10 parts by weight or less with respect to 100 parts by weight of the negative electrode material, not only a reduction in the capacity of the negative electrode can be prevented, but also problems such as inhibition of movement of alkali ions such as lithium ions in and out of the negative electrode material can be avoided.

Examples of the thickening agent added to the slurry include water-soluble celluloses, such as carboxymethyl cellulose, methyl cellulose, hydroxyethyl cellulose, and hydroxypropyl cellulose; polyvinyl alcohols; and polyethylene glycols. Thereamong, carboxymethyl cellulose is preferred. The thickening agent is used in an amount of usually 0.1 parts by weight to 10 parts by weight, particularly preferably 0.2 parts by weight to 7 parts by weight, with respect to 100 parts by weight of the negative electrode material.

As the current collector of the negative electrode, for example, any of copper, a copper alloy, stainless steel, nickel, titanium and carbon that are conventionally known to be usable for this application may be used. The current collector is usually in the form of a sheet, and it is also preferred to use a current collector having irregularities on the surface, a net, a punched metal, or the like.

After the slurry composed of the negative electrode material and the binder resin is applied and dried onto the current collector, it is preferred that the resultant be pressed so as to increase the density of the active material layer thus formed on the current collector and to thereby increase the battery capacity per unit volume of the active material layer of the negative electrode. The density of the active material layer is in a range of preferably 1.2 g/cm$^3$ to 1.8 g/cm$^3$, more preferably 1.3 g/cm$^3$ to 1.6 g/cm$^3$. By controlling the density of the active material layer to be not less than the above-described lower limit value, a reduction in the battery capacity due to an increase in the electrode thickness can be inhibited. In addition, by controlling the density of the active material layer to be not higher than the above-described upper limit value, the amount of an electrolyte solution retained in voids is reduced in association with a decrease in the amount of interparticle voids inside the electrode, so that the mobility of alkali ions such as lithium ions is reduced, and deterioration of the rapid charge-discharge characteristics can be inhibited.

[B5. Nonaqueous Secondary Battery]

The nonaqueous secondary battery according to one embodiment of the present invention is a nonaqueous secondary battery including a positive electrode, a negative electrode and an electrolyte, in which the negative electrode according to one embodiment of the present invention is used as the negative electrode. Particularly, the positive electrode and the negative electrode that are used in the nonaqueous secondary battery according to one embodiment of the present invention are usually preferred to be capable of occluding and releasing Li ions, and the nonaqueous secondary battery according to one embodiment of the present invention is preferably a lithium ion secondary battery.

The nonaqueous secondary battery according to one embodiment of the present invention can be produced by a conventional method, except that the above-described negative electrode according to one embodiment of the present invention is used. Particularly, the nonaqueous secondary battery according to one embodiment of the present invention is designed such that the value of [capacity of negative electrode]/[capacity of positive electrode] is preferably 1.01 to 1.5, more preferably 1.2 to 1.4.

[B5-1. Positive Electrode]

In the nonaqueous secondary battery according to one embodiment of the present invention, examples of a positive electrode material that may be used as an active material of the positive electrode include: lithium-transition metal composite oxides, such as lithium-cobalt composite oxide having a basic composition represented by $LiCoO_2$, lithium-nickel composite oxide represented by $LiNiO_2$, and lithium-manganese composite oxide represented by $LiMnO_2$ or $LiMn_2O_4$; transition metal oxides, such as manganese dioxide; and mixtures of these composite oxides. Further, $TiS_2$, $FeS_2$, $Nb_3S_4$, $Mo_3S_4$, $CoS_2$, $V_2O_5$, $CrO_3$, $V_3O_3$, $FeO_2$, $GeO_2$, $LiNi_{0.33}Mn_{0.33}Co_{0.33}O_2$, $LiFePO_4$ and the like may be used as well.

The positive electrode can be produced by making the above-described positive electrode material blended with a binder resin into a slurry with an appropriate solvent, and subsequently applying and drying this slurry onto a current collector. It is preferred to incorporate a conductive material, such as acetylene black or Ketjen black, into the slurry. Further, a thickening agent may be incorporated as required. As a binder and the thickening agent, ones that are well-known for this application, for example, those exemplified above to be used in the production of the negative electrode, may be used.

The amount of the conductive material to be incorporated is preferably 0.5 parts by weight to 20 parts by weight, more preferably 1 part by weight to 15 parts by weight, with respect to 100 parts by weight of the positive electrode material. The amount of the thickening agent to be incorporated is preferably 0.2 parts by weight to 10 parts by weight, more preferably 0.5 parts by weight to 7 parts by weight, with respect to 100 parts by weight of the positive electrode material. Further, the amount of the binder resin to be incorporated with respect to 100 parts by weight of the positive electrode material is: preferably 0.2 parts by weight to 10 parts by weight, more preferably 0.5 parts by weight to 7 parts by weight, in the case of preparing a slurry of the binder resin with water; or preferably 0.5 parts by weight to 20 parts by weight, more preferably 1 to 15 parts by weight, in the case of preparing a slurry of the binder resin with an organic solvent that dissolves the binder resin, such as N-methylpyrrolidone.

Examples of the current collector of the positive electrode include aluminum, titanium, zirconium, hafnium, niobium, tantalum, and alloys thereof. Thereamong, aluminum, titanium, tantalum and alloys thereof are preferred, and aluminum and alloys thereof are most preferred.

[B6-2. Electrolyte Solution]

As an electrolyte solution, any conventionally known electrolyte solution obtained by dissolving various lithium salts in a nonaqueous solvent can be used.

Examples of a nonaqueous solvent that can be used include: cyclic carbonates, such as ethylene carbonate, fluoroethylene carbonate, propylene carbonate, butylene carbonate, and vinylene carbonate; chain carbonates, such as dimethyl carbonate, ethyl methyl carbonate, and diethyl carbonate; cyclic esters, such as γ-butyrolactone; cyclic ethers, such as crown ethers, 2-methyltetrahydrofuran, tetrahydrofuran, 1,2-dimethyltetrahydrofuran, and 1,3-dioxolane; and chain ethers, such as 1,2-dimethoxyethane. Usually, two or more of these nonaqueous solvents are mixed for use. Among these nonaqueous solvents, it is preferred to use a cyclic carbonate and a chain carbonate, or a mixture obtained by further adding other solvent thereto.

To the electrolyte solution, for example, a compound such as vinylene carbonate, vinylethylene carbonate, succinic anhydride, maleic anhydride, propane sultone or diethyl sulfone, and/or a difluorophosphate such as lithium difluorophosphate may also be added. Further, an overcharge inhibitor such as diphenyl ether or cyclohexylbenzene may be added as well.

Examples of an electrolyte to be dissolved in the nonaqueous solvent include $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$. In the electrolyte solution, the concentration of the electrolyte is usually 0.5 mol/L to 2 mol/L, preferably 0.6 mol/L to 1.5 mol/L.

[B6-3. Separator]

In the nonaqueous secondary battery according to one embodiment of the present invention, it is preferred to use a separator interposed between the positive electrode and the negative electrode. As the separator, it is preferred to use a porous sheet or nonwoven fabric that is made of a polyolefin such as polyethylene or polypropylene.

C. Third Embodiment

The present invention will now be described in detail; however, the present invention is not restricted to the following descriptions, and can be carried out with any modification without departing from the gist of the present invention. It is noted here that, in the present invention, those ranges that are expressed with "to" before and after numerical or physical property values each denote a range that includes the respective numerical or physical property values.

[C1. Negative Electrode Material for Nonaqueous Secondary Battery]

The negative electrode material for a nonaqueous secondary battery according to one embodiment of the present invention (hereinafter, may be simply referred to as "negative electrode material") is a negative electrode material for a nonaqueous secondary battery, which a graphite that contains at least either one of an amorphous carbonaceous material and a graphitic material in at least a part of the surface thereof. This negative electrode material has a pore distribution with two or more peaks as measured by a mercury intrusion method, and satisfies the following Formulae (1) and (2) when a cumulative pore volume of not larger than a minimal value of a valley between a peak with the smallest pore size and a next peak is defined as y [mL/g] and a coating ratio is defined as x (%), and the pore size at a peak top of the peak with the smallest pore size is 360 nm or smaller:

$$y>0.005, \text{ and} \qquad \text{Formula (1):}$$

$$y<-0.006x+0.12. \qquad \text{Formula (2):}$$

The negative electrode material for a nonaqueous secondary battery according to another embodiment of the present invention contains a graphite that contains at least either one of an amorphous carbonaceous material and a graphitic material in at least a part of the surface, and preferably has a pore distribution with two or more peaks as measured by a mercury intrusion method, and satisfies the following Formulae (1) and (3) when a pore volume of not larger than a minimal value of a valley between the peaks is defined as y (mL/g) and a coating ratio is defined as x (%):

$$y>0.005, \text{ and} \qquad \text{Formula (1):}$$

$$y<-0.006x+0.079. \qquad \text{Formula (3):}$$

The negative electrode material for a nonaqueous secondary battery according to the present embodiment can be pressed to a high density with a small press load for a high-capacity battery, and exerts an effect of providing a nonaqueous secondary battery with limited electrode expansion. The reason why the present invention exerts such an effect is not clear; however, it is considered as follows.

In the negative electrode material of the present embodiment, the cumulative pore volume in a pore size range of not larger than a minimal value in the pore volume measured by a mercury intrusion method serves as an index of the volume of pores existing inside the particles of the negative electrode material. By reducing this cumulative pore volume to a specific range with respect to the coating ratio, when an electrode is pressed to a certain density, it can be pressed with less deformation of the particles as compared to a case of using a conventional negative electrode material having a large volume of pores existing inside its particles, and the electrode is allowed to deform moderately when pressed as compared to a case of using a negative electrode material having no intraparticle pores at all. As a result, the electrode can be pressed to a higher density.

Further, in the mercury intrusion method, the smallest peak serves as an index of the size of intraparticle pores. A small peak of intraparticle pores indicates that pores of a small size exist in the particles and flakes in the particles are more compactly bound with each other. It is believed that such compactly bound flakes reduces the electrode expansion after cycling.

[C1-1. Physical Properties]

The negative electrode material according to one embodiment of the present invention satisfies the below-described relationship between the cumulative pore volume and the coating ratio. In addition, the negative electrode material of the present invention preferably satisfies the following physical properties.

<C1-1-1. Pore Volume>

The negative electrode material of the present invention has a pore distribution with two or more peaks as measured by a mercury intrusion method (mercury porosimetry), and satisfies the following Formulae (1) and (2) when a cumulative pore volume of not larger than a minimal value of a valley between a peak with the smallest pore size and a next peak is defined as y [mL/g] and a coating ratio is defined as x (%):

$$y>0.005, \text{ and} \qquad \text{Formula (1):}$$

$$y<-0.006x+0.12. \qquad \text{Formula (2):}$$

The number of peaks is two or more, preferably two.

The peaks of the pore distribution each represent interparticle voids or intraparticle voids and, when there is only one peak, it means that only interparticle voids exist, and the deformation in pressing is insufficient.

With regard to Formula (1), since the presence of intraparticle voids is required, y>0.005, preferably y>0.01, more preferably y>0.015.

With regard to Formula (2), when $y<\alpha x+\beta$, $\alpha$ represents the slope of Formula (2) in FIG. 1 where the coating ratio x is plotted on the abscissa and the cumulative pore volume y is plotted on the y-axis, and $\beta$ represents the y-intercept of Formula (2). The $\alpha$ represents the coating ratio of the amorphous carbonaceous material and the graphitic material and the efficiency of filling the intraparticle voids, and is thus preferably −0.0055 or smaller, but preferably −0.007 or larger, more preferably −0.0065 or larger, most preferably −0.006. The $\beta$ represents the amount of intraparticle voids before coating with at least either one of the amorphous carbonaceous material and the graphite material, and is thus preferably 0.11 or smaller, more preferably 0.10 or smaller, still more preferably 0.09 or smaller, particularly preferably 0.079 or smaller, most preferably 0.07. Values outside the respective ranges of the above-described Formulae indicate that pores are not well-covered with at least either one of the amorphous carbonaceous material and the graphitic material and good pressability thus cannot be obtained and, consequently, this adversely affects the rapid charging as well as output and storage characteristics.

A peak top on the side of small pore size indicates that the size of the intraparticle pores is small. The presence of fine intraparticle pores indicates that pores of a small size exist inside the particles and flakes in the particles are more densely packed with each other; therefore, the pore size at the peak top of the peak with the smallest pore size (peak on the small side) in the pore volume measured by a mercury intrusion method is preferably 350 nm or smaller, more preferably 280 nm or smaller, still more preferably 220 nm or smaller, yet still more preferably 160 nm or smaller, particularly preferably 100 nm or smaller, most preferably 85 nm or smaller. It is noted here that, when there is only one peak, it indicates the absence of intraparticle voids. A peak on the small side that appears outside of the above-described range indicates that large voids exist inside the particles at a high frequency, and that the binding strength of the flakes constituting the particles is low. This may consequently cause the particles to expand when charging and discharging are repeatedly performed, which may result in a further expansion of an electrode.

<C1-1-2. Cumulative Pore Volume>

In the negative electrode material of the present invention, the cumulative pore volume in a range of not larger than a minimal value of a valley between two peaks on the side of small pore size in the pore distribution is, in terms of a value determined by a mercury intrusion method (mercury porosimetry), usually 0.12 mL/g or less, preferably 0.080 mL/g or less, more preferably 0.070 mL/g or less, still more preferably 0.060 mL/g or less, particularly preferably 0.050 mL/g or less, most preferably 0.040 mL/g or less, but preferably 0.001 mL/g or greater, more preferably 0.002 mL/g or greater, still more preferably 0.005 mL/g or greater, particularly preferably 0.010 mL/g or greater, most preferably 0.020 mL/g or greater. When the cumulative pore volume is in this range, Li ions can move smoothly inside an electrode during charging and discharging, so that good rapid charge-discharge characteristics and low-temperature input-output characteristics are obtained, which is preferred.

As an apparatus for the above-described mercury porosimetry, a mercury porosimeter (AUTOPORE 9520, manufactured by Micromeritics Corporation) can be used. A sample (negative electrode material) is weighed to a value of about 0.2 g and enclosed in a powder cell, and a pretreatment is performed by evacuating the cell at room temperature under vacuum (50 μmHg or lower) for 10 minutes. Subsequently, mercury is introduced into the cell under a reduced pressure of 4 psia (about 28 kPa), and the pressure is increased stepwise from 4 psia (about 28 kPa) to 40,000 psia (about 280 MPa) and then reduced to 25 psia (about 170 kPa). The number of steps in the pressure increase is at least 80 and, in each step, the mercury intrusion volume is measured after an equilibration time of 10 seconds. From a mercury intrusion curve obtained in this manner, the pore distribution is calculated using the Washburn equation. This calculation is performed assuming that mercury has a surface tension ($\gamma$) of 485 dyne/cm and a contact angle ($\psi$) of 140°.

From the thus obtained results, a graph is prepared by plotting the pore size on the abscissa and the pore volume on the ordinate. In this graph, a minimal value of a valley between a peak with the smallest pore size and a next peak is determined, and the volume of pores in a range of this minimal value or less is defined as the cumulative pore volume y.

<C1-1-3. Coating Ratio>

In the present specification, the coating ratio x (%) can be determined as follows. That is, the coating ratio x (%) can be calculated from the mixing ratio of a graphite and an amorphous precursor and the firing yield after firing.

Coating ratio $x$ (%)=([Weight of sample after firing–Weight of graphite]/[Weight of sample after firing]×100)　　　　Formula (4):

When the mixing ratio and the firing yield of the sample are unknown, the coating ratio x (%) can be estimated from the difference in true density between the amorphous precursor and the graphite.

First, the crystallinity of the graphite used as a base material is checked based on the XRD d002 value. The theoretical d002 value of graphite is 3.354 Å, and a highly crystalline natural graphite shows a value close to this theoretical value. On the other hand, the d002 value of an artificial graphite largely varies depending on the type and the graphitization temperature of raw material coke. The d002 value is preferably 3.357 Å or less, more preferably 3.356 Å or less, still more preferably 3.354 Å. When the d002 value is outside of this range, the graphite has a low crystallinity and thus does not have a sufficient charge-discharge capacity, which is not preferred. Confirmation of high crystallinity with an XRD d002 value of 3.357 Å or less allows estimation of the coating ratio using the following estimation formula (5):

Coating ratio (%)=596.72−264.02×true density　　　　Formula (5):

The true density of the negative electrode material according to one embodiment of the present invention is preferably 2.200 g/cm$^3$ or higher, more preferably 2.210 g/cm$^3$ or higher, still more preferably 2.200 g/cm$^3$ or higher, and the theoretical true density of graphite is 2.262 g/cm$^3$.

The above-described coating ratio is usually 20% or lower, preferably 15% or lower, more preferably 10% or lower, still more preferably 9% or lower, particularly preferably 8% or lower, most preferably 7% or lower, but preferably 0.1% or higher, more preferably 1% or higher, still more preferably 2% or higher, particularly preferably 3% or higher. When the coating ratio is equal to or lower than the above-described upper limit, the ratio of the graphite in the negative electrode material is appropriate and the capacity is thus likely to be improved, while when the coating ratio is equal to or higher than the above-described lower limit, since the amount of the amorphous precursor is appropriate and lithium ions are thus allowed to move smoothly from the graphite surface, good rapid charge-discharge characteristics and low-temperature input-output characteristics are obtained.

The true density is defined as a density value measured by a liquid-phase substitution method (a pycnometer method) using butanol. In order to reduce measurement errors as much as possible, the measurement is performed at least three times, preferably 5 times, more preferably 7 times, particularly preferably 10 times, and an average thereof is preferably used.

The d002 value of the carbon material of the present invention can be determined by X-ray diffractometry according to the method of the Japan Society for the Promotion of Science. The conditions of the X-ray diffractometry are as follows.

X-ray: Cu-K$\alpha$ radiation

Measurement range and step angle: 20° 28 30° and 0.013°

Sample adjustment: A powder sample is filled into a 0.2 mm-deep recess of a sample sheet to prepare a flat sample surface.

As the interplanar spacing d002 and the crystallite size Lc002 that are determined by the above-described X-ray diffractometry, values measured according to the method of the Japan Society for the Promotion of Science can be used. It is noted here that, in the method of the Japan Society for the Promotion of Science, values of 100 nm (1,000 Å) or larger are not distinguished and are all indicated as ">1,000 (Å)".

<C1-1-4. BET Specific Surface Area (SA)>

The negative electrode material according to one embodiment of the present invention has a specific surface area (SA), which is determined by a BET method, of preferably 0.5 m$^2$/g or larger, more preferably 0.8 m$^2$/g or larger, still more preferably 1.0 m$^2$/g or larger, but preferably 10.0 m$^2$/g or smaller, more preferably 6.5 m$^2$/g or smaller, still more preferably 5.0 m$^2$/g or smaller, particularly preferably 4.0 m$^2$/g or smaller. When the SA is equal to or larger than the above-described lower limit value, sites for entry and exit of Li ions are secured, so that the rapid charge-discharge characteristics and the low-temperature input-output characteristics of a lithium ion secondary battery tend to be improved. Meanwhile, when the SA is equal to or smaller than the above-described upper limit value, since the activity of an active material against an electrolyte solution is prevented from being excessively high, side reactions of the active material with an electrolyte solution are inhibited and a reduction in the battery initial charge-discharge efficiency and an increase in gas generation are prevented, so that the battery capacity tends to be improved.

The BET specific surface area (SA) can be measured using MACSORB manufactured by Mountech Co., Ltd. Specifically, a sample is preliminarily vacuum-dried at 100° C. for 3 hours in a nitrogen stream and subsequently cooled to the liquid nitrogen temperature, and the measurement can be performed by a gas-flowing nitrogen adsorption single-point BET method using a nitrogen-helium mixed gas precisely adjusted to have a relative nitrogen pressure value of 0.3 with respect to the atmospheric pressure.

<C1-1-5. Tap Density>

The negative electrode material according to one embodiment of the present invention has a tap density (g/cm$^3$) of preferably 1.15 g/cm$^3$ or higher, more preferably 1.16 g/cm$^3$ or higher, still more preferably 1.17 g/cm$^3$ or higher, particularly preferably 1.18 g/cm$^3$ or higher, most preferably 1.20 g/cm$^3$ or higher, but preferably 1.40 g/cm$^3$ or lower, more preferably 1.35 g/cm$^3$ or lower, still more preferably 1.30 g/cm$^3$ or lower. When the tap density is equal to or higher than the above-described lower limit, since the processability such as streaking in the electrode production is favorable and the packing property of a negative electrode material layer is improved, a high-density negative electrode sheet with favorable rollability is likely to be formed and the density thereof can be improved, so that not only the degree of inflection of Li ion migration pathways is reduced when such an electrode sheet is made into an electrode body, but also the shapes of interparticle voids are well-controlled and an electrolyte solution is thus allowed to move smoothly, as a result of which the rapid charge-discharge characteristics are improved, which is preferred. Meanwhile, when the tap density is equal to or lower than the above-described upper limit value, the particles have an appropriate amount of space on the surface and inside and are thus prevented from being excessively hard, so that excellent electrode pressability as well as excellent low-temperature input-output characteristics and rapid charge-discharge characteristics are obtained, which is preferred.

The tap density is measured using a powder density meter TAP DENSER KYT-3000 (manufactured by Seishin Enterprise Co., Ltd.). Specifically, after filling up a 20-cc tap cell with a sample by dropping the sample thereto, the cell is tapped 1,000 times with a stroke length of 10 mm, and the density measured at this point is defined as the tap density.

<C1-1-6. Pellet Density @ 2.4 t/cm$^3$>

Two kinds of jigs, which are a φ10 shaft of 35 mm in length as a pressing jig and a φ10 shaft of 6 mm in length as a support jig, are inserted into a mold of φ10 in inner diameter, and this mold is subsequently set on an apparatus capable of measuring the load and the height (thickness) upon sandwiching a sample (e.g., a powder resistance measurement system manufactured by Mitsubishi Chemical Analytech Co., Ltd.). A 15-kgf load is applied using a hydraulic pump, and the jig height is measured. Subsequently, only the pressing jig is taken out, 0.6 g of composite particles is added, and the pressing jig is inserted again. The mold is set on a hydraulic jack (e.g., HIGH PRESSURE JACK J-1, manufactured by AS ONE Corporation), and a pressure valve is fastened to slowly increase the pressure to 0.9 t/cm$^2$ and, after quickly increasing the pressure to 2.4 t/cm$^2$, this pressure is maintained for 3 seconds, and the hand is removed from the hydraulic jack. After a lapse of 60 seconds, the pressure valve is released to reduce the pressure. Thereafter, the mold is once again set on the apparatus capable of measuring the load and the height upon sandwiching a sample, a 15-kgf load is applied using the hydraulic pump, and the post-press jig height is measured. In addition, the post-press weight of the composite particles is measured, and the density calculated from the difference in the thus measured jig height values and the measured weight is defined as the pellet density. The load per unit area can be calculated from the reading on the hydraulic jack, the cylinder diameter, and the inner diameter of the mold. For example, in the below-described Examples, a φ22-mm cylinder was used, and a load of 2.4 t/cm$^2$ was applied by pressing until the reading on the jack was 500 kgf.

<C1-1-7. Pellet Density—Tap Density>

A value obtained by subtracting the tap density (g/cm$^3$) from the pellet density represents the ease of packing with application of a load, and can be used as an index of the particle hardness.

The value of [pellet density–tap density] is preferably 0.1 g/cm$^3$ or larger, more preferably 0.15 g/cm$^3$ or larger, still more preferably 0.2 g/cm$^3$ or larger, particularly preferably 0.26 g/cm$^3$ or larger, but preferably 0.8 g/cm$^3$ or smaller, more preferably 0.6 g/cm$^3$ or smaller, still more preferably 0.4 g/cm$^3$ or smaller. When the value of [pellet density–tap density] is equal to or smaller than the above-described upper limit value, the particles have an appropriate hardness and are thus not overly compressed on the electrode surface when pressed to a high density, so that an electrolyte solution is allowed to move smoothly, which is preferred. Meanwhile, when the value of [pellet density–tap density] is equal to or higher than the above-described lower limit, the particles are not excessively hard and thus can be pressed to a high density, which is also preferred.

<C1-1-8. Volume-Based Average Particle Size (Average Particle Size d50)>

The negative electrode material according to one embodiment of the present invention has a volume-based average particle size (hereinafter, also referred to as "average particle size d50") of preferably 1 μm or larger, more preferably 3 μm or larger, still more preferably 4 μm or larger, particularly preferably 5 μm or larger, but preferably 50 μm or smaller, more preferably 40 μm or smaller, still more preferably 30 μm or smaller, particularly preferably 25 μm or smaller, most preferably 20 μm or smaller. When the d50 value is equal to or larger than the above-described lower limit value, an increase in the irreversible capacity and a loss of the initial battery capacity tend to be inhibited, while when the d50 value is equal to or smaller than the above-described upper limit value, the occurrence of a process defect such as streaking in slurry application is inhibited, so that the rapid charge-discharge characteristics and the low-temperature input-output characteristics tend to be improved.

The average particle size (d50) is defined as a volume-based median diameter determined by suspending 0.01 g of composite particles in 10 mL of a 0.2%-by-weight aqueous solution of polyoxyethylene sorbitan monolaurate (e.g., TWEEN 20 (registered trademark)) which is a surfactant, introducing the resulting suspension as a measurement sample into a commercially available laser diffraction-scattering particle size distribution analyzer (e.g., LA-920 manufactured by HORIBA, Ltd.), irradiating the measurement sample with 28-kHz ultrasonic wave for 1 minute at an output of 60 W, and then performing a measurement using the analyzer.

[C2. Production Method]

A method of producing the negative electrode material for a nonaqueous secondary battery according to one embodiment of the present invention is not particularly restricted as long as it is a method by which a negative electrode material can be produced in such a manner that it contains a graphite containing at least either one of an amorphous carbonaceous material and a graphitic material in at least a part of the surface and satisfies a specific relationship of intraparticle voids with respect to the coating ratio, and that a peak top of a peak at a minimal value or less in the pore volume measured by a mercury intrusion method satisfies a specific size. The negative electrode material for a nonaqueous secondary battery according to one embodiment of the present invention can be produced by, for example, finely pulverizing flakes, performing a press treatment on a spherical graphite obtained by a spheroidization treatment in the presence of a granulating agent, mixing this spherical graphite with an amorphous carbon precursor (raw material of amorphous carbonaceous material), and firing the resultant. The press treatment may be, for example, an anisotropic press treatment or an isotropic press treatment, and an isotropic press treatment is preferred from the standpoint of controlling the relationship of the cumulative pore volume y and the coating ratio x to be in the specific range. The conditions of the press treatment are not particularly restricted; however, the relationship of the cumulative pore volume y and the coating ratio x can be controlled to be in a specific range by performing the treatment at 50 MPa or more and 300 MPa or less. As a condition of the press treatment, from the standpoint of controlling the relationship of the cumulative pore volume y and the coating ratio x to be in the specific range, the press treatment is performed at preferably 100 MPa or higher, more preferably 120 MPa or higher, still more preferably 140 MPa or higher, particularly preferably 160 MPa or higher, most preferably 180 MPa or higher, but preferably 280 MPa or lower, more preferably 260 MPa or lower, still more preferably 240 MPa or lower, particularly preferably 230 MPa or lower, most preferably 220 MPa or lower. The above-described production method is preferred because not only the pore volume per coating ratio but also the size of a peak top of a small peak can be controlled by controlling, specifically, the flake pulverization conditions, the spheroidization conditions, the molding pressure, and the coating ratio.

<C2-1. Graphite>

The negative electrode material according to one embodiment of the present invention contains a graphite. The graphite used for producing the negative electrode material according to one embodiment of the present invention is preferably of the below-described type exhibiting the below-described physical properties. It is noted here that, unless otherwise specified, the measurement conditions and the definitions of the physical properties of the graphite are the same as those described above for the negative electrode material.

The type of the graphite is not particularly restricted as long as the graphite is capable of occluding and releasing lithium ions, and the graphite may be either a natural graphite or an artificial graphite. The natural graphite may be, for example, a flake graphite, a vein graphite or an amorphous graphite, and the natural graphite preferably has a low impurity content and is, as required, subjected to a known purification treatment before use. Examples of the artificial graphite include those produced by firing and graphitizing an organic compound, such as a coal-tar pitch, a coal-based heavy oil, an atmospheric residue oil, a petroleum-based heavy oil, an aromatic hydrocarbon, a nitrogen-containing cyclic compound, a sulfur-containing cyclic compound, a polyphenylene, a polyvinyl chloride, a polyvinyl alcohol, a polyacrylonitrile, a polyvinyl butyral, a natural polymer, a polyphenylene sulfide, a polyphenylene oxide, a furfuryl alcohol resin, a phenol-formaldehyde resin or an imide resin, at a temperature in a range of usually 2,500° C. to 3,200° C. In this process, a silicon-containing compound, a boron-containing compound or the like can also be used as a graphitization catalyst.

As for the crystallinity (graphitization degree) of the graphite, the (002)-plane interplanar spacing (d002) determined by wide-angle X-ray diffractometry according to the method of the Japan Society for the Promotion of Science is preferably 3.357 Å or less, still more preferably 3.356 Å or less, more preferably 3.354 Å or less. When the d002 value is outside of this range, the graphite has an appropriate crystallinity and a sufficient charge-discharge capacity, which is preferred.

As for the shape of the graphite, from the standpoint of the rapid charge-discharge characteristics, the graphite is particularly preferably a spherical graphite (spheroidized graphite). Specifically, the method of spheroidizing graphite particles includes the granulation step of granulating a raw carbon material by applying a mechanical energy of at least one of impact, compression, friction and shear force, and the granulation step is preferably carried out in the presence of a granulating agent that satisfies the following conditions 1), 2) and 3):

1) the granulating agent is liquid during the step of granulating the carbon raw material;
2) the granulating agent contains an organic compound giving amorphous carbon; and
3) the granulating agent does not contain an organic solvent or, when the granulating agent contains an organic solvent(s), at least one of the organic solvents does not have a flash point, or has a flash point of 5° C. or higher.

As long as the method includes the granulation step, the method may further include other steps as required. The other steps may be carried out individually, or a plurality thereof may be carried out simultaneously. In one embodiment, the method includes, for example, the following first to fifth steps. These steps will now be described.

(First step) Step of adjusting the particle size of a raw carbon material
(Second step) Step of mixing the raw carbon material with a granulating agent
(Third step) Step of granulating the raw carbon material
(Fourth step) Step of removing the granulating agent
(Fifth step) Step of impregnating the thus granulated carbon material with an amorphous carbonaceous material having a lower crystallinity than the raw carbon material (First Step) Step of Adjusting Particle Size of Raw Carbon Material The above-described graphite is used as a raw carbon material in the production of the negative electrode material for a nonaqueous secondary battery according to the present invention.

The raw carbon material is preferably adjusted to have the following particle size in the first step. That is, the resulting raw carbon material has an average particle size (d50) of preferably 1 μm or larger, more preferably 2 μm or larger, still more preferably 3 μm or larger, but preferably 30 μm or smaller, more preferably 20 μm or smaller, still more preferably 15 μm or smaller, particularly preferably 12 μm or smaller, most preferably 9 μm or smaller.

By adjusting the particle size d50 of the raw carbon material to be in the above-described range, the raw carbon material after a spheroidization treatment has a preferred particle size as a negative electrode material, and the distance between flakes is reduced and the particles are made rigid, which is preferred.

As a method of adjusting the d50 of the raw carbon material to be in the above-described range, for example, a method of performing at least either one of pulverization and classification of (natural) graphite particles may be employed.

An apparatus used for the pulverization is not particularly restricted, and examples thereof include: coarse pulverizers, such as a shearing mill, a jaw crusher, an impact crusher, and a cone crusher; intermediate pulverizers, such as a roll crusher and a hammer mill; and fine pulverizers, such as a mechanical pulverizer, an air flow-type pulverizer, and a swirling flow-type pulverizer. Specific examples include a ball mill, a vibration mill, a pin mill, a stirring mill, a jet mill, a cyclone mill, and a turbo mill. Particularly, when graphite particles having a d50 of 10 μm or smaller are to be obtained, it is preferred to use an air flow-type pulverizer or a swirling flow-type pulverizer.

An apparatus used for the classification treatment is not particularly restricted. For example, in the case of performing dry sieving, a rotary sieve, a shaking sieve, a gyratory sieve, a vibratory sieve or the like can be used; in the case of performing dry air-flow classification, a gravity classifier, an inertial classifier, a centrifugal classifier (e.g., a classifier or a cyclone) or the like can be used; and, in the case of performing wet sieving, a mechanical wet classifier, a hydraulic classifier, a sedimentation classifier, a centrifugal wet classifier or the like can be used.

The raw carbon material obtained in the first step preferably satisfies the following physical properties.

With regard to the (002)-plane interplanar spacing (d002) and the crystallite size (Lc) of the raw carbon material which are determined by wide-angle X-ray diffractometry, the d002 and the Lc are usually 3.37 Å or smaller and 900 Å or larger, preferably 3.36 Å or smaller and 950 Å or larger, respectively. The d002 and the Lc are values that represent the crystallinity of a bulk carbon material. A smaller d002 value and a larger Lc value indicate that the carbon material has a higher crystallinity and the amount of lithium entering between graphite layers approaches a theoretical value, as a result of which the capacity is increased. When the crystallinity is excessively low, excellent battery characteristics such as a high capacity and a low irreversible capacity, which are attained with the use of a high-crystallinity graphite as an electrode, are unlikely to be expressed. It is particularly preferred that the d002 and the Lc have a combination of values in the above-described respective ranges.

An X-ray diffraction is measured by the following method. First, a carbon powder is added and mixed with an X-ray standard high-purity silicon powder in an amount of about 15% by weight with respect to a total amount to prepare a material, and a wide-angle X-ray diffraction curve thereof is measured by reflection diffractometry using a $CuK_\alpha$ radiation monochromatized by a graphite monochromator as a radiation source. Thereafter, the interplanar spacing (d002) and the crystallite size (Lc) are determined according to the method of the Japan Society for the Promotion of Science.

A packed structure of the raw carbon material varies depending on, for example, the size and the shape of particles and the degree of interactivity between particles and, in the present invention, the tap density can also be used as an index for quantitatively discussing the packed structure. It has been confirmed by the studies conducted by the present inventors that, in graphitic particles having substantially the same true density and average particle size, the tap density increases as the particle shape becomes more spherical and the particle surface becomes smoother. In other words, in order to increase the tap density, it is important to bring the particle shape closer to being spherical and to maintain the smoothness of the particle surface. When the particle shape is close to being spherical and the particle surface is smooth, the powder packing properties are also improved considerably. The tap density of the raw carbon material is preferably 0.1 g/cm³ or higher, more preferably 0.15 g/cm³ or higher, still more preferably 0.2 g/cm³ or higher, particularly preferably 0.3 g/cm³ or higher. The tap density is determined by the method described below in the section of Examples.

The argon-ion laser Raman spectrum of the raw carbon material is used as an index of the nature of the particle surface. The Raman R value, which is a ratio of the intensity of a peak near 1,360 cm$^{-1}$ with respect to the intensity of a peak near 1,580 cm$^{-1}$ in the argon-ion laser Raman spectrum of the raw carbon material, is preferably 0.05 or more and 0.9 or less, more preferably 0.05 or more and 0.7 or less, still more preferably 0.05 or more and 0.5 or less. The R value is an index of the crystallinity near the surface (from the particle surface to a depth of about 100 Å) of carbon particles, and a smaller R value indicates a higher crystallinity or a less disordered crystalline state. The Raman spectrum is measured by the following method. Specifically, a sample is loaded by letting the particles to be measured free-fall into a measuring cell of a Raman spectroscope, and the measurement is performed while irradiating an argon-ion laser beam into the measuring cell and rotating the measuring cell in a plane perpendicular to the laser beam. The wavelength of the argon-ion laser beam is set at 514.5 nm.

The BET specific surface area (SA) of a flake graphite used as a raw material is preferably 5 m²/g or larger, more preferably 10 m²/g or larger, but preferably 25 m²/g or smaller, more preferably 20 m²/g or smaller. When the BET specific surface area (SA) is in this range, the flake graphite is efficiently spheroidized in the subsequent spheroidization step, which is preferred.

The BET specific surface area (SA) of the flake graphite used as a raw material can be measured using MACSORB manufactured by Mountech Co., Ltd. Specifically, a sample is preliminarily vacuum-dried at 100° C. for 3 hours in a nitrogen stream and subsequently cooled to the liquid nitrogen temperature, and the measurement can be performed by a gas-flowing nitrogen adsorption single-point BET method using a nitrogen-helium mixed gas precisely adjusted to have a relative nitrogen pressure value of 0.3 with respect to the atmospheric pressure.

(Second Step) Step of Mixing Raw Carbon Material with Granulating Agent

The granulating agent used in one embodiment of the present invention satisfies the following conditions: 1) the granulating agent is liquid during the step of granulating the carbon raw material; 2) the granulating agent contains an organic compound giving amorphous carbon; and 3) the granulating agent does not contain an organic solvent or, when the granulating agent contains an organic solvent(s), at least one of the organic solvents does not have a flash point, or has a flash point of 5° C. or higher.

With the granulating agent satisfying these requirements, the granulating agent forms liquid bridges between the raw carbon materials in the subsequent third step of granulating the raw carbon material and, as a result, an attractive force, which is generated between the raw carbon materials by the capillary negative pressure in the liquid bridges and the liquid surface tension, acts as a liquid cross-linking adhesive force between the particles; therefore, the liquid cross-linking adhesive force between the raw carbon materials is increased, so that the raw carbon material adheres to the particle surface more firmly and the distance between flakes can be reduced more effectively, which is preferred.

In the present invention, the strength of the liquid cross-linking adhesive force between the raw carbon materials, which force is generated by the liquid bridges formed by the granulating agent between the raw carbon materials, is proportional to the value of γ cos θ (wherein, γ represents the surface tension of a liquid, and θ represents the contact angle between the liquid and a particle). That is, during granulation of the raw carbon material, the granulating agent is preferably highly wettable with the raw carbon material and, specifically, it is preferred to select a granulating agent having a cos θ value of larger than 0 (cos θ>0) to satisfy γ cos θ>0, and the granulating agent preferably has a contact angle θ of smaller than 90° with graphite as measured by the following method.
(Method of Measuring Contact Angle θ with Graphite)

The granulating agent in an amount of 1.2 μL is added dropwise onto the surface of HOPG and, once wetting and spreading has ended and the rate of change in contact angle θ in one second has been decreased to 3% or less (also referred to as "steady state"), the contact angle is measured using a contact angle meter (automatic contact angle meter DM-501, manufactured by Kyowa Interface Science Co., Ltd.). When a granulating agent having a viscosity of 500 cP or lower at 25° C. is used, a value measured at 25° C. is adopted as a measured value of the contact angle 9, while when a granulating agent having a viscosity of higher than 500 cP at 25° C. is used, a value measured at a temperature increased to a point where the viscosity is not higher than 500 cP is adopted as a measured value of the contact angle θ.

Further, as the contact angle θ between the raw carbon material and the granulating agent comes closer to 0°, the γ cos θ value increases and the liquid cross-linking adhesive force between the graphite particles is thus increased, allowing the graphite particles to adhere more firmly to each other. Therefore, the contact angle θ between the granulating agent and the graphite is more preferably 85O or smaller, still more preferably 80° or smaller, yet still more preferably 50° or smaller, particularly preferably 30° or smaller, most preferably 20° or smaller.

The γ cos θ value is increased and the adhesive force between the graphite particles is improved also by using a granulating agent having a high surface tension (γ); therefore, the value of γ is preferably 0 or larger, more preferably 15 or larger, still more preferably 30 or larger. The surface tension (γ) of the granulating agent can be measured by the Wilhelmy method using a surface tensiometer (e.g., DCA-700 manufactured by Kyowa Interface Science Co., Ltd.).

A viscous force acts as a resistance component for the extension of liquid bridges associated with the movement of particles, and the strength of the viscous force is proportional to the viscosity. Therefore, the viscosity of the granulating agent is preferably 1 cP or higher during the granulation step, although it is not particularly restricted as long as the granulating agent is liquid during the granulation step of granulating the raw carbon material.

The viscosity of the granulating agent at 25° C. is preferably 1 cP to 100,000 cP, more preferably 5 cP to 10,000 cP, still more preferably 10 cP to 8,000 cP, particularly preferably 50 cP to 6,000 cP. When the viscosity is in this range, detachment of adhered particles caused by impact force of, for example, a collision with a rotor or a casing, can be inhibited during granulation of the raw carbon material.

The viscosity of the granulating agent used in the present invention is measured using a rheometer (e.g., ARES manufactured by Rheometric Scientific Ltd.) in which an appropriate amount of a measurement subject (the granulating agent in this case) is placed in a cup and controlled at a prescribed temperature. In the present specification, the viscosity is defined as: a value measured at a shear rate of $100\ s^{-1}$ when the shear stress at a shear rate of $100\ s^{-1}$ is 0.1 Pa or higher; a value measured at shear rate of $1,000\ s^{-1}$ when the shear stress at a shear rate of $100\ s^{-1}$ is less than 0.1 Pa; or a value measured at a shear rate giving a shear stress of 0.1 Pa or higher when the shear stress at a shear rate of $1,000\ s^{-1}$ is less than 0.1 Pa. The shear stress can also be controlled to be 0.1 Pa or higher by using a spindle having a shape suitable for low-viscosity fluids.

Further, the viscosity of the granulating agent at the time of mixing the raw carbon material with the granulating agent is preferably 1 cP or more and 1,000 cP or less, more preferably 5 cP or more and 800 cP or less, still more preferably 10 cP or more and 600 cP or less, particularly preferably 20 cP or more and 500 cP or less. When the viscosity is in this range, the granulating agent uniformly adheres to the raw carbon material, and detachment of adhered particles caused by impact force of, for example, a collision with a rotor or a casing, can be inhibited during granulation of the raw carbon material. In addition, the granulating agent flows into fine pores of 1 nm to 4 nm and is converted into amorphous carbon in the subsequent step, whereby such fine pores can be reduced, so that a negative electrode material having excellent low-temperature input-output characteristics and high-temperature storage characteristics can be produced, which is preferred. The viscosity in the step of granulating the raw carbon material can be adjusted by adding the below-described organic solvent and/or controlling the mixing temperature.

The granulating agent used in one embodiment of the present invention contains an organic compound giving amorphous carbon. This allows the granulating agent to flow into fine pores of 1 nm to 4 nm and form amorphous carbon, whereby such fine pores can be reduced, so that a negative electrode material having excellent low-temperature input-output characteristics and high-temperature storage characteristics can be produced. Examples of the organic compound include petroleum-based or coal-based heavy oils, tars and pitches, as well as resins such as polyvinyl alcohols, polyacrylonitriles, phenolic resins, and cellulose. As required, these organic compounds may be diluted with, for example, an aqueous solvent, or an organic solvent which does not have a flash point or has a flash point of 5° C. or higher. Among these organic compounds, one containing a petroleum-based or coal-based heavy oil, tar, pitch or the like that is a soft carbon is preferred since such an organic compound is unlikely to generate fine pores as amorphous carbon and fine pores of 1 nm to 4 nm can thus be reduced more efficiently.

Further, the granulating agent used in one embodiment of the present invention does not contain an organic solvent or, when the granulating agent contains an organic solvent(s), at least one of the organic solvents does not have a flash point, or has a flash point of 5° C. or higher. By this, ignition of the granulating agent induced by impact or heat generation, as well as fire and explosion during granulation of the raw carbon material in the subsequent third step can be inhibited, so that the production can be carried out in a stable and efficient manner.

Examples of an organic solvent having a flash point of 5° C. or higher include: synthetic oils, such as paraffinic oils (e.g., liquid paraffin), olefinic oils, naphthenic oils, and aromatic oils; natural oils, such as vegetable oils and fats, animal fatty acids, esters, and higher alcohols; aromatic hydrocarbons, for example, alkylbenzenes such as xylene, isopropyl benzene, ethylbenzene, and propyl benzene, alkylnaphthalenes such as methylnaphthalene, ethylnaphthalene, and propylnaphthalene, allylbenzenes such as styrene, and allylnaphthalenes; aliphatic hydrocarbons, such as octane, nonane, and decane; ketones, such as methyl isobutyl ketone, diisobutyl ketone, and cyclohexanone; esters, such as propyl acetate, butyl acetate, isobutyl acetate, and amyl acetate; alcohols, such as methanol, ethanol, propanol, butanol, isopropyl alcohol, isobutyl alcohol, ethylene glycol, propylene glycol, diethylene glycol, triethylene glycol, tetraethylene glycol, and glycerol; glycol derivatives, such as ethylene glycol monomethyl ether, ethylene glycol monoethyl ether, ethylene glycol monobutyl ether, diethylene glycol monobutyl ether, triethylene glycol monobutyl ether, tetraethylene glycol monobutyl ether, methoxy propanol, methoxy propyl-2-acetate, methoxymethyl butanol, methoxybutyl acetate, diethylene glycol dimethyl ether, dipropylene glycol dimethyl ether, diethylene glycol ethyl methyl ether, triethylene glycol dimethyl ether, tripropylene glycol dimethyl ether, tetraethylene glycol dimethyl ether, and ethylene glycol monophenyl ether; ethers, such as 1,4-dioxane; nitrogen-containing organic compounds, such as dimethylformamide, pyridine, 2-pyrrolidone, and N-methyl-2-pyrrolidone; sulfur-containing organic compounds, such as dimethyl sulfoxide; halogen-containing organic compounds, such as dichloromethane, chloroform, carbon tetrachloride, dichloroethane, trichloroethane, and chlorobenzene; and mixtures thereof, but do not include compounds having a low flash point, such as toluene. The above-exemplified organic solvents can also each be used by itself as a granulating agent. In the present specification, the flash point can be measured by any known method.

Examples of a method of mixing the raw carbon material with the granulating agent include a method of mixing the raw carbon material with the granulating agent using a mixer or a kneader, and a method of mixing the raw carbon material with the granulating agent prepared by dissolving the organic compound in a low-viscosity diluted solvent (organic solvent), and subsequently removing the diluted solvent (organic solvent). Among these methods, the method of mixing the raw carbon material with the granulating agent using a mixer or a kneader is preferred since the greater the amount of a component giving a carbonaceous material in the organic compound, the more efficiently fine particles of 1 nm to 4 nm can be reduced. Alternatively, a method in which, at the time of granulating the raw carbon material in the subsequent third step, the granulating agent and the raw carbon material are loaded to a granulator and the steps of mixing and granulating the raw carbon material with the granulating agent are carried out simultaneously, may be employed as well.

The amount of the granulating agent to be added is preferably 0.1 parts by weight or more, more preferably 1 part by weight or more, still more preferably 3 parts by weight or more, yet still more preferably 6 parts by weight or more, even more preferably 10 parts by weight or more, particularly preferably 12 parts by weight or more, most preferably 15 parts by weight or more, but preferably 1,000 parts by weight or less, more preferably 100 parts by weight or less, still more preferably 80 parts by weight or less, particularly preferably 50 parts by weight or less, most preferably 30 parts by weight or less, with respect to 100 parts by weight of the raw carbon material. When the granulating agent is added in this range, problems such as a decrease in the spheroidization degree caused by a reduction in the interparticle adhesive force, and deterioration of the productivity due to adhesion of the raw carbon material to an apparatus, are less likely to occur.

(Third Step) Step of Granulating Raw Carbon Material (Step of Performing Spheroidization Treatment on Raw Carbon Material)

A carbon material is preferably obtained by subjecting the raw carbon material to a spheroidization treatment (hereinafter, also referred to as "granulation") where a mechanical action(s), such as impact compression, friction and/or shear force, is/are applied to the raw carbon material. The thus spheroidized graphite is preferably made of a plurality of flake or scale-like graphites and ground graphite fine powder, particularly preferably made of a plurality of flake graphites.

The method of the present invention preferably includes the granulation step of granulating the raw carbon material by applying a mechanical energy of at least one of impact, compression, friction, and shear force. For this step, for example, an apparatus which repeatedly applies mechanical actions, such as compression, friction and shear force including the interaction of the raw carbon material, mainly through impact force, can be used.

Specifically, it is preferred to use an apparatus which is equipped with a rotor having a large number of blades inside a casing and performs a surface treatment by rotating the rotor at a high speed and thereby applying mechanical actions, such as impact, compression, friction and shear force, to the raw carbon material introduced to the inside. Further, an apparatus which has a mechanism for repeatedly applying mechanical actions by circulating the raw carbon material is preferred.

Examples of such an apparatus include: Hybridization System (manufactured by Nara Machinery Co., Ltd.); KRYPTRON and KRYPTRON ORB (manufactured by EarthTechnica Co., Ltd.); CF Mill (manufactured by UBE Industries, Ltd.); MECHANO FUSION System, NOBILTA, and FACULTY (manufactured by Hosokawa Micron Group); THETA COMPOSER (manufactured by Tokuju Co., Ltd.); and COMPOSI (manufactured by Nippon Coke & Engineering. Co., Ltd). Thereamong, Hybridization System manufactured by Nara Machinery Co., Ltd. is preferred.

When a treatment is performed using any of the above-described apparatuses, for example, the peripheral speed of the rotating rotor is preferably 30 m/sec or faster, more preferably 50 m/sec or faster, still more preferably 60 m/sec or faster, particularly preferably 70 m/sec or faster, most preferably 80 m/sec or faster, but 100 m/sec or slower. When the peripheral speed is in this range, spheroidization can be performed more efficiently simultaneously with adhesion and incorporation of fine powder to and into a base material.

The treatment of applying mechanical actions to the raw carbon material can also be performed by simply passing the raw carbon material through the apparatus; however, it is preferred to perform the treatment by circulating or retaining the raw carbon material in the apparatus for 30 seconds or longer, more preferably 1 minute or longer, still more preferably 3 minutes or longer, particularly preferably 5 minutes or longer.

The viscosity of the granulating agent in the step of granulating the raw carbon material is preferably 1 cP or higher, more preferably 5 cP or higher, still more preferably 10 cP or higher, particularly preferably 20 cP or higher, but preferably 1,000 cP or lower, more preferably 800 cP or lower, still more preferably 600 cP or lower, particularly preferably 500 cP or lower. When the viscosity is in this range, detachment of adhered particles caused by impact force of, for example, a collision with a rotor or a casing, can be inhibited at the time of granulating the raw carbon material in the presence of the granulating agent, and the granulating agent flows into fine pores of 1 nm to 4 nm and is converted into amorphous carbon in the subsequent step, whereby such fine pores can be reduced, so that a negative electrode material having excellent low-temperature input-output characteristics and high-temperature storage characteristics can be produced, which is preferred. The above-described viscosity in the step of granulating the raw carbon material can be adjusted by adding an organic solvent and/or controlling the granulation temperature.

In the step of granulating the raw carbon material, the raw carbon material may be granulated in the presence of other substance(s), and examples of the other substances include metals alloyable with lithium and oxides thereof, flake graphite, scale-like graphite, ground graphite fine powder, amorphous carbon, and green coke. By granulating the raw carbon material in combination with other substances, negative electrode materials for non-aqueous secondary batteries, which have various types of particle structures, can be produced.

The raw carbon material, the granulating agent, and the other substances may be added to the above-described apparatus all at once, or may be added separately and sequentially, or continuously. Further, the raw carbon material, the granulating agent, and the other substances may be added to the above-described apparatus simultaneously, after being mixed, or individually. The raw carbon material, the granulating agent, and the other substances may be mixed at the same time; the other substances may be added to a mixture of the raw carbon material and the granulating agent; or the raw carbon material may be added to a mixture of the other substances and the granulating agent. Depending on the particle design, these materials can be added and mixed at any other appropriate timing.

In the spheroidization treatment of the carbon material, it is more preferred to perform the spheroidization treatment while allowing fine powder generated during the spheroidization treatment to effectively adhere to particle surfaces. By performing the spheroidization treatment while allowing fine powder generated during the spheroidization treatment to adhere to particle surfaces, small flakes are compactly bound to the gaps between large flakes, so that flakes can be bound more firmly to each other. As a result, intraparticle voids can be reduced more effectively when the resultant is subsequently coated with an amorphous or graphitized material. In addition, not only the amount of edges that can be utilized as Li ion insertion/desorption sites is increased, but also an electrolyte solution is effectively and efficiently distributed into the intraparticle voids and this enables to efficiently utilize the Li ion insertion/desorption sites, so that good low-temperature output characteristics and cycle characteristics tend to be provided. The fine powder to be adhered to a base material is not limited to the fine powder generated during the spheroidization treatment, and flake graphite may be adjusted to contain fine powder simultaneously with particle size adjustment, and the fine powder may be added and mixed at any other appropriate timing.

In order to allow fine powder to effectively adhere to the particle surfaces of the base material, it is preferred to enhance the adhesive forces between flake graphite particle and flake graphite particle, between the flake graphite particle and fine powder particle, and between the fine powder particle and fine powder particle. Specific examples of these adhesive forces between particles include van der Waals force and electrostatic attractive force which do not involve an interparticle mediator, and physical or chemical crosslinking forces which involve interparticle mediators.

With regard to the van der Waals force, a relationship of [self-weight]<[adhesive force] becomes more notable as the average particle size (d50) is reduced further below 100 μm. Accordingly, the smaller the average particle size (d50) of the flake graphite (raw carbon material) used as a raw material of spheroidized graphite, the larger becomes the interparticle adhesive force, and this is likely to create a state where fine powder is adhered to the base material and enclosed in spheroidized particles, which is preferred. The average particle size (d50) of the flake graphite is preferably 1 μm or larger, more preferably 2 μm or larger, still more preferably 3 μm or larger, but preferably 80 μm or smaller, more preferably 50 μm or smaller, still more preferably 35 μm or smaller, particularly preferably 20 μm or smaller, especially preferably 10 μm or smaller, most preferably 8 μm or smaller.

Examples of the physical or chemical crosslinking forces which involve interparticle mediators include physical or chemical crosslinking forces that involve a liquid mediator or a solid mediator. Examples of the chemical crosslinking forces include crosslinking forces of covalent bonds, ionic bonds, hydrogen bonds and the like that are formed between particles and interparticle mediators by, for example, chemical reaction, sintering, or mechanochemical effect.

(Fourth Step) Step of Removing Organic Solvent(s) and Portion of Granulating Agent The method of the present invention preferably includes the step of removing organic solvent(s) and a portion of the granulating agent. Examples of a method of removing organic solvent(s) and a portion of the granulating agent include a method of washing with a solvent, and a method of volatilizing or decomposing the organic solvent(s) and a portion of the granulating agent by heating under normal pressure or reduced pressure.

In this case, the heat treatment temperature is preferably 60° C. or higher, more preferably 100° C. or higher, still more preferably 200° C. or higher, particularly preferably 300° C. or higher, but preferably 1,500° C. or lower, more preferably 1,000° C. or lower, still more preferably 800° C. or lower, most preferably near the boiling point of the granulating agent. When the heat treatment temperature is in this range, the granulating agent can be sufficiently removed through volatilization or decomposition, and this leads to a reduction in the production cost and good molding conditions at the time of molding, which is preferred.

The heat treatment time is preferably 0.5 to 48 hours, more preferably 1 to 40 hours, still more preferably 2 to 30 hours, particularly preferably 3 to 24 hours. When the heat treatment time is in this range, the granulating agent can be sufficiently removed through volatilization or decomposition, so that the productivity can be improved.

The atmosphere of the heat treatment may be, for example, an active atmosphere such as air atmosphere, or an inert atmosphere such as a nitrogen atmosphere or an argon atmosphere. The atmosphere is not particularly restricted when the heat treatment is performed at 200° C. to 300° C.; however, when the heat treatment is performed at 300° C. or higher, from the standpoint of inhibiting oxidation of the graphite surface, the atmosphere is preferably an inert atmosphere, such as a nitrogen atmosphere or an argon atmosphere.

(Fifth Step) Step of Impregnating Granulated Carbon Material with Carbonaceous Material Having Lower Crystallinity than Raw Carbon Material The method of the present invention may further include the step of impregnating the thus granulated carbon material with a carbonaceous material having a lower crystallinity than the raw carbon material. By this step, a graphite containing an amorphous carbonaceous material in at least a part of the surface is obtained; therefore, a negative electrode material for a nonaqueous secondary battery, which causes little side reaction between a negative electrode for nonaqueous secondary battery negative electrode that contains the graphite and an electrolyte solution and has a high capacity with excellent low-temperature input-output characteristics and high-temperature storage characteristics, can be obtained.

This impregnation (integration) treatment of an amorphous carbonaceous material into the granulated carbon material is a treatment in which an organic compound giving the amorphous carbonaceous material and the granulated carbon material are mixed and heated in a non-oxidizing atmosphere, preferably in a stream of nitrogen, argon, carbon dioxide or the like, to convert the organic compound into amorphous carbon. Examples of a specific organic compound giving an amorphous carbonaceous material that can be used include petroleum-based or coal-based heavy oils, tars and pitches, specifically carbon-based heavy oils, such as soft or hard coal-tar pitches and coal liquefaction oils; petroleum-based heavy oils, such as residual oils from atmospheric or vacuum distillation of crude oil; and cracked heavy oils that are by-products of ethylene production by naphtha cracking.

Examples of the organic compound also include: heat-treated pitches obtained by heat-treating a cracked heavy oil, such as ethylene tar pitch, FCC decant oil, and Ashland pitch; vinyl polymers, such as polyvinyl chlorides, polyvinyl acetates, polyvinyl butyrals, and polyvinyl alcohols; substituted phenol resins, such as 3-methylphenol-formaldehyde resin and 3,5-dimethylphenol-formaldehyde resin; aromatic hydrocarbons, such as acenaphthylene, decacyclene, and anthracene; nitrogen ring compounds, such as phenazine and acridine; and sulfur ring compounds, such as thiophene. Further, examples of an organic compound that facilitates carbonization in a solid phase include natural polymers such as cellulose; chain vinyl resins, such as polyvinylidene chlorides and polyacrylonitriles; aromatic polymers, such as polyphenylenes; thermosetting resins, such as furfuryl alcohol resins, phenol-formaldehyde resins, and polyimide resins; and thermosetting resin raw materials such as furfuryl alcohol. Thereamong, petroleum-based or coal-based heavy oils, tars and pitches, which are soft carbons that have low Qi and Ti contents and are entirely softened during a temperature increase in firing, are preferred since they are unlikely to generate fine pores as amorphous carbon, and fine particles of 1 nm to 4 nm can thus be reduced more efficiently.

Examples of a method of mixing the granulated carbon material with the organic compound giving an amorphous carbonaceous material include a method of mixing the raw carbon material with the granulating agent using a mixer or a kneader, and a method of mixing the raw carbon material with the granulating agent prepared by dissolving the organic compound in a low-viscosity diluted solvent (organic solvent), and subsequently removing the diluted solvent (organic solvent). Among these methods, the method of mixing the raw carbon material with the granulating agent using a mixer or a kneader is preferred since the greater the amount of a component giving a carbonaceous material in the organic compound, the more efficiently fine particles of 1 nm to 4 nm can be reduced.

Further, at the time of mixing the granulated carbon material with the organic compound giving an amorphous carbonaceous material, the viscosity of the organic compound giving an amorphous carbonaceous material is preferably 1 cP or more and 1,000 cP or less, more preferably 5 cP or more and 800 cP or less, still more preferably 10 cP or more and 600 cP or less, particularly preferably 20 cP or more and 500 cP or less. When the viscosity is in this range, the organic compound giving an amorphous carbonaceous material flows into fine pores of 1 nm to 4 nm in the granulated carbon material and is converted into amorphous carbon by firing, whereby such fine pores can be reduced, so that a negative electrode material having excellent low-temperature input-output characteristics and high-temperature storage characteristics can be produced, which is preferred.

The temperature of mixing the granulated carbon material with the organic compound giving a carbonaceous material is usually a temperature that is not lower than the softening point of the organic compound giving a carbonaceous material, and the mixing is performed at preferably a temperature higher than the softening point by at least 10° C., more preferably a temperature higher than the softening point by at least 20° C., still more preferably a temperature higher than the softening point by at least 30° C., particularly preferably a temperature higher than the softening point by at least 50° C., but usually 450° C. or lower, preferably 250° C. or lower. An excessively low heating temperature leads to an increase in the viscosity of the organic compound serving as a carbonaceous material precursor, which can make it difficult to perform the mixing and cause the form of coating to be heterogeneous, while an excessively high heating temperature leads to an increase in the viscosity of the mixing system due to volatilization and polycondensation of the organic compound serving as a carbonaceous material precursor, which can also make it difficult to perform the mixing and cause the form of coating to be heterogeneous.

Although the heating temperature (firing temperature) varies depending on the organic compound used for preparing a mixture, the heating is performed at usually 500° C. or higher, preferably 600° C. or higher, more preferably 700° C. or higher, to adhere amorphous carbon to at least a part of the graphite surface. An upper limit of the heating temperature is a temperature at which a carbide of the organic compound does not form a crystal structure equivalent to the crystal structure of flake graphite in the resulting mixture, and the upper limit of the heating temperature is usually 2,000° C., preferably 1,800° C., more preferably 1,700° C., still more preferably 1,600° C.

By performing the above-described treatments and subsequently performing a combination of crushing, pulverization and classification as appropriate, a carbonaceous composite carbon material can be obtained. This carbonaceous composite carbon material may have any shape, and has an average particle size of usually 2 to 50 μm, preferably 5 to 35 μm, particularly 8 to 30 μm.

Further, any known technology can be used as long as the average particle size can be controlled in the desired range with the use of the known technology. In other words, spheroidized graphite particles can be produced by performing a spheroidization treatment using a known technology. For example, an apparatus which repeatedly applies mechanical actions, such as compression, friction and shear force, including particle interactions, to particles mainly through impact force, can be used. Specifically, it is preferred to use an apparatus which is equipped with a rotor having a large number of blades inside a casing and performs a surface treatment by rotating the rotor at a high speed and thereby applying mechanical actions, such as impact compression, friction and shear force, to a carbon material introduced to the inside. Further, an apparatus which has a mechanism for repeatedly applying mechanical actions by circulating graphite particles is preferred. Specific examples of such an apparatus include Hybridization System (manufactured by Nara Machinery Co., Ltd.), KRYPTRON (manufactured by EarthTechnica Co., Ltd.), CF Mill (manufactured by UBE Industries, Ltd.), MECHANO FUSION System (manufactured by Hosokawa Micron Group), and THETA COMPOSER (manufactured by Tokuju Co., Ltd.). Thereamong, Hybridization System manufactured by Nara Machinery Co., Ltd. is preferred. For example, when a treatment is performed using any of the above-described apparatuses, the peripheral speed of the rotating rotor is set at, but not particularly limited to, preferably 30 m/sec to 100 m/sec, more preferably 40 m/sec to 100 m/sec, still more preferably 50 m/sec to 100 m/sec. The treatment can also be performed by simply passing a carbonaceous material through the apparatus; however, it is preferred to perform the treatment by circulating or retaining the carbonaceous material in the apparatus for 30 seconds or longer, and it is more preferred to perform the treatment by circulating or retaining the carbonaceous material in the apparatus for 1 minute or longer.

<C2-2. Press Treatment of Graphite>

The production of the negative electrode material according to one embodiment of the present invention preferably includes the step of pressing a graphite. A method for pressing a graphite is not particularly restricted as long as a pressure can be applied, and examples thereof include: a hydrostatic isotropic press treatment in which a raw material graphite is placed in a container such as a rubber mold, and water is used as a pressurizing medium; and a pneumatic isotropic press treatment using a gas, such as air, as a pressurizing medium. The press treatment may also be performed by filling the raw material graphite into a mold and subsequently pressing the raw material graphite in a certain direction using a single-screw press. As for the time of the pressing, the pressing may be performed in any of the above-described first to the fifth steps of producing a spheroidized graphite; however, it is preferred to perform the pressing between the fourth and the fifth steps since this allows a pressure to be applied efficiently as the pressing is performed in a state where excess granulating agent has been removed.

Usually, the pressure of the pressurizing medium used in the press treatment of the graphite is preferably 100 MPa or higher, more preferably 150 MPa or higher, still more preferably 200 MPa or higher. An upper limit is usually 400 MPa or lower, preferably 300 MPa or lower. When the pressure is equal to or lower than the above-described lower limit value, pores are not sufficiently controlled by molding and the intraparticle pore volume with respect to the coating ratio is thus unlikely to be in a preferred range, while when the pressure is equal to or higher than the above-described upper limit value, an excessive increase in the size of the apparatus deteriorates the mass productivity, both of which cases are not preferred.

A sample after a molding treatment is preferably pulverized once and subsequently further crushed or pulverized to a particle size equal to or smaller than the particle size prior to the treatment. As for a pulverization method, any known apparatus can be used and, when the molded product is large, it is preferred to perform the pulverization through the coarse pulverization step, the intermediate pulverization step, and the fine pulverization step. Examples of the apparatus used for the coarse pulverization step include a jaw crusher, an impact crusher, a cone crusher, and ROTOPLEX; examples of an intermediate pulverizer include a roll crusher, ORIENT MILL, and a hammer mill; and examples of a fine pulverization equipment include a turbo mill, KRYPTRON, a pin mill, a ball mill, a vibration mill, and a pulverizer. After the pulverization, a classification treatment is performed, and pulverization is further performed to a particle size equal to or smaller than that of the raw material. A large particle size relative to before the treatment is not preferred since it indicates that the particles have been adhered and aggregated with each other by the molding treatment, and such parts cannot be coated in a favorable manner when coated with an amorphous material. Meanwhile, a markedly small particle size relative to before the treatment is also not preferred since it indicates that spheroidized graphite has been pulverized, and this leads to an increase in SA.

(Cumulative Pore Volume)

The graphite used as a raw material of the negative electrode material according to one embodiment of the present invention preferably has two or more peaks in a pore distribution determined by a mercury intrusion method (mercury porosimetry), and the cumulative pore volume in a range of a minimal value or less is, in terms of a value determined by a mercury intrusion method (mercury porosimetry), usually 0.15 mL/g or less, preferably 0.08 mL/g or less, more preferably 0.070 mL/g or less, still more preferably 0.060 mL/g or less, particularly preferably 0.050 mL/g or less. A cumulative pore volume of larger than this range is not preferred since it indicates that the intraparticle voids are large, and the pore volume is unlikely to be reduced efficiently when the graphite is coated with an amorphous material.

(Peak Top on Small Side)

The graphite used as a raw material of the negative electrode material according to one embodiment of the present invention preferably has two or more peaks in a pore distribution determined by a mercury intrusion method (mercury porosimetry), and the peak top of a peak on the side of small pore size is, in terms of a value determined by a mercury intrusion method (mercury porosimetry), usually 500 nm or smaller, preferably 400 nm or smaller, more preferably 300 nm or smaller, still more preferably 200 nm or less, particularly preferably 100 nm or smaller. When the intraparticle voids are larger than this range, the distance between flake graphite particles used as a raw material is large at a point of being spheroidized, and the presence of large voids makes it unable to efficiently bind these particles when coating them with an amorphous material.

(Circularity)

The graphite used as a raw material of the negative electrode material according to one embodiment of the present invention has a circularity, which is determined by flow-type particle image analysis, of preferably 0.88 or higher, more preferably 0.90 or higher, still more preferably 0.91 or higher, particularly preferably 0.92 or higher, most preferably 0.93 or higher. When the graphite has a high circularity in this manner, the negative electrode material produced using the graphite has a reduced degree of inflection of Li ion diffusion and an electrolyte solution moves smoothly in interparticle voids, so that the rapid charge-discharge characteristics can be improved, which is preferred. Meanwhile, since the theoretical upper limit of the circularity is 1, the circularity is usually lower than 1, preferably 0.99 or lower, more preferably 0.98 or lower, still more preferably 0.97 or lower. From the standpoint of ensuring contact between the resulting negative electrode materials and thereby improving the cycle characteristics, the circularity is preferably not higher than the above-described upper limit.

The circularity is determined by measuring the particle size distribution based on the equivalent circle diameter using a flow-type particle image analyzer (FPIA-2100, manufactured by Toa Medical Electronics, Ltd.), and calculating the average circularity. The circularity is defined by the following formula, and a circularity value of 1 represents a theoretical true sphere:

[Circularity]=[Circumferential length of equivalent circle having the same area as projected particle shape]/[Actual circumferential length of projected particle shape]

In the measurement of the circularity, ion exchanged water and polyoxyethylene (20) monolaurate are used as a dispersion medium and a surfactant, respectively. The term "equivalent circle diameter" refers to the diameter of a circle (equivalent circle) having the same projected area as that of a captured particle image, and the term "circularity" refers to a ratio calculated by taking the circumferential length of the equivalent circle as the numerator and that of a captured projection image of a particle as the denominator. The circularity values of particles having a measured equivalent diameter in a range of 1.5 to 40 μm are averaged, and the thus obtained value is defined as the circularity.

(Tap Density)

The graphite has a tap density of preferably 0.60 g/cm$^3$ or higher, more preferably 0.70 g/cm$^3$ or higher, still more preferably 0.80 g/cm$^3$ or higher, particularly preferably 0.855/cm$^3$ or higher, most preferably 0.90 g/cm$^3$ or higher, but usually 1.40 g/cm$^3$ or lower, preferably 1.30 g/cm$^3$ or lower, more preferably 1.20 g/cm$^3$ or lower.

(Volume-Based Average Particle Size)

The volume-based average particle size (D50) of the graphite is not particularly restricted; however, it is usually 1 μm or larger, preferably 3 μm or larger, more preferably 5 μm or larger, but usually 50 μm or smaller, preferably 40 μm or smaller, more preferably 30 μm or smaller.

(BET Specific Surface Area)

The BET specific surface area of the graphite is not particularly restricted; however, it is usually 1.0 m$^2$/g or larger, preferably 1.5 m$^2$/g or larger, more preferably 2.0 m$^2$/g or larger, still more preferably 3.0 m$^2$/g or larger, particularly preferably 4.5 m$^2$/g or larger, most preferably 5.0 m$^2$/g or larger, but usually 30.0 m$^2$/g or smaller, preferably 20.0 m$^2$/g or smaller, more preferably 10.0 m$^2$/g or smaller.

(Raman $R_1$ Value)

The Raman $R_1$ value of the graphite, which is represented by the following Formula α, is not particularly restricted; however, it is preferably 0.10 or more and 1.00 or less. The Raman $R_1$ value is more preferably 0.15 or larger, still more preferably 0.20 or larger, particularly preferably 0.25 or larger, but more preferably 0.80 or smaller, still more preferably 0.60 or smaller.

Raman $R_1$ value=(Intensity $I_B$ of peak $P_B$ near 1,360 cm$^{-1}$)/(Intensity $I_A$ of peak $P_A$ near 1,580 cm$^{-1}$) in Raman spectrum analysis   Formula α:

<C2-3. Amorphous Carbon Integration of Graphite>

The negative electrode material according to one embodiment of the present invention contains a graphite that contains at least either one of an amorphous carbonaceous material and a graphitic material in at least a part of the surface. The term "amorphous carbonaceous material" used herein refers to carbon having a (002)-plane interplanar spacing (d002) of usually 0.340 nm or larger, as determined by wide-angle X-ray diffractometry, and "amorphous carbonaceous material" is synonymous with "carbonaceous material". Meanwhile, the term "graphitic material" used herein refers to a graphite having a d002 of smaller than 0.340 nm. A treatment for this amorphous carbon integration is performed by mixing and firing a graphite with an amorphous carbon precursor (a raw material of an amorphous carbonaceous material). By performing the amorphous carbon integration of the graphite under appropriate conditions, not only the above-described thermal properties are satisfied, but also the pore volume is likely to be controlled in the above-described range.

The amorphous carbon precursor is not particularly restricted, and examples thereof include organic materials, for example, tars, pitches, aromatic hydrocarbons such as naphthalene, anthracene, and derivatives thereof, and thermoplastic polymers such as phenolic resins and polyvinyl alcohols. These organic precursors may be used singly, or two or more thereof may be used in combination. Thereamong, from the standpoints of facilitating the development of carbon structure and coating the graphite with a small amount, the amorphous carbon precursor is preferably a tar, a pitch, or an aromatic hydrocarbon. In order to satisfy the above-described relationship of the coating ratio and the pore volume, the amorphous carbon precursor has a residual carbon content of preferably 50% or higher, more preferably 60% or higher, particularly preferably 65% or higher. A higher carbon residual ratio leads to a further inhibition of foaming and volume reduction when a firing treatment is performed, so that the intraparticle pores of the graphite can be filled more efficiently, which is preferred.

The ash content in the amorphous carbon precursor is preferably 1% by weight or less, more preferably 0.5% by weight or less, still more preferably 0.1% by weight or less, with respect to a total weight of the amorphous carbon precursor. A lower limit of the ash content is usually not less than 0.1 ppm by weight. When the ash content in the amorphous carbon precursor is in this range, the amorphous precursor is entirely softened once and efficiently covers the pores at the time of coating with the amorphous precursor or a temperature increase during firing; therefore, the above-described relationship of the coating ratio and the pore volume is likely to be satisfied, which is preferred.

In the present invention, the amount of metal impurities contained in the amorphous carbon precursor is defined as a value obtained by dividing a total content of Fe, Al, Si and Ca with respect to a total weight of the amorphous carbon precursor by a residual carbon ratio. The amount of metal impurities contained in the amorphous carbon precursor is preferably 1,000 ppm by weight or less, more preferably 400 ppm by weight or less, still more preferably 100 ppm by weight or less, particularly preferably 50 ppm by weight or less, but usually 0.1 ppm by weight or more, with respect to a total weight of the amorphous carbon precursor. When the amount of metal impurities contained in the amorphous carbon precursor is in this range, the above-described relationship of the coating ratio and the pore volume is likely to be satisfied, which is preferred.

The quinoline-insoluble content (Qi) in the amorphous carbon precursor is preferably 5% by weight or less, more preferably 2% by weight or less, still more preferably 1% by weight or less, particularly preferably 0.5% by weight or less, most preferably 0.1% by weight or less, with respect to a total weight of the amorphous carbon precursor. When the quinoline-insoluble content (Qi) in the amorphous carbon precursor is in this range, the above-described relationship of the coating ratio and the pore volume is likely to be satisfied, which is preferred.

The graphite and the amorphous carbon precursor are mixed and subsequently fired. The firing temperature is preferably 950° C. or higher, more preferably 1,000° C. or higher, still more preferably 1,050° C. or higher, particularly preferably 1,100° C. or higher, most preferably 1,150° C. or higher, but preferably 2,000° C. or lower, more preferably 1,800° C. or lower, still more preferably 1,600° C. or lower, particularly preferably 1,500° C. or lower. The firing time is preferably 0.5 hours or longer, more preferably 1 hour or longer, but preferably 1,000 hours or shorter, more preferably 500 hours or shorter, still more preferably 100 hours or shorter. When the firing temperature and the firing time are in these respective ranges, the above-described relationship of the coating ratio and the pore volume is likely to be satisfied, which is preferred.

The firing is preferably performed in an inert atmosphere. Specifically, for example, a method of reducing the oxygen concentration by circulating an inert gas such as nitrogen or argon, a method of discharging oxygen out of the system by decompression and subsequently restoring the pressure with nitrogen or argon, or a method of reducing the amount of oxygen contained in the atmosphere inside a furnace by filling a sacrificial material such as coke breeze around a product may be employed. The oxygen concentration in the system can be controlled based on the circulation amount and circulation time of the inert gas, the degree of the decompression, the filling conditions of the sacrificial material, and the like. The oxygen concentration (volume concentration) is preferably 3% or lower, more preferably 1% or lower, still more preferably 1,000 ppm or lower, particularly preferably 500 ppm or lower, most preferably 100 ppm or lower. When the oxygen concentration is higher than this range, the development of the carbon structure of the amorphous carbonaceous material is inhibited, which tends to make it difficult to satisfy the above-described relationship of the coating ratio and the pore volume due to the generation of pores in the amorphous material itself.

When the graphite is mixed with the amorphous carbon precursor, the mixing ratio of the amorphous carbon precursor should be selected as appropriate based on the formulation of the desired composite particles, and the amount of the amorphous carbon precursor is, in terms of the weight ratio of its carbon residue (amorphous carbonaceous material) with respect to the graphite ([[Weight of amorphous carbonaceous material]/[Weight of graphite containing amorphous carbonaceous material]]×100), usually 0.01% or higher, preferably 0.1% or higher, more preferably 0.5% or higher, still more preferably 1% or higher, particularly preferably 2% or higher, most preferably 3% or higher, but preferably 30% or lower, more preferably 20% or lower, still more preferably 15% or lower, particularly preferably 10% or lower. When the weight ratio is in this range, since a high battery capacity is obtained and the insertion and desorption of Li ions are facilitated, excellent low-temperature input-output characteristics, rapid charge-discharge characteristics and cycle characteristics are attained, which is preferred.

<Graphitic Material Integration of Graphite>

The negative electrode material according to one embodiment of the present invention contains a graphite that contains at least either one of an amorphous carbonaceous material and a graphitic material in at least a part of the surface. A treatment for this graphitization is performed by mixing a graphite with an organic compound (a raw material of a graphitic material) and firing the resulting mixture.

A method of producing the negative electrode material containing a graphite that contains a graphitic material in at least a part of the surface is not particularly restricted, and the negative electrode material containing a graphite that contains a graphitic material in at least a part of the surface can be preferably produced by the steps of pressing the above-described graphite (also referred to as "raw material graphite"), subsequently crushing the graphite, mixing this graphite with an organic compound used for obtaining a graphitic material-coated part, graphitizing the resulting mixture, and then performing a pulverization treatment; or the steps of mixing and pressing a raw carbon material with an organic compound used for obtaining a graphitic material-coated part, subsequently graphitizing the resulting mixture, and then performing a pulverization treatment. The latter that has a smaller number of pulverization steps is more preferred.

Specific examples of the organic compound include: easily graphitizable organic compounds exemplified by coal-based heavy oils, such as impregnating pitches, coal-tar pitches and coal-liquefied oils, and petroleum-based heavy oils, such as straight-run heavy oils (e.g., asphaltene) and cracked heavy oils (e.g., ethylene heavy-end tar); aromatic hydrocarbons; nitrogen-containing cyclic compounds; sulfur-containing cyclic compounds; polyphenylenes; polyvinyl chlorides; polyvinyl alcohols; polyacrylonitriles; polyvinyl butyrals; natural furfuryl alcohol polymers; polyphenylene sulfides; polyphenylene oxides; resins; phenol-formaldehyde resins; and imide resins, among which easily graphitizable organic compounds that can be graphitized or carbonized by firing are preferred.

The steps of mixing and pressing the raw material graphite with the organic solvent can be performed in the same manner as in the amorphous carbon integration of the graphite.

Step of Firing Mixture

This step is specifically the step of heating the mixture in a non-oxidizing atmosphere, preferably in a stream of nitrogen, argon, carbon dioxide or the like, to graphitize the organic compound and to thereby produce a composite negative electrode material for a nonaqueous secondary battery, which contains a graphite containing a graphitic material in at least a part of the surface.

The firing temperature varies depending on the organic compound used in the preparation of the mixture; however, when a graphitic material-integrated negative electrode material for a nonaqueous secondary battery is to be obtained, the firing temperature may be equal to or higher than the temperature at which the organic compound is graphitized. Specifically, the mixture is heated to a temperature of usually 2,000° C. or higher, preferably 2,500° C. or higher, more preferably 2,700° C. or higher, and thereby sufficiently carbonized. An upper limit of the heating temperature is a temperature at which a carbide of the organic compound does not have a crystal structure equivalent to that of the carbon material in the mixture, and the upper limit is usually 3,300° C. or lower, preferably 3,100° C. or lower, more preferably 3,000° C. or lower.

With regard to the firing conditions, the thermal history temperature conditions, the heating rate, the cooling rate, the heating time and the like are set as appropriate. It is also possible to perform heating in a relatively low-temperature range and subsequently increase the temperature to a prescribed level. A reactor to be used in this step may be of a batch type or a continuous type, and a single or plural reactors may be used.

A furnace to be used for the firing is not particularly restricted as long as it satisfies the above-described requirements, and examples of an apparatus that can be used include shuttle furnaces, tunnel furnaces, lead hammer furnaces, reaction vessels such as rotary kilns and autoclaves, cokers (heat treatment vessels for coke production), Tammann furnaces, and Acheson furnaces. As a heating method, for example, high-frequency induction heating, direct resistance heating, indirect resistance heating, direct combustion heating, or radiation heating can be employed. Stirring may be performed as required during the treatment.

As required, the composite carbon material obtained through the above-described step is subjected to powder processing, such as re-pulverization, crushing and classification, whereby a negative electrode material for a nonaqueous secondary battery is obtained.

An apparatus used for the pulverization and crushing is not particularly restricted, and examples thereof include: coarse pulverizers, such as shearing mills, jaw crushers, impact crushers, and cone crushers; intermediate pulverizers, such as roll crushers and hammer mills; and fine pulverizers, such as ball mills, vibration mills, pin mills, stirring mills, and jet mills.

An apparatus used for the classification treatment is not particularly restricted. For example, in the case of performing dry sieving, a rotary sieve, a shaking sieve, a gyratory sieve, a vibratory sieve or the like can be used; in the case of performing dry air-flow classification, a gravity classifier, an inertial classifier, a centrifugal classifier (e.g., a classifier or a cyclone) or the like can be used; and, in the case of performing wet sieving, a mechanical wet classifier, a hydraulic classifier, a sedimentation classifier, a centrifugal wet classifier or the like can be used.

When a graphite is mixed with an organic compound, the mixing ratio of the organic compound should be selected as appropriate based on the formulation of the desired composite particles, and the amount of the organic compound is, in terms of the weight ratio of its carbon residue (graphitic material) with respect to the graphite ([[weight of graphitic material]/[weight of graphite containing graphitic material]]×100), usually 0.01% or higher, preferably 0.1% or higher, more preferably 0.5% or higher, still more preferably 1% or higher, particularly preferably 2% or higher, most preferably 3% or higher, but preferably 30% or lower, more preferably 20% or lower, still more preferably 15% or lower, particularly preferably 10% or lower. When the weight ratio is in this range, since a high battery capacity is obtained and the insertion and desorption of Li ions are facilitated, excellent low-temperature input-output characteristics, rapid charge-discharge characteristics and cycle characteristics are attained, which is preferred.

<C2-4. Other Treatments>

For the production of the negative electrode material according to one embodiment of the present invention, a pulverization treatment may be separately performed on the composite particles obtained by the above-described production method.

Examples of a pulverizer used for the pulverization treatment include: coarse pulverizers, such as a jaw crusher, an impact crusher, and a cone crusher; intermediate pulverizers, such as a roll crusher, ORIENT MILL, and a hammer mill; and fine pulverizers, such as a turbo mill, KRYPTRON, a ball mill, a vibration mill, a pin mill, a stirring mill, and a jet mill. Thereamong, for example, a turbo mill and KRYPTRON are preferred from the standpoint of their short pulverization time and treatment rate.

For the production of the negative electrode material according to one embodiment of the present invention, a particle size classification treatment may be performed on the composite particles obtained by the above-described production method. As a classification treatment condition, the classification treatment is performed using a sieve having a mesh size of usually 53 µm or smaller, preferably 45 µm or smaller, more preferably 38 µm or smaller.

An apparatus used for the classification treatment is not particularly restricted. For example, in the case of performing dry sieving, a rotary sieve, a shaking sieve, a gyratory sieve, a vibratory sieve or the like can be used; in the case of performing dry air-flow classification, a gravity classifier, an inertial classifier, a centrifugal classifier (e.g., a classifier or a cyclone) or the like can be used; and, in the case of performing wet sieving, a mechanical wet classifier, a hydraulic classifier, a sedimentation classifier, a centrifugal wet classifier or the like can be used.

[C3. Negative Electrode for Nonaqueous Secondary Battery]

The negative electrode for a nonaqueous secondary battery according to one embodiment of the present invention (hereinafter, may be referred to as "the negative electrode of the present invention") includes a current collector and an active material layer formed on the current collector, and the active material layer contains the above-described negative electrode material according to one embodiment of the present invention. The negative electrode for a nonaqueous secondary battery according to the present embodiment can be the same as the first embodiment, except for the active material layer.

For the production of a negative electrode using the above-described negative electrode material, the negative electrode material blended with a binder resin may be made into a slurry with an aqueous or organic medium and, after adding a thickening agent thereto as required, the slurry may be applied and dried onto a current collector.

As the binder resin, it is preferred to use one which is stable against nonaqueous electrolyte solutions and insoluble in water. Examples of such a binder resin that can be used include: rubbery polymers, such as styrene-butadiene rubber, isoprene rubber, and ethylene-propylene rubber; synthetic resins, such as polyethylene, polypropylene, polyethylene terephthalate, polyimide, polyacrylic acid, and aromatic polyamide; thermoplastic elastomers, such as styrene-butadiene-styrene block copolymers and hydrogenation products thereof, styrene-ethylene-butadiene-styrene copolymers, styrene-isoprene-styrene block copolymers, and hydrogenation products thereof; flexible resinous polymers, such as syndiotactic 1,2-polybutadiene, ethylene-vinyl acetate copolymers, and copolymers of ethylene and an α-olefin having 3 to 12 carbon atoms; and fluorinated polymers, such as polytetrafluoroethylene-ethylene copolymers, polyvinylidene fluoride, polypentafluoropropylene, and polyhexafluoropropylene. As the organic medium, for example, N-methylpyrrolidone or dimethylformamide can be used.

The binder resin is used in an amount of usually not less than 0.1 parts by weight, preferably not less than 0.2 parts by weight, with respect to 100 parts by weight of the negative electrode material. By using the binder resin in an amount of 0.1 parts by weight or greater with respect to 100 parts by weight of the negative electrode material, a sufficient binding strength is attained between the negative electrode materials and between the negative electrode material and the current collector, so that a reduction in the battery capacity and deterioration of the recycle characteristics, which are caused by detachment of the negative electrode material from the negative electrode, can be inhibited.

The amount of the binder resin to be used is preferably 10 parts by weight or less, more preferably 7 parts by weight or less, with respect to 100 parts by weight of the negative electrode material. By using the binder resin in an amount of 10 parts by weight or less with respect to 100 parts by weight of the negative electrode material, not only a reduction in the capacity of the negative electrode can be prevented, but also problems such as inhibition of movement of alkali ions such as lithium ions in and out of the negative electrode material can be avoided.

Examples of the thickening agent added to the slurry include water-soluble celluloses, such as carboxymethyl cellulose, methyl cellulose, hydroxyethyl cellulose, and hydroxypropyl cellulose; polyvinyl alcohols; and polyethylene glycols. Thereamong, carboxymethyl cellulose is preferred. The thickening agent is used in an amount of usually 0.1 parts by weight to 10 parts by weight, particularly preferably 0.2 parts by weight to 7 parts by weight, with respect to 100 parts by weight of the negative electrode material.

As the current collector of the negative electrode, for example, any of copper, a copper alloy, stainless steel, nickel, titanium and carbon that are conventionally known to be usable for this application may be used. The current collector is usually in the form of a sheet, and it is also preferred to use a current collector having irregularities on the surface, a net, a punched metal, or the like.

After the slurry composed of the negative electrode material and the binder resin is applied and dried onto the current collector, it is preferred that the resultant be pressed so as to increase the density of the active material layer thus formed on the current collector and to thereby increase the battery capacity per unit volume of the active material layer of the negative electrode. The density of the active material layer is in a range of preferably 1.2 g/cm$^3$ to 1.8 g/cm$^3$, more preferably 1.3 g/cm$^3$ to 1.6 g/cm$^3$. By controlling the density of the active material layer to be not less than the above-described lower limit value, a reduction in the battery capacity due to an increase in the electrode thickness can be inhibited. In addition, by controlling the density of the active material layer to be not higher than the above-described upper limit value, the amount of an electrolyte solution retained in voids is reduced in association with a decrease in the amount of interparticle voids inside the electrode, so that the mobility of alkali ions such as lithium ions is reduced, and deterioration of the rapid charge-discharge characteristics can be inhibited.

[C3. Nonaqueous Secondary Battery]

The nonaqueous secondary battery according to one embodiment of the present invention is a nonaqueous secondary battery including a positive electrode, a negative electrode and an electrolyte, in which the negative electrode according to one embodiment of the present invention is used as the negative electrode. Particularly, the positive electrode and the negative electrode that are used in the nonaqueous secondary battery according to one embodiment of the present invention are usually preferred to be capable of occluding and releasing Li ions, and the nonaqueous secondary battery according to one embodiment of the present invention is preferably a lithium ion secondary battery.

The nonaqueous secondary battery according to one embodiment of the present invention can be produced by a conventional method, except that the above-described negative electrode according to one embodiment of the present invention is used. Particularly, the nonaqueous secondary battery according to one embodiment of the present invention is designed such that the value of [capacity of negative electrode]/[capacity of positive electrode] is preferably 1.01 to 1.5, more preferably 1.2 to 1.4.

[C3-1. Positive Electrode]

In the nonaqueous secondary battery according to one embodiment of the present invention, examples of a positive electrode material that may be used as an active material of the positive electrode include: lithium-transition metal composite oxides, such as lithium-cobalt composite oxide having a basic composition represented by $LiCoO_2$, lithium-nickel composite oxide represented by $LiNiO_2$, and lithium-manganese composite oxide represented by $LiMnO_2$ or $LiMn_2O_4$; transition metal oxides, such as manganese dioxide; and mixtures of these composite oxides. Further, $TiS_2$, $FeS_2$, $Nb_3S_4$, $MO_3S_4$, $CoS_2$, $V_2O_5$, $CrO_3$, $V_3O_3$, $FeO_2$, $GeO_2$, $LiNi_{0.33}Mn_{0.33}Co_{0.33}O_2$, $LiFePO_4$ and the like may be used as well.

The positive electrode can be produced by making the above-described positive electrode material blended with a binder resin into a slurry with an appropriate solvent, and subsequently applying and drying this slurry onto a current collector. It is preferred to incorporate a conductive material, such as acetylene black or Ketjen black, into the slurry. Further, a thickening agent may be incorporated as required. As a binder and the thickening agent, ones that are well-known for this application, for example, those exemplified above to be used in the production of the negative electrode, may be used.

The amount of the conductive material to be incorporated is preferably 0.5 parts by weight to 20 parts by weight, more preferably 1 part by weight to 15 parts by weight, with respect to 100 parts by weight of the positive electrode material. The amount of the thickening agent to be incorporated is preferably 0.2 parts by weight to 10 parts by weight, more preferably 0.5 parts by weight to 7 parts by weight, with respect to 100 parts by weight of the positive electrode material. Further, the amount of the binder resin to be incorporated with respect to 100 parts by weight of the positive electrode material is: preferably 0.2 parts by weight to 10 parts by weight, more preferably 0.5 parts by weight to 7 parts by weight, in the case of preparing a slurry of the binder resin with water; or preferably 0.5 parts by weight to 20 parts by weight, more preferably 1 to 15 parts by weight, in the case of preparing a slurry of the binder resin with an organic solvent that dissolves the binder resin, such as N-methylpyrrolidone.

Examples of the current collector of the positive electrode include aluminum, titanium, zirconium, hafnium, niobium, tantalum, and alloys thereof. Thereamong, aluminum, titanium, tantalum and alloys thereof are preferred, and aluminum and alloys thereof are most preferred.

[C3-2. Electrolyte Solution]

As an electrolyte solution, any conventionally known electrolyte solution obtained by dissolving various lithium salts in a nonaqueous solvent can be used.

Examples of a nonaqueous solvent that can be used include: cyclic carbonates, such as ethylene carbonate, fluoroethylene carbonate, propylene carbonate, butylene carbonate, and vinylene carbonate; chain carbonates, such as dimethyl carbonate, ethyl methyl carbonate, and diethyl carbonate; cyclic esters, such as γ-butyrolactone; cyclic ethers, such as crown ethers, 2-methyltetrahydrofuran, tetrahydrofuran, 1,2-dimethyltetrahydrofuran, and 1,3-dioxolane; and chain ethers, such as 1,2-dimethoxyethane. Usually, two or more of these nonaqueous solvents are mixed for use. Among these nonaqueous solvents, it is preferred to use a cyclic carbonate and a chain carbonate, or a mixture obtained by further adding other solvent thereto.

To the electrolyte solution, for example, a compound such as vinylene carbonate, vinylethylene carbonate, succinic anhydride, maleic anhydride, propane sultone or diethyl sulfone, and/or a difluorophosphate such as lithium difluorophosphate may also be added. Further, an overcharge inhibitor such as diphenyl ether or cyclohexylbenzene may be added as well.

Examples of an electrolyte to be dissolved in the non-aqueous solvent include $LiClO_4$, $LiPF_6$, $LiBF_4$, $LiCF_3SO_3$, $LiN(CF_3SO_2)_2$, $LiN(CF_3CF_2SO_2)_2$, $LiN(CF_3SO_2)(C_4F_9SO_2)$, and $LiC(CF_3SO_2)_3$. In the electrolyte solution, the concentration of the electrolyte is usually 0.5 mol/L to 2 mol/L, preferably 0.6 mol/L to 1.5 mol/L.

[C3-3. Separator]

In the nonaqueous secondary battery according to one embodiment of the present invention, it is preferred to use a separator interposed between the positive electrode and the negative electrode. As the separator, it is preferred to use a porous sheet or nonwoven fabric that is made of a polyolefin such as polyethylene or polypropylene.

EXAMPLES

Experiment A

The present invention will now be described more concretely by way of Examples thereof; however, the present invention is not restricted to the below-described Examples within the gist of the present invention. The values of various production conditions and evaluation results in the below-described Examples each have a meaning as a preferred upper or lower limit value in an embodiment of the present invention, and a preferred range may be defined by a combination of an upper or lower limit value described above and a value described below in an Example, or a combination of values in Examples.

<Production of Negative Electrode Sheet>

Using each negative electrode material prepared under the below-described conditions as a negative electrode active material, an electrode sheet having an active material layer with an active material layer density of $1.6\pm0.03$ g/cm$^3$ (Examples and Comparative Examples in Table 1) or $1.5\pm0.03$ g/cm$^3$ (Examples and Comparative Examples in Table 2) was produced. Specifically, $50.00\pm0.02$ g of the negative electrode material, $50.00\pm0.02$ g (0.500 g in terms of solid content) of a 1%-by-weight aqueous sodium carboxymethyl cellulose solution, and $1.00\pm0.05$ g (0.5 g in terms of solid content) of an aqueous dispersion of a styrene-butadiene rubber having a weight-average molecular weight of 270,000 were stirred for 5 minutes using a hybrid mixer manufactured by KEYENCE Corporation, and the resultant was defoamed for 30 seconds to obtain a slurry.

The thus obtained slurry was applied and dried onto a 10 μm-thick copper foil, which was used as a current collector, in a width of 10 cm using a die coater such that the negative electrode material was adhered in an amount of $10.00\pm0.2$ mg/cm$^2$. This copper foil was subsequently cut to a width of 5 cm, roll-pressed using a roller having a diameter of 20 cm, and then adjusted to have an active material layer density of $1.5\pm0.03$ g/cm$^3$ or $1.6\pm0.03$ g/cm$^3$, whereby each electrode sheet was obtained.

<Production of Positive Electrode Sheet>

A positive electrode was produced as follows. First, a slurry was obtained by mixing 85% by weight of nickel-manganese-lithium cobaltate ($LiNiMnCoO_2$) as a positive electrode active material, 10% by weight of acetylene black as a conductive material and 5% by weight of polyvinylidene fluoride (PVdF) as a binder in a N-methylpyrrolidone solvent. The thus obtained slurry was applied onto a 15 μm-thick aluminum foil, which was used as a current collector, using a blade coater such that the positive electrode material was adhered in an amount of $22.5\pm0.2$ mg/cm$^2$. This aluminum foil was dried at 130° C., roll-pressed, and then adjusted to have a positive electrode density of $2.60\pm0.05$ g/cm$^3$, whereby an electrode sheet was obtained.

<Method of Producing Nonaqueous Secondary Battery (Laminate-Type Battery)>

The negative electrode sheet having an active material layer density of $1.6\pm0.03$ g/cm$^3$ (Examples and Comparative Examples in Table 1) or $1.5\pm0.03$ g/cm$^3$ (Examples and Comparative Examples in Table 2), on which $10.0\pm0.3$ mg/cm$^2$ of the negative electrode material was adhered, and the positive electrode sheet, which were produced by the above-described respective methods, were laminated with a polyethylene separator in the order of the negative electrode, the separator, and the positive electrode. The thus obtained battery element was wrapped in a cylindrical aluminum laminate film, and an electrolyte solution, which was prepared by dissolving $LiPF_6$ in a mixed solvent of ethylene carbonate (EC), dimethyl carbonate (DMC) and ethyl methyl carbonate (EMC) (volume ratio=3:3:4) to a concentration of 1 mol/L, was injected thereto, followed by vacuum-sealing, whereby a sheet-form nonaqueous secondary battery was produced. Further, this sheet-form battery was pressed between glass plates so as to improve the adhesion between the electrodes.

<Method of Producing Nonaqueous Secondary Battery (Coin-Type Battery)>

The electrode sheet having an active material layer density of $1.6\pm0.03$ g/cm$^3$ (Examples and Comparative Examples in Table 1) or $1.5\pm0.03$ g/cm$^3$ (Examples and Comparative Examples in Table 2), which was produced by the above-described method and on which $10.0\pm0.3$ mg/cm$^2$ of the negative electrode material was adhered, was punched out in a disk shape of 12.5 mm in diameter to produce a negative electrode, and a lithium metal foil was punched out in a disk shape of 14 mm in diameter to produce a counter electrode. Between these electrodes, a separator (made of a porous polyethylene film), which had been impregnated with an electrolyte solution prepared by dissolving $LiPF_6$ in a mixed solvent of ethylene carbonate and ethyl methyl carbonate (volume ratio=3:7) to a concentration of 1 mol/L, was arranged, whereby a 2016 coin-type battery was produced.

<Discharge Capacity (mAh/g) and Initial Efficiency (%)>

Using the nonaqueous secondary battery (2016 coin-type battery) produced by the above-described method, the capacity of the battery during charging and discharging was measured in accordance with the following measurement method.

The lithium counter electrode was charged to 5 mV at a current density of 0.05 C, and further charged to a current density of 0.005 C at a constant voltage of 5 mV. After the negative electrode was doped with lithium, the lithium counter electrode was discharged to 1.5 V at a current density of 0.1 C. The discharge capacity in this process was defined as the discharge capacity of this material, and a ratio of the discharge capacity with respect to the charge capacity (discharge capacity/charge capacity×100) was defined as the initial efficiency (%).

<Rapid Discharge Characteristics (%)>

Using the laminate-type nonaqueous secondary battery produced by the above-described method of producing a nonaqueous secondary battery, the rapid discharge characteristics were measured in accordance with the following measurement method.

The nonaqueous secondary battery which had not been subjected to a charge-discharge cycle was subjected to initial charge-discharge cycles consisting of three cycles performed at 25° C. in a voltage range of 4.1 V to 3.0 V with a current value of 0.2 C (a current value at which a rated capacity based on the hourly discharge capacity is discharged in one hour is defined as 1 C; the same applies below) and two cycles performed in a voltage range of 4.2 V to 3.0 V with a current value of 0.2 C (at the time of charging, constant-voltage charging at 4.2 V was performed for another 2.5 hours). Further, the nonaqueous secondary battery was constant-current charged to 4.2 V at a current value of 0.2 C, subsequently constant-voltage charged at 4.2 V for another 2.5 hours, and then constant-current discharged to 3.0 V at 3 C. A ratio (3 C/0.2 C×100) between the discharge capacity during the discharging at 3 C and the discharge capacity during the discharging at 0.2 C (the discharge capacity in the above-described fifth initial charge-discharge cycle) was defined as a rapid discharge characteristic (%).

<Low-Temperature Output Characteristics>

Using the laminate-type nonaqueous secondary battery produced by the above-described method of producing a nonaqueous secondary battery, the low-temperature output characteristics were measured in accordance with the following measurement method.

The nonaqueous secondary battery which had not been subjected to a charge-discharge cycle was subjected to initial charge-discharge cycles consisting of three cycles performed at 25° C. in a voltage range of 4.1 V to 3.0 V with a current value of 0.2 C (a current value at which a rated capacity based on the hourly discharge capacity is discharged in one hour is defined as 1 C; the same applies below) and two cycles performed in a voltage range of 4.2 V to 3.0 V with a current value of 0.2 C (at the time of charging, constant-voltage charging at 4.2 V was performed for another 2.5 hours). Further, the nonaqueous secondary battery was charged to an SOC of 50% at a current value of 0.2 C, and subsequently constant-current discharged for 2 seconds in a low-temperature environment of −30° C. at each current value of ⅛ C, ¼ C, ½ C, 1.5 C, and 2 C. A decrease in the battery voltage after 2 seconds in the discharging under each condition was measured and, from the thus measured values, a current value I which can be generated in 2 seconds when the charging upper limit voltage is assumed to be 3 V was determined. A value calculated by an equation 3×I (W) was defined as a low-temperature output characteristic of each battery. The low-temperature output values shown in Table 1 are values taking the low-temperature output of Comparative Example A1 as 100%, and the low-temperature output values shown in Table 2 are values taking the low-temperature output of Comparative Example A4 as 100%.

<High-Temperature Storage Characteristics (%)>

Using the laminate-type nonaqueous secondary battery produced by the above-described method of producing a nonaqueous secondary battery, the high-temperature storage characteristics were measured in accordance with the following measurement method.

The nonaqueous secondary battery which had not been subjected to a charge-discharge cycle was subjected to initial charge-discharge cycles consisting of three cycles performed at 25° C. in a voltage range of 4.1 V to 3.0 V with a current value of 0.2 C (a current value at which a rated capacity based on the hourly discharge capacity is discharged in one hour is defined as 1 C; the same applies below) and two cycles performed in a voltage range of 4.2 V to 3.0 V with a current value of 0.2 C (at the time of charging, constant-voltage charging at 4.2 V was performed for another 2.5 hours). Further, the nonaqueous secondary battery was charged to an SOC of 80% at a current value of 0.2 C, and subsequently stored at 60° C. for 2 weeks. Thereafter, the nonaqueous secondary battery was discharged at a current value 0.2 C, and subsequently further charged and discharged at a current value 0.2 C (at the time of charging, constant-voltage charging at 4.2 V was performed for another 2.5 hours). The discharge capacity at this point was defined as "post-storage discharge capacity". A ratio of the post-storage discharge capacity with respect to the discharge capacity in the above-described fifth initial charge-discharge cycle (post-storage discharge capacity/discharge capacity in fifth initial charge-discharge cycle×100 (%)) was evaluated as a high-temperature storage characteristic (%).

Example A1

A spheroidized natural graphite (average particle size (d50): 16.2 μm, BET specific surface area (SA): 6.9 m²/g, tap density: 1.00 g/cm³) prepared by a spheroidization treatment of a flake natural graphite having an average particle size (d50) of 100 μm was filled and tightly sealed into a rubber container, and subsequently subjected to an isotropic press treatment at 200 MPa to control the powder physical properties. The resulting molded product was crushed and classified. The thus obtained spheroidized graphite powder was mixed with an amorphous carbon precursor which was a tar adjusted to have an ash content of less than 0.01%, a metal impurity content of 60 ppm and a Qi value of less than 0.1%, after which the pressure in a furnace was reduced to 10 torr or lower and then brought back to the atmospheric pressure with nitrogen, and a heat treatment was performed at 1,300° C. with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.03 in the thus obtained negative electrode material (composite carbon material). In addition, the physical properties of the negative electrode material (composite carbon material), such as the differential thermal analysis (DTA) curve, the Raman $R^1$ to $R^3$ values, the Raman full width at half maximum ($\Delta v_B$), the average particle size (d50), the BET specific surface area (SA), the tap density, the cumulative pore volume, the interplanar spacing (d002) and the crystallite size (Lc), were measured by the above-described respective measurement methods. Further, the battery characteristics, such as the discharge capacity at a negative electrode density of 1.6 g/cm³, the initial efficiency, the rapid discharge characteristic, the low-temperature output characteristic and the high-temperature storage characteristic, were measured by the above-described respective measurement methods. The results thereof are shown in Table 1.

Example A2

A negative electrode material was obtained in the same manner as in Example A1, except that the weight ratio of spheroidized graphite particles and amorphous carbon (spheroidized graphitic particles:amorphous carbon) was changed to 1:0.015. The results of performing the same measurements as in Example A1 are shown in Table 1.

Comparative Example A1

A negative electrode material was obtained in the same manner as in Example A1, except that the isotropic press treatment was not performed and the 1,300° C. heat treatment was performed with nitrogen being circulated to an oxygen concentration of lower than 1,000 ppm in the furnace. The results of performing the same measurements as in Example A1 are shown in Table 1.

Comparative Example A2

A negative electrode material was obtained in the same manner as in Example A1, except that the heat treatment was performed at 900° C. in an inert gas. The results of performing the same measurements as in Example A1 are shown in Table 1.

Comparative Example A3

A composite carbon material was obtained in the same manner as in Comparative Example A1, except that the heat treatment was performed at 900° C. in an inert gas. The results of performing the same measurements as in Example A1 are shown in Table 1.

Reference Example A1

The same measurements as in Example A1 were performed directly using the spheroidized natural graphite (average particle size (d50): 16.2 μm, SA: 6.9 m$^2$/g, tap density: 1.00 g/cm$^3$) prepared by a spheroidization treatment of a flake natural graphite having an average particle size (d50) of 100 μm, and the results thereof are shown in Table 1.

Example A3

A flake natural graphite having an average particle size (d50) of 100 μm was pulverized to obtain a flake natural graphite having d50 of 8.5 μm. The thus obtained flake natural graphite was mixed with 12 parts by weight of a liquid oil as a granulating agent, and the resulting mixture was spheroidized and subsequently heat-treated to remove the granulating agent, whereby a spheroidized natural graphite (average particle size (d50): 12.6 μm, SA: 19.1 m$^2$/g, tap density: 0.94 g/cm$^3$) was obtained. The thus obtained spheroidized graphite was filled and tightly sealed into a rubber container, and subsequently subjected to an isotropic press treatment at 200 MPa to control the powder physical properties. The resulting molded product was crushed and classified. The thus obtained spheroidized graphite powder was mixed with an amorphous carbon precursor which was a pitch adjusted to have an ash content of 0.02% by weight, a metal impurity content of 20 ppm by weight and a Qi value of 1% by weight, after which the pressure in a furnace was reduced to 10 torr or lower and then brought back to the atmospheric pressure with nitrogen, and a heat treatment was performed at 1,300° C. in an inert gas with nitrogen being circulated to control the oxygen concentration in the furnace to be lower than 100 ppm. The resulting fired product was crushed and classified to obtain a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.06 in the thus obtained composite carbon material. The results of performing the same measurements as in Example A1, except that the negative electrode density was 1.5 g/cm$^3$, are shown in Table 2.

Example A4

A composite carbon material was obtained in the same manner as in Example A1, except that the weight ratio of spheroidized graphite particles and amorphous carbon (spheroidized graphitic particles:amorphous carbon) was changed to 1:0.08. The results of performing the same measurements as in Example A3 are shown in Table 2.

Comparative Example A4

A flake natural graphite having an average particle size (d50) of 100 μm was pulverized to obtain a flake natural graphite having d50 of 8.5 μm. The thus obtained flake natural graphite was mixed with a granulating agent that was a pitch liquefied by heating, and the resultant was spheroidized while being heated in the same manner. The thus obtained spheroidized natural graphite to which the pitch had adhered was subjected to a 1,300° C. heat treatment in an inert gas, and the resulting fired product was subsequently crushed and classified to obtain a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.08 in the thus obtained composite carbon material. The results of performing the same measurements as in Example A3 are shown in Table 2.

Comparative Example A5

A flake natural graphite having an average particle size (d50) of 100 μm was pulverized to obtain a flake natural graphite having d50 of 8.5 μm. The thus obtained flake natural graphite was mixed with 12 parts by weight of a paraffin-based oil as a granulating agent, and the resulting mixture was spheroidized and subsequently heat-treated to remove the granulating agent, whereby a spheroidized natural graphite (average particle size (d50): 12.6 μm, SA: 15.3 m$^2$/g, tap density: 0.88 g/cm$^3$) was obtained. The thus obtained spheroidized graphite powder was mixed with a pitch as an amorphous carbon precursor and then subjected to a 1,300° C. heat treatment in an inert gas, after which the resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.07 in the thus obtained negative electrode material (composite carbon material). The results of performing the same measurements as in Example A3 are shown in Table 2.

TABLE 1

|  | Example A1 | Example A2 | Comparative Example A1 | Comparative Example A2 | Comparative Example A3 | Reference Example A1 |
|---|---|---|---|---|---|---|
| Physical properties of negative electrode material | | | | | | |
| Cumulative pore volume in range of 0.01 to 1 μm (ml/g) | 0.070 | 0.070 | 0.120 | 0.070 | 0.120 | 0.130 |
| DTA curve | | | | | | |
| Exothermic peak top in [temperature in range of 550° C. to 650° C. (° C.) | absent | absent | absent | present (617° C.) | present (608° C.) | no amorphous carbon |
| Exothermic peak area in range of 550° C. to 650° C. (μV · s/mg) | 0 | 0 | 0 | 168 | 145 | |
| Heat generation start temperature (° C.) | 664 | 665 | 658 | 565 | 555 | |
| Exothermic peak top temperature in range of higher than 650° C. but 900° C. or lower (° C.) | 826 | 826 | 825 | 811 | 809 | |
| Raman $R_1$ value | 0.39 | 0.28 | 0.38 | 0.44 | 0.51 | 0.35 |
| Raman $R_2$ value | 0.14 | 0.06 | 0.14 | 0.17 | 0.23 | 0.02 |
| Raman $R_3$ value | 0.38 | 0.23 | 0.38 | 0.39 | 0.46 | 0.06 |
| Raman full width at half maximum $\Delta v_B$ (cm$^{-1}$) | 117 | 81 | 118 | 120 | 149 | 64 |
| d50 (μm) | 16.1 | 16.2 | 16.8 | 16.5 | 16.5 | 16.2 |
| SA (m²/g) | 2.8 | 3.7 | 3.1 | 2.9 | 3.2 | 6.9 |
| Tap density (g/cm³) | 1.22 | 1.22 | 1.14 | 1.21 | 1.13 | 1.00 |
| d002 (nm) | 0.336 | 0.336 | 0.336 | 0.336 | 0.336 | 0.336 |
| $L_C$ (nm) | >100 | >100 | >100 | >100 | >100 | >100 |
| Battery characteristics | | | | | | |
| Electrode density (g/cm³) | | | 1.6 | | | |
| Discharge capacity (mAh/g) | 364 | 365 | 363 | 363 | 364 | 365 |
| Initial efficiency (%) | 92.6 | 92.6 | 92.2 | 92.0 | 91.1 | 91.4 |
| Rapid discharge characteristic (%) | 80.0 | 80.3 | 76.6 | 79.4 | 77.0 | — |
| Low-temperature output characteristic (Comparative Example A1 = 100) | 104.2 | 106.4 | 100.0 | 103.5 | 102.8 | 98.0 |
| High-temperature storage characteristic (%) | 92.7 | 91.2 | 92.2 | 91.5 | 91.0 | 91.1 |

TABLE 2

| | | Example A3 | Example A4 | Comparative Example A4 | Comparative Example A5 |
|---|---|---|---|---|---|
| Physical properties of negative electrode material | Cumulative pore volume in range of 0.01 to 1 μm (ml/g) | 0.040 | 0.030 | 0.110 | 0.120 |
| | DTA curve Exothermic peak top temperature in range of 550° C. to 650° C. (° C.) | absent | absent | absent | absent |
| | Exothermic peak area in range of 550° C. to 650° C. (μV · s/mg) | 0 | 0 | 0 | 0 |
| | Heat generation start temperature (° C.) | 602 | 617 | 613 | 585 |
| | Exothermic peak top temperature in range of higher than 650° C. but 900° C. or lower (° C.) | 730 | 744 | 776 | 714, 789 |
| | Raman $R_1$ value | 0.34 | 0.37 | 0.31 | 0.31 |
| | Raman $R_2$ value | 0.10 | 0.15 | 0.14 | 0.11 |
| | Raman $R_3$ value | 0.28 | 0.40 | 0.46 | 0.36 |
| | Raman full width at half maximum $\Delta v_B$ (cm$^{-1}$) | 86 | 120 | 140 | 110 |
| | d50 (μm) | 12.8 | 12.9 | 16.2 | 12.6 |
| | SA (m²/g) | 3.2 | 2.2 | 5.7 | 7.1 |
| | Tap density (g/cm³) | 1.21 | 1.23 | 1.19 | 1.05 |
| | d002 (nm) | 0.336 | 0.336 | 0.336 | 0.336 |
| | $L_C$ (nm) | >100 | >100 | >100 | >100 |
| Battery Characteristics | Electrode density (g/cm³) | | | 1.5 | |
| | Discharge capacity (mAh/g) | 357 | 353 | 353 | 355 |
| | Initial efficiency (%) | 93.3 | 93.8 | 89.6 | 87.2 |
| | Rapid discharge characteristic (%) | 80.9 | 81.9 | 73.2 | — |
| | Low-temperature output characteristic (Comparative Example A4 = 100) | 116.2 | 98.0 | 100 | 107.1 |
| | High-temperature storage characteristic (%) | 93.3 | 95.5 | 91.1 | 87.1 |

Figure 2:
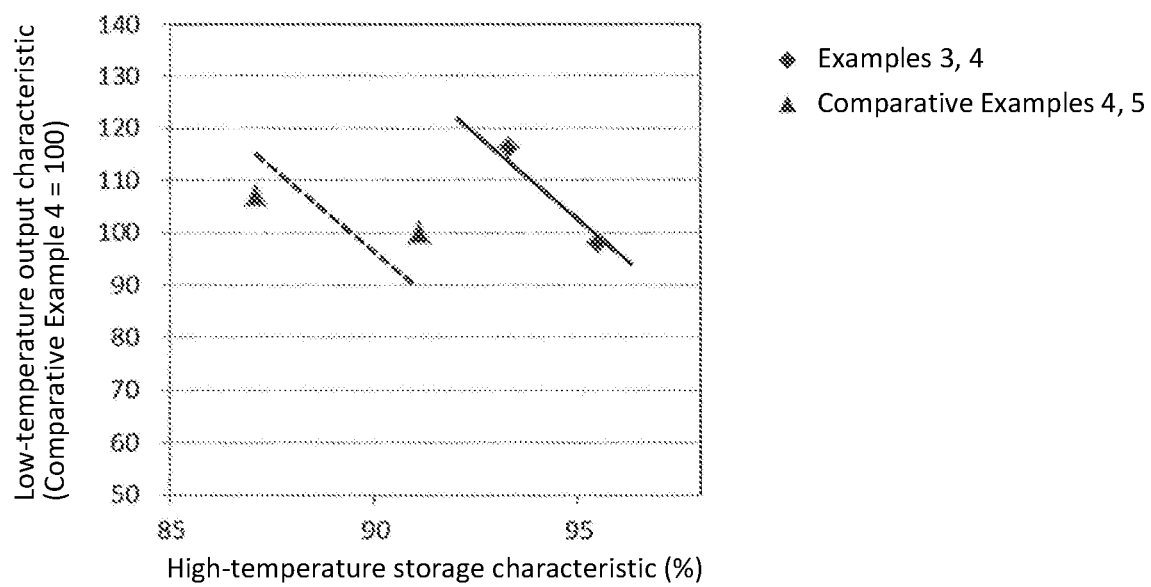
FIG. 2 is a graph showing the relationship between the high-temperature storage characteristics and the low-temperature output characteristics in Examples A3 and A4, and Comparative Examples A4 and A5.

Based on the results shown in Tables 1 and 2, the relationships between the high-temperature storage characteristic and the low-temperature output characteristic are shown in FIGS. 1 and 2. These graphs each provide approximation straight lines based on the results of Examples and Comparative Examples. In each graph, a result shown further toward the upper right means a superior balance of the high-temperature storage characteristic and the low-temperature output characteristic.

As apparent from Tables 1 and 2 and FIGS. 1 and 2, in Examples A1 to A4 where the pore volume had a prescribed value and the thermal properties in a DTA curve were within the respective prescribed ranges, the initial efficiencies were high and excellent rapid discharge characteristics as well as excellent balances of the low-temperature output characteristic and the high-temperature storage characteristic were exhibited. On the other hand, in Comparative Examples A1, A4 and A5 where the pore volumes were larger than the prescribed range, Comparative Example A2 where the pore volume was larger than the prescribed range and the negative electrode material did not have the prescribed thermal properties, and Comparative Example A3 where the negative electrode material did not have the prescribed thermal properties, the initial efficiencies were low and the rapid discharge characteristics as well as the balances of the low-temperature output characteristic and the high-temperature storage characteristics were deteriorated. Further, the initial efficiency was low and the balance of the low-temperature output characteristic and the high-temperature storage characteristic was deteriorated also in Reference Example 1 where a surface coating treatment with amorphous carbon was not performed and the Raman full width at half maximum $\Delta v_B$ (cm$^{-1}$) and the Raman $R_2$ and $R_3$ values were smaller than the respective prescribed ranges.

Experiment B

The present invention will now be described more concretely by way of Examples thereof; however, the present invention is not restricted to the below-described Examples within the gist of the present invention. The values of various production conditions and evaluation results in the below-described Examples each have a meaning as a preferred upper or lower limit value in an embodiment of the present invention, and a preferred range may be defined by a combination of an upper or lower limit value described above and a value described below in Example, or a combination of values in Examples.

<Production of Negative Electrode Sheet>

Using each negative electrode material prepared under the below-described conditions as a negative electrode active material, an electrode sheet having an active material layer with an active material layer density of 1.5±0.03 g/cm$^3$ was produced. Specifically, 50.00±0.02 g of the negative electrode material, 50.00±0.02 g (0.500 g in terms of solid content) of a 1%-by-weight aqueous sodium carboxymethyl cellulose solution, and 1.00±0.05 g (0.5 g in terms of solid content) of an aqueous dispersion of a styrene-butadiene rubber having a weight-average molecular weight of 270,000 were stirred for 5 minutes using a hybrid mixer manufactured by KEYENCE Corporation, and the resultant was defoamed for 30 seconds to obtain a slurry.

The thus obtained slurry was applied and dried onto a 10 μm-thick copper foil, which was used as a current collector, in a width of 10 cm using a die coater such that the negative electrode material was adhered in an amount of 10.00±0.2 mg/cm$^2$. This copper foil was subsequently cut to a width of 5 cm, roll-pressed using a roller having a diameter of 20 cm, and then adjusted to have an active material layer density of 1.5±0.03 g/cm$^3$, whereby an electrode sheet was obtained.

<Production of Positive Electrode Sheet>

A positive electrode was produced as follows. First, a slurry was obtained by mixing 85% by weight of nickel-manganese-lithium cobaltate (LiNiMnCoO$_2$) as a positive electrode active material, 10% by weight of acetylene black as a conductive material and 5% by weight of polyvinylidene fluoride (PVdF) as a binder in a N-methylpyrrolidone solvent. The thus obtained slurry was applied onto a 15 μm-thick aluminum foil, which was used as a current collector, using a blade coater such that the positive electrode material was adhered in an amount of 22.5±0.2 mg/cm$^2$. This aluminum foil was dried at 130° C., roll-pressed, and then adjusted to have a positive electrode density of 2.60±0.05 g/cm$^2$, whereby an electrode sheet was obtained.

<Method of Producing Nonaqueous Secondary Battery (Laminate-Type Battery)>

The negative electrode sheet having an active material layer density of 1.5±0.03 g/cm$^3$, on which 10.0±0.3 mg/cm$^2$ of the negative electrode material was adhered, and the positive electrode sheet, which were produced by the above-described respective methods, were laminated with a polyethylene separator in the order of the negative electrode, the separator, and the positive electrode. The thus obtained battery element was wrapped in a cylindrical aluminum laminate film, and an electrolyte solution, which was prepared by dissolving LiPF$_6$ in a mixed solvent of ethylene carbonate (EC), dimethyl carbonate (DMC) and ethyl methyl carbonate (EMC) (volume ratio=3:3:4) to a concentration of 1 mol/L, was injected thereto, followed by vacuum-sealing, whereby a sheet-form nonaqueous secondary battery was produced. Further, this sheet-form battery was pressed between glass plates so as to improve the adhesion between the electrodes.

<Method of Producing Nonaqueous Secondary Battery (Coin-Type Battery)>

The electrode sheet having an active material layer density of 1.5±0.03 g/cm$^2$, which was produced by the above-described method and on which 10.0±0.3 mg/cm$^2$ of the negative electrode material was adhered, was punched out in a disk shape of 12.5 mm in diameter to produce a negative electrode, and a lithium metal foil was punched out in a disk shape of 14 mm in diameter to produce a counter electrode. Between these electrodes, a separator (made of a porous polyethylene film), which had been impregnated with an electrolyte solution prepared by dissolving LiPF$_6$ in a mixed solvent of ethylene carbonate and ethyl methyl carbonate (volume ratio=3:7) to a concentration of 1 mol/L, was arranged, whereby a 2016 coin-type battery was produced.

<Discharge Capacity (mAh/g)>

Using the nonaqueous secondary battery (2016 coin-type battery) produced by the above-described method, the capacity of the battery during charging and discharging was measured in accordance with the following measurement method.

The lithium counter electrode was charged to 5 mV at a current density of 0.05 C, and further charged to a current density of 0.005 C at a constant voltage of 5 mV. After the negative electrode was doped with lithium, the lithium counter electrode was discharged to 1.5 V at a current density of 0.1 C. The discharge capacity per weight of the negative electrode active material in this process was defined as the discharge capacity (mAh/g) of this material.

<Cycle Expansion>

The nonaqueous secondary battery which had not been subjected to a charge-discharge cycle was subjected to initial charge-discharge cycles consisting of three cycles performed at 25° C. in a voltage range of 4.1 V to 3.0 V with a current value of 0.2 C (a current value at which a rated capacity based on the hourly discharge capacity is discharged in one hour is defined as 1 C; the same applies below) and two cycles performed in a voltage range of 4.2 V to 3.0 V with a current value of 0.2 C (at the time of charging, constant-voltage charging at 4.2 V was performed for another 2.5 hours). At this point, the glass plates used for fixation were removed once, and the thickness was measured at 9 spots on each battery using a contact-type thickness meter manufactured by Mitutoyo Corporation, after which an average thereof was determined as "thickness before cycling". The battery was again sandwiched between the glass plates, and subsequently subjected to a cycle test where the battery was charged and discharged 25 times in a 45° C. thermostatic chamber under the conditions of 0.8 C-CCCV charging and 0.8CCC discharging with 1.5 V cut-off. Thereafter, for the battery in a 0% SOC state, the thickness was measured at the same 9 spots as before the cycle test, an average thereof was determined as "thickness after cycling", and the cycle expansion was calculated as follows: Cycle expansion={(Thickness after cycling)/(Thickness before cycling)−1}×100(%).

<Rapid Charge Characteristics>

The coin-type battery which had not been subjected to a charge-discharge cycle was subjected to initial charge-discharge cycles consisting of three cycles performed at 25° C. in a voltage range of 4.1 V to 3.0 V with a current value of 0.2 C (a current value at which a rated capacity based on the hourly discharge capacity is discharged in one hour is defined as 1 C; the same applies below) and two cycles performed in a voltage range of 4.2 V to 3.0 V with a current value of 0.2 C (at the time of charging, constant-voltage charging at 4.2 V was performed for another 2.5 hours). Subsequently, the battery was CC-charged at a current value of 3 C from a 0% SOC state to an SOC of 100%. From the thus obtained voltage (V)-capacity (Q) curve, the dV/dQ value was calculated by differentiation, and the capacity value at a point of dV/dQ=0, where the dV/dQ value shifts from the negative range to the positive range, was determined. A rapid charge characteristic was defined as {Capacity at dV/dQ=0 (mAh)}/{Capacity at SOC of 100% (mAh)}×100(%).

Example B1

A flake natural graphite having an average particle size (d50) of 100 μm was pulverized to obtain a flake natural graphite having d50 of 11.1 μm. Then, 100 parts by weight of the thus obtained flake natural graphite was mixed with 12 parts by weight of a liquid oil as a granulating agent, and the resulting mixture was spheroidized and subsequently heat-treated to remove the granulating agent, whereby a spheroidized natural graphite was obtained. The thus obtained spheroidized graphite was filled and tightly sealed into a rubber container, and subsequently subjected to an isotropic press treatment at 200 MPa to control the value of [mercury extrusion volume/mercury intrusion volume (B/A)]. The resulting molded product was crushed and classified. The physical properties of the thus obtained spheroidized graphite powder (negative electrode raw material) are shown in Table 1. It is noted here that the value of [mercury extrusion volume/mercury intrusion volume (B/A)×100%] was 61.5% as determined by the above-described mercury porosimetry. This spheroidized graphite powder was mixed with an amorphous carbon precursor which was a pitch adjusted to have an ash content of 0.02% by weight, a metal impurity content of 20 ppm by weight and a Qi value of 1% by weight, after which the pressure in a furnace was reduced to 10 torr or lower and then brought back to the atmospheric pressure with nitrogen, and a heat treatment was performed at 1,300° C. in an inert gas with nitrogen being circulated to control the oxygen concentration in the furnace to be lower than 100 ppm. The resulting fired product was crushed and classified to obtain a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.08 in the thus obtained composite carbon material. The physical properties of the negative electrode material obtained in this manner are shown in Table 3. Further, using this negative electrode material, the above-described discharge capacity, cycle expansion, and rapid charge characteristic were measured. The results thereof are shown in Table 3. It is noted here that, in Table 3, "A" and "B" show values rounded to the nearest thousandth.

Example B2

A flake natural graphite having an average particle size (d50) of 100 μm was pulverized to obtain a flake natural graphite having d50 of 8.5 μm. The thus obtained flake natural graphite was mixed with 12 parts by weight of a liquid oil as a granulating agent, and the resulting mixture was spheroidized and subsequently heat-treated to remove the granulating agent, whereby a spheroidized natural graphite was obtained. The thus obtained spheroidized graphite was filled and tightly sealed into a rubber container, and subsequently subjected to an isotropic press treatment at 200 MPa to control the value of [mercury extrusion volume/mercury intrusion volume (B/A)]. The resulting molded product was crushed and classified. The physical properties of the thus obtained spheroidized graphite powder (negative electrode raw material) are shown in Table 2. It is noted here that the value of [mercury extrusion volume/mercury intrusion volume (B/A)×100%] was 69.9% as determined by the above-described mercury porosimetry. This spheroidized graphite powder was mixed with an amorphous carbon precursor which was a pitch adjusted to have an ash content of 0.02% by weight, a metal impurity content of 20 ppm by weight and a Qi value of 1% by weight, after which the pressure in a furnace was reduced to 10 torr or lower and then brought back to the atmospheric pressure with nitrogen, and a heat treatment was performed at 1,300° C. in an inert gas with nitrogen being circulated to control the oxygen concentration in the furnace to be lower than 100 ppm. The resulting fired product was crushed and classified to obtain a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.06 in the thus obtained composite carbon material. The physical properties of the negative electrode material obtained in this manner are shown in Table 3. Further, using this negative electrode material, the above-described discharge capacity, cycle expansion, and rapid charge characteristic were measured. The results thereof are shown in Table 3.

Comparative Example B1

A flake natural graphite having an average particle size (d50) of 100 μm was spheroidized to obtain a spheroidized natural graphite (average particle size (d50): 16.2 μm, BET specific surface area (SA): 6.9 m²/g, tap density: 1.00 g/cm³) The value of [mercury extrusion volume/mercury intrusion volume (B/A)×100(%)] of the thus obtained spheroidized graphite powder (negative electrode raw material) was 27.5% as determined by the above-described mercury porosimetry. This spheroidized graphite powder was mixed with an amorphous carbon precursor which was a tar adjusted to have an ash content of less than 0.01%, a metal impurity content of 60 ppm and a Qi value of less than 0.1%, after which the pressure in a furnace was reduced to 10 torr or lower and then brought back to the atmospheric pressure with nitrogen, and a heat treatment was performed at 1,300° C. with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.03 in the thus obtained negative electrode material (composite carbon material). Using the negative electrode material obtained in this manner, the above-described discharge capacity, cycle expansion, and rapid charge characteristic were measured. The results thereof are shown in Table 3.

Comparative Example B2

A flake natural graphite having an average particle size (d50) of 100 μm was spheroidized to obtain a spheroidized natural graphite (average particle size (d50): 10.9 μm, BET specific surface area (SA): 8.1 m²/g, tap density: 0.90 g/cm³). The value of [mercury extrusion volume/mercury intrusion volume (B/A)×100(%)] of the thus obtained spheroidized graphite powder was 28.3% as determined by the above-described mercury porosimetry. This spheroidized graphite powder was mixed with an amorphous carbon precursor which was a tar adjusted to have an ash content of less than 0.01%, a metal impurity content of 60 ppm and a Qi value of less than 0.1%, after which the pressure in a furnace was reduced to 10 torr or lower and then brought back to the atmospheric pressure with nitrogen, and a heat treatment was performed at 1,300° C. with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.04 in the thus obtained negative electrode material (composite carbon material). Using the negative electrode material obtained in this manner, the above-described discharge capacity, cycle expansion, and rapid charge characteristic were measured. The results thereof are shown in Table 3.

Comparative Example B3

A flake natural graphite having an average particle size (d50) of 100 μm was spheroidized to obtain a spheroidized natural graphite (average particle size (d50): 7.2 μm, BET specific surface area (SA): 11.1 m²/g, tap density: 0.81 g/cm³). The value of [mercury extrusion volume/mercury intrusion volume (B/A)×100(%)] of the thus obtained spheroidized graphite powder was 41.2% as determined by the above-described mercury porosimetry. This spheroidized graphite powder was mixed with an amorphous carbon precursor which was a tar adjusted to have an ash content of less than 0.01%, a metal impurity content of 60 ppm and a Qi value of less than 0.1%, after which the pressure in a furnace was reduced to 10 torr or lower and then brought back to the atmospheric pressure with nitrogen, and a heat treatment was performed at 1,300° C. with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbon (spheroidized graphitic particles:amorphous carbon) was 1:0.03 in the thus obtained negative electrode material (composite carbon material). Using the negative electrode material obtained in this manner, the above-described discharge capacity, cycle expansion, and rapid charge characteristic were measured. The results thereof are shown in Table 3.

Comparative Example B4

Using an artificial graphite containing amorphous carbon in the surface, the above-described discharge capacity, cycle expansion, and rapid charge characteristic were measured. The results thereof are shown in Table 3.

TABLE 3

| | Negative electrode raw material | | | | | | Negative electrode material | | | Nonaqueous secondary battery performance | | |
|---|---|---|---|---|---|---|---|---|---|---|---|---|
| | d50 (μm) | SA (m²/g) | Tap density (g/cm³) | A (mL/g) | B (mL/g) | B/A × 100 (%) | d50 (μm) | SA (m²/g) | Tap density (g/cm³) | Discharge capacity (mAh/g) | Cycle expansion (%) | Rapid discharge characteristic (%) |
| Example B1 | 14.6 | 13.5 | 0.98 | 0.104 | 0.064 | 61.5 | 15.5 | 1.7 | 1.25 | 357 | 4.3 | 37 |
| Example B2 | 11.5 | 11.7 | 0.98 | 0.099 | 0.069 | 69.9 | 12.9 | 2.2 | 1.23 | 357 | 4.6 | 41 |
| Comparative Example B1 | 16.2 | 6.9 | 1.00 | 0.142 | 0.039 | 27.5 | 16.8 | 3.1 | 1.12 | 362 | 6.1 | 34 |
| Comparative Example B2 | 10.9 | 8.1 | 0.90 | 0.128 | 0.036 | 28.3 | 10.9 | 3.3 | 1.02 | 361 | 5.8 | — |
| Comparative Example B3 | 7.2 | 11.1 | 0.81 | 0.143 | 0.059 | 41.2 | 7.4 | 4.6 | 1.07 | 361 | 6.0 | — |

TABLE 3-continued

| | Negative electrode raw material | | | | | | Negative electrode material | | | Nonaqueous secondary battery performance | | |
|---|---|---|---|---|---|---|---|---|---|---|---|---|
| | d50 (μm) | SA (m²/g) | Tap density (g/cm³) | A (mL/g) | B (mL/g) | B/A × 100 (%) | d50 (μm) | SA (m²/g) | Tap density (g/cm³) | Discharge capacity (mAh/g) | Cycle expansion (%) | Rapid discharge characteristic (%) |
| Comparative Example B4 | — | — | — | 0 | 0 | — | 22.8 | 0.7 | 0.91 | 350 | 4.6 | 36 |

Figure 3:
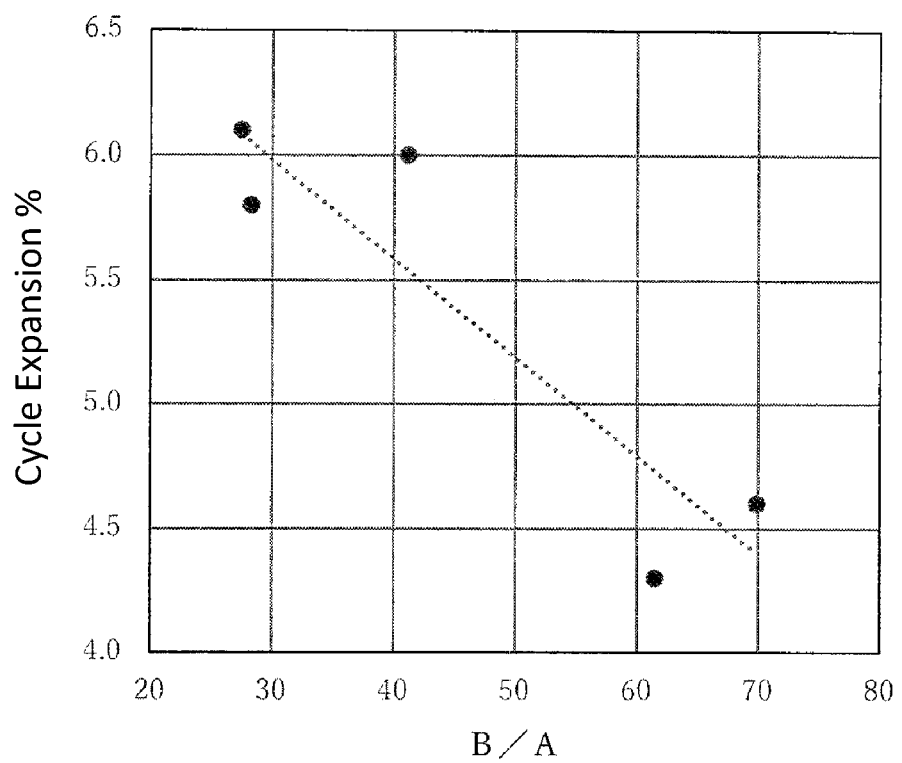
FIG. 3 is a graph showing the relationship between the value of [mercury extrusion volume/mercury intrusion volume] (B/A) and the cycle expansion in Examples B1 and B2 and Comparative Examples B1 to B3.

The relationships between the value of [mercury extrusion volume/mercury intrusion volume (B/A)] and the cycle expansion in Examples B1 and B2 and Comparative Examples B1 to B3 are shown in FIG. 3. From Table 3 and FIG. 3, it is seen that a lithium ion secondary battery which has a high discharge capacity and exhibits excellent rapid charge characteristics with inhibited cycle expansion can be obtained by using the negative electrode raw material and the negative electrode material according to the second mode of the present invention.

Experiment C

The present invention will now be described more concretely by way of Examples thereof; however, the present invention is not restricted to the below-described Examples within the gist of the present invention. The values of various production conditions and evaluation results in the below-described Examples each have a meaning as a preferred upper or lower limit value in an embodiment of the present invention, and a preferred range may be defined by a combination of an upper or lower limit value described above and a value described below in an Example, or a combination of values in Examples.

<Production of Negative Electrode Sheet>

Using each negative electrode material prepared under the below-described conditions as a negative electrode active material, an electrode sheet having an active material layer with an active material layer density of 1.65±0.03 g/cm³ was produced. Specifically, 50.00±0.02 g of the negative electrode material, 50.00±0.02 g (0.500 g in terms of solid content) of a 1%-by-weight aqueous sodium carboxymethyl cellulose solution, and 1.00±0.05 g (0.5 g in terms of solid content) of an aqueous dispersion of a styrene-butadiene rubber having a weight-average molecular weight of 270,000 were stirred for 5 minutes using a hybrid mixer manufactured by KEYENCE Corporation, and the resultant was defoamed for 30 seconds to obtain a slurry.

The thus obtained slurry was applied and dried onto a 10 μm-thick copper foil, which was used as a current collector, in a width of 10 cm using a die coater such that the negative electrode material was adhered in an amount of 10.00±0.2 mg/cm². This copper foil was subsequently cut to a width of 5 cm, roll-pressed using a roller having a diameter of 20 cm, and then adjusted to have an active material layer density of 1.5±0.03 g/cm³ or 1.65±0.03 g/cm³, whereby each electrode sheet was obtained. A peak value of the load applied in the production of the electrode sheet having an active material layer density of 1.65±0.03 g/cm³ is shown in Table 4 as "Press load [kgf/5 cm]".

<Production of Positive Electrode Sheet>

A positive electrode was produced as follows. First, a slurry was obtained by mixing 85% by weight of nickel-manganese-lithium cobaltate ($LiNiMnCoO_2$) as a positive electrode active material, 10% by weight of acetylene black as a conductive material and 5% by weight of polyvinylidene fluoride (PVdF) as a binder in a N-methylpyrrolidone solvent. The thus obtained slurry was applied onto a 15 μm-thick aluminum foil, which was used as a current collector, using a blade coater such that the positive electrode material was adhered in an amount of 22.5±0.2 mg/cm². This aluminum foil was dried at 130° C., roll-pressed, and then adjusted to have a positive electrode density of 2.60±0.05 g/cm³, whereby an electrode sheet was obtained.

<Method of Producing Nonaqueous Secondary Battery (Laminate-Type Battery)>

The negative electrode sheet having an active material layer density of 1.65±0.03 g/cm³, on which 10.0±0.3 mg/cm² of the negative electrode material was adhered, and the positive electrode sheet, which were produced by the above-described respective methods, were laminated with a polyethylene separator in the order of the negative electrode, the separator, and the positive electrode. The thus obtained battery element was wrapped in a cylindrical aluminum laminate film, and an electrolyte solution, which was prepared by dissolving $LiPF_6$ in a mixed solvent of ethylene carbonate (EC), dimethyl carbonate (DMC) and ethyl methyl carbonate (EMC) (volume ratio=3:3:4) to a concentration of 1 mol/L, was injected thereto, followed by vacuum-sealing, whereby a sheet-form nonaqueous secondary battery was produced. Further, this sheet-form battery was pressed between glass plates so as to improve the adhesion between the electrodes.

<Measurement of Expansion>

The nonaqueous secondary battery which had not been subjected to a charge-discharge cycle was subjected to initial charge-discharge cycles consisting of three cycles performed at 25° C. in a voltage range of 4.1 V to 3.0 V with a current value of 0.2 C (a current value at which a rated capacity based on the hourly discharge capacity is discharged in one hour is defined as 1 C; the same applies below) and two cycles performed in a voltage range of 4.2 V to 3.0 V with a current value of 0.2 C (at the time of charging, constant-voltage charging at 4.2 V was performed for another 2.5 hours). At this point, the glass plates used for fixation were removed, and the thickness was measured at 9 spots on each cell using a contact-type thickness meter manufactured by Mitutoyo Corporation, after which an average thereof was determined as "Thickness before cycling". The battery was again sandwiched between the glass plates, and subsequently subjected to a cycle test where the battery was charged and discharged 25 times in a 45° C. thermostatic chamber under the conditions of 0.8 C-CCCV charging and 0.8CC discharging with 1.5 V cut-off. Thereafter, for the battery in a 0% SOC state, the thickness was measured at the same 9 spots as before the cycle test, an average thereof was determined, and the difference thereof from the thickness before cycling was defined as the electrode expansion during cycles. This difference is shown in Table 4.

Example C1

Figure 6:
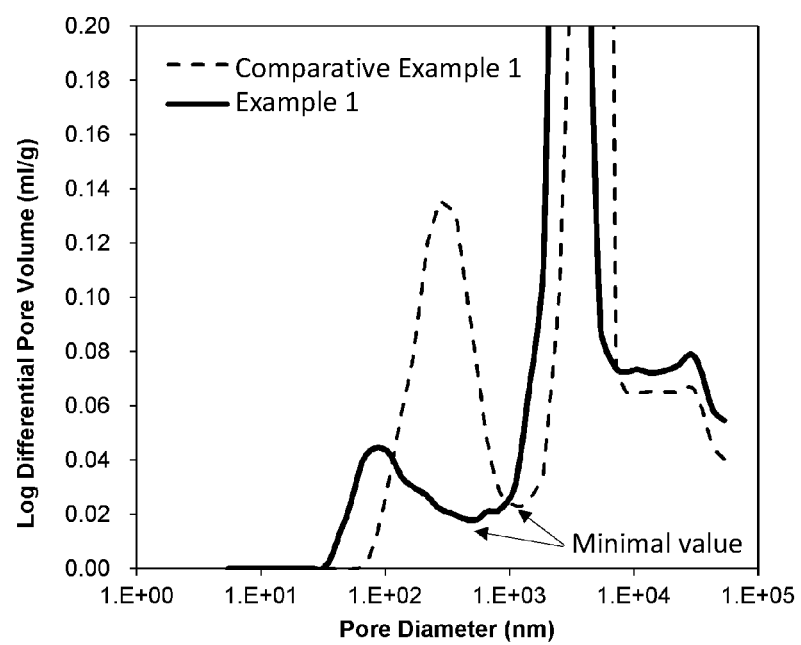
FIG. 6 is a graph showing the measurement results of mercury intrusion method in Example C1 and Comparative Example C1.

A flake natural graphite having an average particle size (d50) of 100 μm was pulverized to obtain a flake natural graphite having d50 of 9 μm. The thus obtained flake natural graphite was mixed with 12 parts by weight of a liquid oil as a granulating agent, and the resulting mixture was spheroidized and subsequently heat-treated to remove the granulating agent, whereby a spheroidized natural graphite (average particle size (d50): 13 μm, SA: 19 m$^2$/g, tap density: 0.94 g/cm$^3$) was obtained. The thus obtained spheroidized graphite was filled and tightly sealed into a rubber container and subsequently subjected to an isotropic press treatment at 200 MPa, and the resulting molded product was crushed and classified. The thus obtained spheroidized natural graphite powder was mixed with an amorphous carbon precursor which was a pitch adjusted to have an ash content of 0.02% by weight, a metal impurity content of 20 ppm by weight and a Qi value of 1% by weight, after which the pressure in a furnace was reduced to 10 torr or lower and then brought back to the atmospheric pressure with nitrogen, and a heat treatment was performed at 1,300° C. in an inert gas with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbonaceous material (spheroidized graphitic particles:amorphous carbonaceous material) was 1:0.06 in the thus obtained negative electrode material (composite carbon material). Further, for the thus obtained negative electrode material, the tap density, the pellet density, the true density, and the pore distribution were measured by the above-described respective methods. The results thereof are shown in Table 4. In Table 4, "Peak-top pore size" indicates the pore size at a peak top of a peak on the side of small pore size. In addition, the results of the measurement by mercury intrusion method are shown in FIG. 6.

Example C2

A flake natural graphite having an average particle size (d50) of 100 μm was pulverized to obtain a flake natural graphite having d50 of 11 μm. The thus obtained flake natural graphite was mixed with 12 parts by weight of a liquid oil as a granulating agent, and the resulting mixture was spheroidized and subsequently heat-treated to remove the granulating agent, whereby a spheroidized natural graphite (average particle size (d50): 16 μm, SA: 15 m$^2$/g, tap density: 0.96 g/cm$^3$) was obtained. The thus obtained spheroidized graphite was filled and tightly sealed into a rubber container and subsequently subjected to an isotropic press treatment at 200 MPa, and the resulting molded product was crushed and classified. The thus obtained spheroidized graphite powder was mixed with an amorphous carbon precursor which was a pitch adjusted to have an ash content of 0.02% by weight, a metal impurity content of 20 ppm by weight and a Qi value of 1% by weight, after which the pressure in a furnace was reduced to 10 torr or lower and then brought back to the atmospheric pressure with nitrogen, and a heat treatment was performed at 1,300° C. in an inert gas with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbonaceous material (spheroidized graphitic particles:amorphous carbonaceous material) was 1:0.06 in the thus obtained negative electrode material (composite carbon material). For the thus obtained negative electrode material, the results of performing the same measurements as in Example C1 are shown in Table 4.

Example C3

A negative electrode material (composite carbon material) was obtained in the same manner as in Example C2, except that the weight ratio of spheroidized graphite particles and amorphous carbon (spheroidized graphitic particles:amorphous carbonaceous material) was 1:0.08. For the thus obtained negative electrode material, the results of performing the same measurements as in Example C1 are shown in Table 4.

Comparative Example C1

A spheroidized natural graphite (average particle size (d50): 16 μm, BET specific surface area (SA): 6.9 m$^2$/g, tap density: 1.0 g/cm$^3$) prepared by a spheroidization treatment of a flake natural graphite having an average particle size (d50) of 100 μm was filled and tightly sealed into a rubber container, and subsequently subjected to an isotropic press treatment at 100 MPa, after which the resulting molded product was crushed and classified. The thus obtained spheroidized natural graphite powder was mixed with an amorphous carbon precursor which was a tar adjusted to have an ash content of less than 0.01%, a metal impurity content of 60 ppm and a Qi value of less than 0.1%, after which the pressure in a furnace was reduced to 10 torr or lower and then brought back to the atmospheric pressure with nitrogen, and a heat treatment was performed at 1,300° C. with nitrogen being circulated to control the oxygen concentration in the furnace to be lower than 100 ppm. The resulting fired product was crushed and classified to obtain a negative electrode material as a composite carbon material containing an amorphous carbonaceous material on the surfaces of graphite particles. From the firing yield, it was confirmed that the weight ratio of spheroidized graphite particles and amorphous carbonaceous material (spheroidized graphitic particles:amorphous carbonaceous material) was 1:0.03 in the thus obtained negative electrode material (composite carbon material). For the thus obtained negative electrode material, the results of performing the same measurements as in Example C1 are shown in Table 4. In addition, the results of the measurement by mercury intrusion method are shown in FIG. 6.

Comparative Example C2

A negative electrode material was obtained as a composite carbon material in the same manner as in Example C1, except that the isotropic press treatment was not performed. For the thus obtained negative electrode material (composite carbon material), the results of performing the same measurements as in Example C1 are shown in Table 4.

Comparative Example C3

A negative electrode material was obtained as a composite carbon material in the same manner as in Comparative Example, except that the isotropic press treatment was not performed and the weight ratio of spheroidized graphite particles and amorphous carbonaceous material (spheroidized graphitic particles:amorphous carbonaceous material) was 1:0.04. For the thus obtained negative electrode material (composite carbon material), the results of performing the same measurements as in Example C1 are shown in Table 4.

Comparative Example C4

A negative electrode material was obtained in the same manner as in Example C4, except that: a spheroidized natural graphite (average particle size (d50): 11 µm, BET specific surface area (SA): 8.2 m²/g, tap density: 0.88 g/cm³) was used; the isotropic press treatment was not performed; a coal tar adjusted to have a Qi value of 2.5% was used as the amorphous carbon precursor; and the weight ratio of spheroidized graphite particles and amorphous carbonaceous material (spheroidized graphitic particles:amorphous carbonaceous material) was changed to 1:0.07. For the thus obtained negative electrode material, the results of performing the same measurements as in Example C1 are shown in Table 4.

Comparative Example C5

A spheroidized natural graphite (average particle size (d50): 13 µm, BET specific surface area (SA): 7.8 m²/g, tap density: 0.93 g/cm³) prepared by a spheroidization treatment ticles:graphitic material) was 1:0.10. For this negative electrode material (composite carbon material), the results of performing the same measurements as in Example C1 are shown in Table 4.

Comparative Example C6

A green needle coke was pulverized to 10 µm and heat-treated at 1,000° C. in a nitrogen flow to remove tar, and a graphitization treatment was subsequently performed in an inert atmosphere at 3,000° C. to obtain a needle-like artificial graphite (average particle size (d50): 11 µm, BET specific surface area (SA): 1.8 m²/g, tap density: 1.1 g/cm³). The thus obtained artificial graphite was mixed with an amorphous carbon precursor which was a tar adjusted to have an ash content of less than 0.01%, a metal impurity content of 60 ppm and a Qi value of less than 0.1%, after which the pressure in a furnace was reduced to 10 torr or lower and then brought back to the atmospheric pressure with nitrogen, and a heat treatment was performed at 1,300° C. with nitrogen being circulated to control the oxygen concentration in the furnace to be lower than 100 ppm. From the firing yield, it was confirmed that, in the thus obtained negative electrode material which was a composite carbon material, the weight ratio of spheroidized graphite particles and amorphous carbonaceous material (spheroidized graphitic particles:amorphous carbonaceous material) was 1:0.04. For this negative electrode material (composite carbon material), the results of performing the same measurements as in Example C1 are shown in Table 4.

TABLE 4

Figure 4:
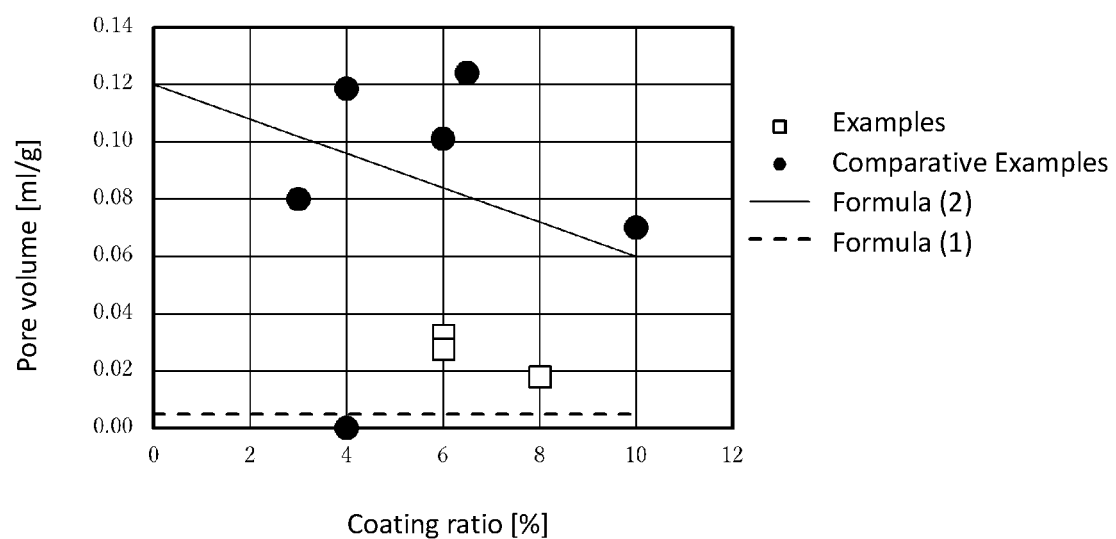
FIG. 4 is a graph showing the relationship between the coating ratio and the volume of pores having a pore size of not larger than a minimal value of a peak of a pore distribution in Examples C1 to C3 and Comparative Examples C1 to C6.
Figure 5:
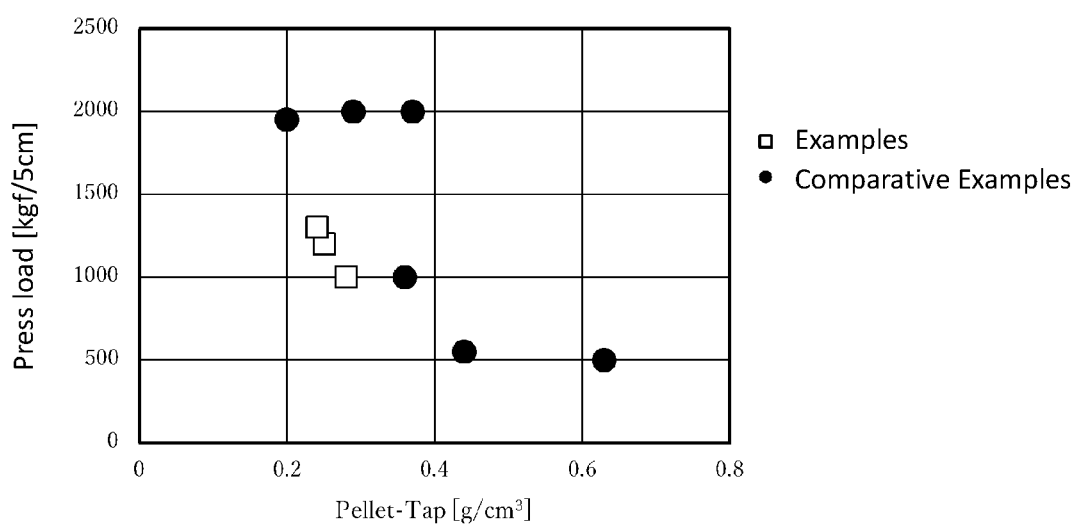
FIG. 5 is a graph showing the relationship of the load required for pressing to 1.65 g/cm$^3$ with respect to the value of Pellet-Tap in Examples C1 to C3 and Comparative Examples C1 to C6.

|  | Isotropic press treatment | Coating ratio [%] | Pore volume [mL/g] | Pellet-Tap [g/cm³] | Tap density [g/cm³] | Pellet density @ 2.4 t/cm³ g/cm³ | Peak-top pore size [nm] | Press load [kgf/5 cm] | Expansion [µm] | True density [g/cm³] | d002 [Å] |
|---|---|---|---|---|---|---|---|---|---|---|---|
| Example C1 | performed | 6 | 0.03 | 0.28 | 1.18 | 1.46 | 75 | 1000 | 4 | — | 3.356 |
| Example C2 | performed | 6 | 0.03 | 0.25 | 1.21 | 1 46 | 90 | 1200 | 4 | 2.234 | 3.356 |
| Example C3 | performed | 8 | 0.02 | 0.24 | 1.26 | 1.50 | 219 | 1300 | 5 | 2.222 | 3.357 |
| Comparative Example C1 | performed | 3 | 0.08 | 0.44 | 1.23 | 1.67 | 362 | 550 | 6 | 2.247 | 3.356 |
| Comparative Example C2 | — | 6 | 0.10 | 0.2 | 1.23 | 1.43 | 92 | 1950 | 5 | 2.234 | 3.356 |
| Comparative Example C3 | — | 4 | 0.12 | 0.36 | 1.15 | 1.51 | 548 | 1000 | 6 | 2.243 | 3.356 |
| Comparative Example C4 | — | 6.5 | 0.12 | 0.29 | 1.04 | 1.33 | 437 | 2000 | 6 | 2.235 | 3.356 |
| Comparative Example C5 | performed | 10 | 0.07 | 0.63 | 1.00 | 1.63 | 550 | 500 | 6 | — | — |
| Comparative Example C6 | — | 4 | 0.00 | 0.37 | 0.95 | 1.32 | none | 2000 | 5 | — | 3.358 | of a flake natural graphite having an average particle size (d50) of 100 µm was mixed with a graphitic material precursor which was a pitch adjusted to have an ash content of 0.1% by weight and a Qi value of less than 0.2% by weight, and the resultant was filled and tightly sealed into a rubber container and then subjected to an isotropic press treatment. Thereafter, a heat treatment was performed at 1,000° C. in a nitrogen flow to remove tar, and a graphitization treatment was subsequently performed in an inert atmosphere at 3,000° C. The resulting graphitized product was crushed and classified to obtain a negative electrode material as a composite carbon material containing a graphitic material on the surfaces or inside of graphite particles. From the firing yield, it was confirmed that, in the thus obtained negative electrode material which was a composite carbon material, the weight ratio of spheroidized graphite particles and graphitic material (spheroidized graphitic par- FIG. 4, where the coating ratio is plotted on the abscissa and the pore volume of a minimal value or less determined by a mercury intrusion method is plotted on the ordinate, shows the relationship between the coating ratio and the pore volume. FIG. 4 also shows Formulae (1) and (2). FIG. 5, where the value of [(pellet density)–(tap density)](indicated as "Pellet-Tap" in FIG. 4) is plotted on the abscissa and the actual "press load" (a press load required for pressing to 1.65 g/cm³) is plotted on the ordinate, shows the relationship between [Pellet—Tap] and the press load. As seen from FIG. 5, the material satisfying the specific Formulae (1) and (2) had good pressability as shown in FIG. 5.

As apparent from Table 4 and FIGS. 4 and 5, those negative electrode materials of Examples, which contained a graphite containing at least either one of an amorphous carbonaceous material or a graphitic material in at least a part of the surface and satisfied specific formulae with regard to the cumulative pore volume determined by a mercury intrusion method and the coating ratio of the amorphous carbonaceous material and the graphitic material on the graphite surface, were confirmed to have good pressability and exhibit extremely small expansion and contraction in an electrode during cycles. On the other hand, in Comparative Example C1, although good pressability was obtained, a large electrode expansion was observed. In Comparative Example C2, although the electrode expansion was small, it was confirmed that the press load was large due to the values outside the respective ranges of Formulae (1) and (2).

That is, it was found that the performance of being pressable to a high density and hardly causing electrode expansion during cycles is expressed by satisfying both of the following features: satisfaction of Formulae (1) and (2); and a pore size at a peak top of a peak on the side of small pore size being in a specific range.

INDUSTRIAL APPLICABILITY

The negative electrode material for a nonaqueous secondary battery according to the first mode of the present invention as well as a negative electrode for a nonaqueous secondary battery and a nonaqueous secondary battery, which contain the same, have a high capacity and exhibit excellent rapid charge-discharge characteristics, low-temperature input-output characteristics, and high-temperature storage characteristics and, therefore, can be preferably used in, for example, on-vehicle applications; power tool applications; and portable device applications, such as cellular phones and personal computers.

The negative electrode raw material for a nonaqueous secondary battery and the negative electrode material for a nonaqueous secondary battery according to the second mode of the present invention as well as a negative electrode for a nonaqueous secondary battery and a nonaqueous secondary battery, which contain the same, have a high capacity and exhibit limited cycle expansion and excellent rapid charge-discharge characteristics and, therefore, can be preferably used in, for example, on-vehicle applications; power tool applications; and portable device applications, such as cellular phones and personal computers.

The negative electrode material for a nonaqueous secondary battery according to the third mode of the present invention as a negative electrode material for a high-capacity battery, as well as a negative electrode for a nonaqueous secondary battery and a nonaqueous secondary battery, which contain the same, exhibit excellent rapid charge-discharge characteristics, low-temperature input-output characteristics, and high-temperature storage characteristics and, therefore, can be preferably used in, for example, on-vehicle applications; power tool applications; and portable device applications, such as cellular phones and personal computers.

What is claimed is:

1. A negative electrode material suitable for a nonaqueous secondary battery, the negative electrode material comprising:
   a graphite comprising an amorphous carbonaceous material in at least a part of the surface thereof,
   wherein the negative electrode material has a cumulative pore volume of 0.100 mL/g or less in a pore size range of 0.01 μm or more and 1 μm or less, and
   wherein the negative electrode material satisfies conditions (1) and/or (2) in a DTA curve obtained by differential thermal analysis (DTA) in an air stream:
   (1) the negative electrode material has no exothermic peak in a temperature range of 550° C. or higher and 650° C. or lower; and
   (2) the negative electrode material has an exothermic peak in a temperature range of 550° C. or higher and 650° C. or lower, and the area of the exothermic peak is larger than 0 μV·s/mg but 90 μV·s/mg or smaller.

2. The negative electrode material of claim 1, satisfying condition (3) in the DTA curve:
   (3) the negative electrode material has a heat generation start temperature in a temperature range of 550° C. or higher and 750° C. or lower.

3. The negative electrode material of claim 1, satisfying condition (4) in the DTA curve:
   (4) the negative electrode material has an exothermic peak in a temperature range of higher than 650° C. but 1,000° C. or lower.

4. The negative electrode material of claim 1, having:
   a Raman $R_2$ value, calculated by formula (β), of 0.03 or more and 0.60 or less:

$$R_2 = I_C/I_A \quad (\beta)$$

$R_2$ being a Raman $R_2$ value, $I_C$ being an intensity of a valley as a minimal value between a peak $P_A$ near 1,580 cm$^{-1}$ and a peak $P_B$ near 1,360 cm$^{-1}$ and Is being an intensity of a peak $P_A$ near 1,580 cm$^{-1}$ in Raman spectrum analysis; and
   a Raman $R_3$ value, calculated by formula (γ), of 0.10 or more and 1.00 or less:

$$R_3 = I_C/I_B \quad (\gamma),$$

$R_3$ being a Raman value, $I_C$ being an intensity of a valley as a minimal value between a peak $P_A$ near 1,580 cm$^{-1}$ and a peak $P_B$ near 1,360 cm$^{-1}$, and $I_B$ being an intensity of a peak $P_B$ near 1,360 cm$^{-1}$, in Raman spectrum analysis.

5. The negative electrode material of claim 1, having a BET specific surface area of 0.5 m$^2$/g or more and 10.0 m$^2$/g or less.

6. The negative electrode material of claim 1, having a tap density of 0.60 g/cm$^3$ or more and 1.40 g/cm$^3$ or less.

7. The negative electrode material of claim 1, having an interplanar spacing (d002) of 0.340 nm or smaller and a crystallite size in the c-axis direction (Lc) of 90 nm or larger, as determined by X-ray diffractometry.

8. A negative electrode adapted for a nonaqueous secondary battery, the negative electrode comprising:
   a current collector; and
   an active material layer formed on the current collector,
   wherein the active material layer comprises the negative electrode material of claim 1.

9. A nonaqueous secondary battery, comprising:
   a positive electrode;
   the negative electrode of claim 8; and
   an electrolyte.

10. The negative electrode material of claim 1, wherein the cumulative pore volume in the pore size range of 0.01 μm or more and 1 μm or less is less than 0.070 mL/g.

11. The negative electrode material of claim 1, wherein the cumulative pore volume in the pore size range of 0.01 μm or more and 1 μm or less is 0.060 mL/g or less.

12. The negative electrode material of claim 1, wherein a condition (2') is satisfied by the negative electrode material having an exothermic peak in a temperature range of 608° C. or higher and 650° C. or lower, and the area of the exothermic peak is larger than 0 μV·s/mg but 90 μV·s/mg or smaller.

13. The negative electrode material of claim 12, satisfying the condition (1) and further satisfying condition (3) in the DTA curve:

(3) the negative electrode material has a heat generation start temperature in a temperature range of 550° C. or higher and 750° C. or lower.

\* \* \* \* \*